United States Patent
Pahlavan et al.

(10) Patent No.: US 9,384,526 B2
(45) Date of Patent: *Jul. 5, 2016

(54) SYSTEM AND METHOD FOR HANDLING REMOTE DRAWING COMMANDS

(71) Applicant: Wyse Technology L.L.C., San Jose, CA (US)

(72) Inventors: Babak Pahlavan, San Jose, CA (US); Ron Nicholson, Santa Clara, CA (US); Daniel Barreto, Los Altos, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,068

(22) Filed: Feb. 26, 2014

(65) Prior Publication Data
US 2014/0176585 A1  Jun. 26, 2014

Related U.S. Application Data

(63) Continuation of application No. 12/546,678, filed on Aug. 24, 2009, now Pat. No. 8,676,926.

(60) Provisional application No. 61/169,664, filed on Apr. 15, 2009, provisional application No. 61/169,675, filed on Apr. 15, 2009, provisional application No. 61/169,667, filed on Apr. 15, 2009.

(51) Int. Cl.
G06F 15/16 (2006.01)
G06T 1/20 (2006.01)
(Continued)

(52) U.S. Cl.
CPC ............... *G06T 1/20* (2013.01); *G06F 9/4445* (2013.01); *G06F 9/54* (2013.01); *H04L 67/04* (2013.01); *H04L 67/08* (2013.01); *H04L 67/38* (2013.01); *G06F 2209/549* (2013.01)

(58) Field of Classification Search
CPC ...................................................... G06F 15/16
USPC ........................... 709/217, 219, 227; 715/740
See application file for complete search history.

(56) References Cited

U.S. PATENT DOCUMENTS 4,777,880 A  10/1988  Beattie et al.
5,918,039 A   6/1999  Buswell et al.
(Continued)

FOREIGN PATENT DOCUMENTS

WO  2005/112384  11/2005  ............. H04L 29/06
WO  2008/087409   7/2008

OTHER PUBLICATIONS

"Jaadu" at http://www.creativeapplications.net/iphone/iaadu-vnc-iphone/, Dec. 26, 2008, pp. 1-5.
(Continued)

Primary Examiner — David Lazaro
Assistant Examiner — Marie Georges Henry
(74) Attorney, Agent, or Firm — Baker Botts L.L.P.

(57) ABSTRACT

Examples of systems and methods are provided for handling remote drawing commands. A system may comprise a buffer module configured to receive, at the system from a remote server system over a remote access connection between the system and the remote server system during a remote connection session, remote drawing commands, according to a drawing command rate, of a remote application running on the remote server system. The buffer module may be configured to store the remote drawing commands. The system may comprise a timer module configured to facilitate sending at least some of the remote drawing commands in the buffer module to a graphics module according to a refresh rate that is less than the drawing command rate. The timer module may be application agnostic.

20 Claims, 37 Drawing Sheets

(51) Int. Cl.
*G06F 9/44* (2006.01)
*H04L 29/08* (2006.01)
*G06F 9/54* (2006.01)
*H04L 29/06* (2006.01)

(56) References Cited

U.S. PATENT DOCUMENTS

| | | |
|---|---|---|
| 5,961,582 A | 10/1999 | Gaines |
| 6,020,881 A | 2/2000 | Naughton et al. |
| 6,085,247 A | 7/2000 | Parsons et al. ............... 709/227 |
| 6,128,010 A | 10/2000 | Baxter et al. |
| 6,286,003 B1* | 9/2001 | Muta |
| 6,341,097 B1 | 1/2002 | Hsu et al. |
| 6,430,609 B1 | 8/2002 | Dewhurst et al. |
| 6,483,813 B1* | 11/2002 | Blencowe ............... 370/252 |
| 6,510,229 B1 | 1/2003 | Gelle |
| 6,518,965 B2* | 2/2003 | Dye et al. ............... 345/419 |
| 6,654,784 B1 | 11/2003 | Wei |
| 6,710,790 B1 | 3/2004 | Fagioli |
| 6,784,855 B2 | 8/2004 | Matthews et al. ............ 345/1.1 |
| 6,836,885 B1 | 12/2004 | Buswell et al. |
| 6,920,502 B2 | 7/2005 | Araujo et al. ............... 709/229 |
| 6,938,221 B2 | 8/2005 | Nguyen |
| 6,950,991 B2 | 9/2005 | Bloomfield et al. |
| 6,990,477 B2 | 1/2006 | Cotner et al. |
| 7,093,003 B2 | 8/2006 | Yuh et al. |
| 7,177,902 B2 | 2/2007 | Hubbard |
| 7,213,228 B2 | 5/2007 | Putterman et al. ............ 717/109 |
| 7,242,406 B2 | 7/2007 | Robotham et al. |
| 7,274,368 B1 | 9/2007 | Keslin |
| 7,293,243 B1 | 11/2007 | Ben-Shachar et al. |
| 7,430,681 B1 | 9/2008 | Hobbs |
| 7,475,421 B2 | 1/2009 | Adbo et al. ............... 726/3 |
| 7,489,306 B2 | 2/2009 | Kolmykov-Zotov et al. |
| 7,502,754 B2 | 3/2009 | Campbell et al. |
| 7,512,906 B1 | 3/2009 | Baier et al. |
| 7,577,924 B2 | 8/2009 | Nguyen |
| 7,584,505 B2 | 9/2009 | Mondri et al. ............... 726/13 |
| 7,607,128 B2 | 10/2009 | Arthurs et al. |
| 7,685,539 B2 | 3/2010 | Nguyen |
| 7,703,047 B2 | 4/2010 | Keely, Jr. |
| 7,705,829 B1 | 4/2010 | Plotnikov |
| 7,711,366 B1 | 5/2010 | O'Neil et al. ............... 455/438 |
| 7,747,086 B1* | 6/2010 | Hobbs et al. ............... 382/232 |
| 7,870,496 B1 | 1/2011 | Sherwani |
| 7,895,521 B2 | 2/2011 | Bhogal et al. |
| 7,996,461 B1 | 8/2011 | Kobres et al. ............... 709/204 |
| 8,024,407 B2 | 9/2011 | Harwood et al. ............ 709/205 |
| 8,078,164 B2 | 12/2011 | Ganesan ............... 455/432.1 |
| 8,882,666 B1 | 11/2014 | Goldberg et al. |
| 2002/0057295 A1 | 5/2002 | Panasyuk et al. |
| 2002/0099829 A1 | 7/2002 | Richards et al. ............ 709/227 |
| 2002/0118175 A1 | 8/2002 | Liebenow et al. |
| 2002/0126099 A1 | 9/2002 | Engholm |
| 2002/0165993 A1 | 11/2002 | Kramer |
| 2003/0012216 A1 | 1/2003 | Novaes ............... 370/432 |
| 2003/0087601 A1 | 5/2003 | Agam et al. ............... 455/39 |
| 2003/0122856 A1 | 7/2003 | Hubbard |
| 2003/0160813 A1 | 8/2003 | Raju |
| 2003/0177322 A1 | 9/2003 | Crockett et al. |
| 2004/0141010 A1 | 7/2004 | Fitzmaurice et al. |
| 2004/0205117 A1 | 10/2004 | Hertling et al. |
| 2004/0205260 A1 | 10/2004 | Oki et al. |
| 2005/0012723 A1 | 1/2005 | Pallakoff |
| 2005/0091359 A1 | 4/2005 | Soin et al. |
| 2005/0101300 A1 | 5/2005 | Hon et al. |
| 2005/0114797 A1 | 5/2005 | Nguyen |
| 2005/0120312 A1 | 6/2005 | Nguyen |
| 2005/0184145 A1 | 8/2005 | Law et al. |
| 2005/0197136 A1 | 9/2005 | Friday et al. ............... 455/456.1 |
| 2005/0246445 A1 | 11/2005 | Panasyuk et al. ............ 709/227 |
| 2005/0256950 A1* | 11/2005 | Suzuki ............... 709/223 |
| 2005/0267935 A1 | 12/2005 | Gandhi et al. |
| 2005/0278708 A1 | 12/2005 | Zhao et al. |
| 2006/0026535 A1 | 2/2006 | Hotelling |
| 2006/0068769 A1 | 3/2006 | Adya et al. |
| 2006/0075114 A1 | 4/2006 | Panasyuk et al. |
| 2006/0085381 A1 | 4/2006 | Fugate et al. ............... 707/1 |
| 2006/0179118 A1 | 8/2006 | Stirbu |
| 2006/0206827 A1 | 9/2006 | DeWitt |
| 2007/0008922 A1 | 1/2007 | Abhishek et al. |
| 2007/0050470 A1 | 3/2007 | Suzuki et al. |
| 2007/0056009 A1 | 3/2007 | Spilo et al. |
| 2007/0061460 A1 | 3/2007 | Khan et al. |
| 2007/0067328 A1 | 3/2007 | Mingot et al. |
| 2007/0140189 A1 | 6/2007 | Muhamed et al. ............ 370/338 |
| 2007/0156677 A1 | 7/2007 | Szabo |
| 2007/0192329 A1 | 8/2007 | Croft et al. |
| 2007/0234048 A1 | 10/2007 | Ziv |
| 2007/0236470 A1 | 10/2007 | Abanami et al. |
| 2007/0262964 A1 | 11/2007 | Zotov et al. |
| 2008/0016467 A1 | 1/2008 | Chambers et al. |
| 2008/0088602 A1 | 4/2008 | Hoteling |
| 2008/0155012 A1 | 6/2008 | Chiang |
| 2008/0222416 A1 | 9/2008 | Kiwimagi et al. |
| 2008/0222618 A1 | 9/2008 | Valtchev |
| 2008/0270910 A1 | 10/2008 | Lukasik et al. ............... 715/740 |
| 2008/0291210 A1 | 11/2008 | Partani et al. |
| 2008/0316218 A1 | 12/2008 | Kilani et al. |
| 2009/0016529 A1 | 1/2009 | Gopinath et al. |
| 2009/0058822 A1 | 3/2009 | Chaudhri |
| 2009/0083628 A1 | 3/2009 | Fitzmaurice et al. |
| 2009/0106662 A1 | 4/2009 | Ye et al. ............... 715/740 |
| 2009/0193340 A1 | 7/2009 | Mahajan et al. |
| 2009/0322687 A1 | 12/2009 | Duncan et al. |
| 2010/0005395 A1 | 1/2010 | Shirakawa |
| 2010/0011299 A1 | 1/2010 | Brodersen et al. |
| 2010/0049820 A1 | 2/2010 | Richardson et al. ............ 709/208 |
| 2010/0131654 A1 | 5/2010 | Malakapalli et al. ............ 709/227 |
| 2010/0138780 A1 | 6/2010 | Marano et al. |
| 2010/0174713 A1 | 7/2010 | Baessler et al. |
| 2010/0177645 A1 | 7/2010 | Kang et al. |
| 2010/0250903 A1 | 9/2010 | Jensen |
| 2010/0323762 A1 | 12/2010 | Sindhu |
| 2011/0029896 A1 | 2/2011 | Cheng |
| 2011/0093822 A1 | 4/2011 | Sherwani |
| 2011/0099497 A1 | 4/2011 | Fok et al. |
| 2011/0239127 A1 | 9/2011 | Meng et al. |
| 2011/0246904 A1 | 10/2011 | Pinto et al. |

OTHER PUBLICATIONS

"TiPb at Work: Jaadu VNC vs. Mocha VNC", at http://www.tipb.com/2008/10/22/tipb-at-work-jaadu-vnc-vs-mocha-vna/, Oct. 22, 2008, pp. 1-6.

Sanz et al., "XMLBased Integration of Web, Mobile and Desktop Components in a Service Oriented Architecture", Aug. 29, 2008, International Symposium on Distributed Computing and Articificial Intelligence 2008, vol. 50/2009, pp. 565-573.

Extended European Search Report; Application No. 10764912.1; pp. 6, Oct. 31, 2012.

* cited by examiner

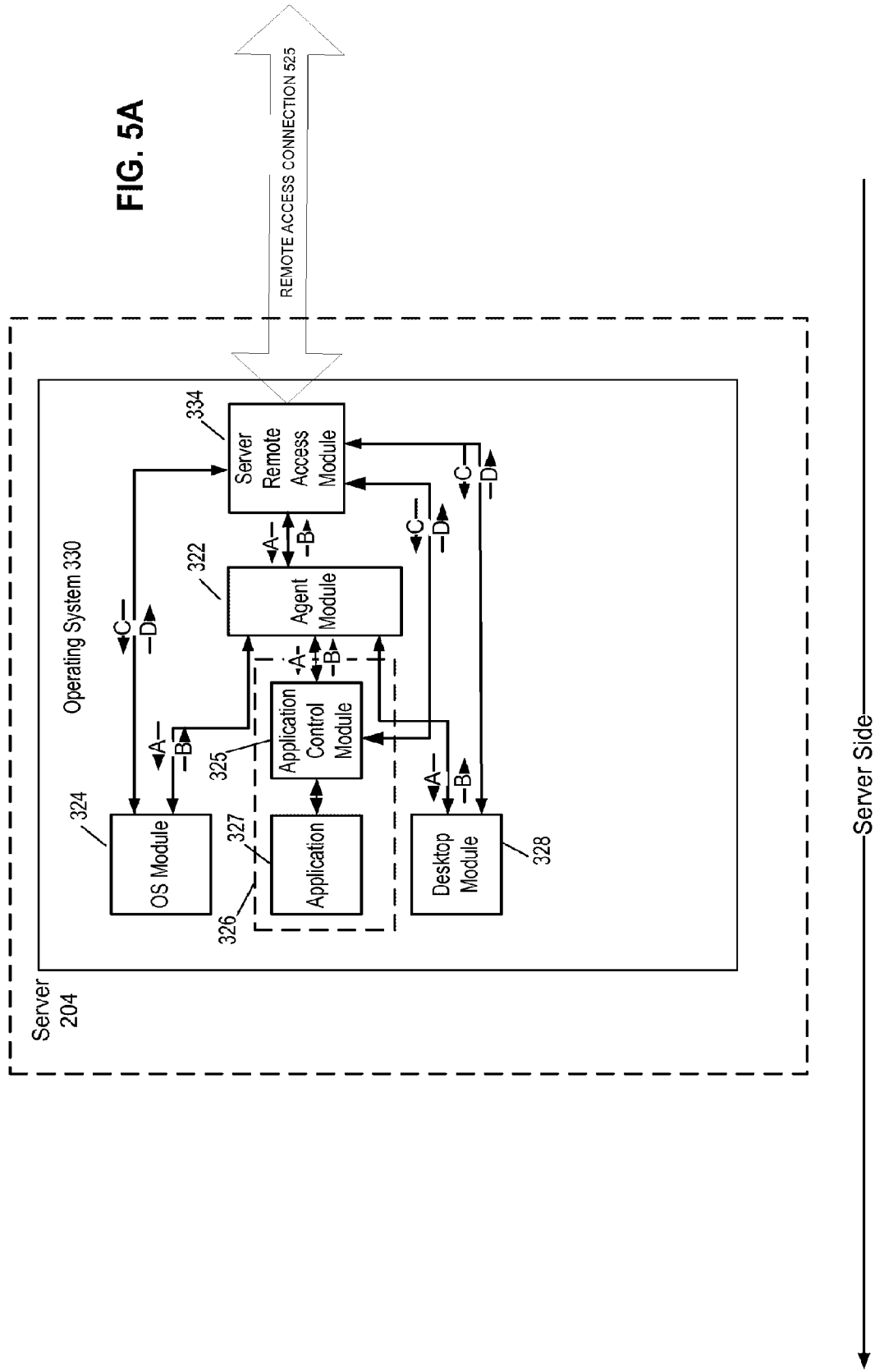

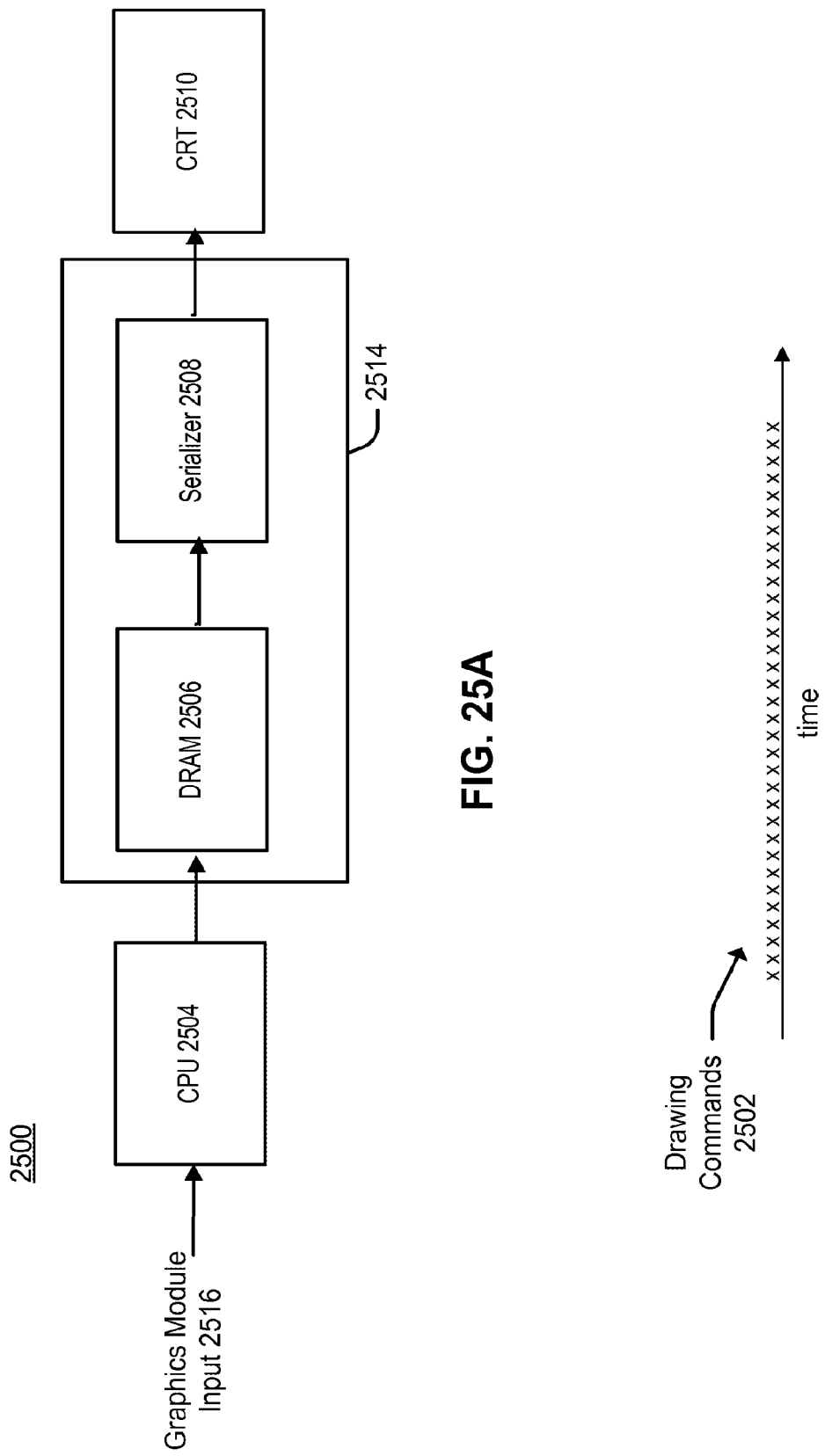

SYSTEM AND METHOD FOR HANDLING REMOTE DRAWING COMMANDS

CROSS-REFERENCES TO RELATED APPLICATIONS

The present application is a continuation application of copending U.S. patent application Ser. No. 12/546,678 filed Aug. 24, 2009; which claims the benefit of priority under 35 U.S.C. §119 from U.S. Provisional Patent Application Ser. No. 61/169,664, filed on Apr. 15, 2009, U.S. Provisional Application Ser. No. 61/169,675, filed on Apr. 15, 2009, and U.S. Provisional Application Ser. No. 61/169,667, filed on Apr. 15, 2009, all of which are hereby incorporated by reference in their entirety for all purposes.

BACKGROUND

One approach to the design and implementation of computer networks, particularly with regard to the development of client/server applications, includes designing client applications and client devices so that the majority of the heavily used resources are at a remote computing device, such as a centralized server, connected via network. These client devices generally have minimal memory, disk storage, and processor power, but are designed under the premise that most users connected to a powerful server do not need the additional processing power. With these client devices, the total cost of ownership is minimized, because of the reduced resources and because the clients can be centrally administered and updated from the server. As such, these client devices are suited for a network which can handle a significant number of devices. Client devices may also be equipped with screens or displays for providing information to users of the client devices. In such cases, drawing commands written directly to the display memory of the client devices can subsequently be shown on the displays.

SUMMARY

In one aspect of the disclosure, a system is provided for handling remote drawing commands. The system may comprise a buffer module configured to receive, at the system from a remote server system over a remote access connection between the system and the remote server system during a remote connection session, remote drawing commands, according to a drawing command rate, of a remote application running on the remote server system. The buffer module may be configured to store the remote drawing commands. The system may comprise a timer module configured to facilitate sending at least some of the remote drawing commands in the buffer module to a graphics module according to a refresh rate that is less than the drawing command rate. The timer module may be application agnostic.

In another aspect of the disclosure, a method is provided for handling remote drawing commands. The method may comprise receiving, at a system from a remote server system over a remote access connection between the system and the remote server system during a remote connection session, remote drawing commands, according to a drawing command rate, of a remote application running on the remote server system. The method may comprise storing the remote drawing commands in a buffer module and facilitating sending at least some of the remote drawing commands in the buffer module to a graphics module according to a refresh rate that is less than the drawing command rate.

In yet another aspect of the disclosure, a system is provided for handling remote drawing commands. The system may comprise means for receiving, at a system from a remote server system over a remote access connection between the system and the remote server system during a remote connection session, remote drawing commands, according to a drawing command rate, of a remote application running on the remote server system. The system may comprise means for storing the remote drawing commands and means for facilitating sending at least some of the remote drawing commands in the means for storing the remote drawing commands to a graphics module according to a refresh rate that is less than the drawing command rate. The means for facilitating sending may be application agnostic.

In yet another aspect of the disclosure, a machine-readable medium encoded with instructions executable by a processing system to perform a method for handling remote drawing commands is provided. The instructions may comprise code for receiving, at a system from a remote server system over a remote access connection between the system and the remote server system during a remote connection session, remote drawing commands, according to a drawing command rate, of a remote application running on the remote server system. The instructions may comprise code for storing the remote drawing commands in a buffer module and code for facilitating sending at least some of the remote drawing commands in the buffer module to a graphics module according to a refresh rate that is less than the drawing command rate.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 5A is a conceptual block diagram of a server according to certain aspects of the present disclosure.

FIG. 25A illustrates an example of a display system that may be utilized by a client device, according to one approach.

FIG. 25B illustrates an example of drawing commands that may be provided to a display system, according to one approach.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1A:
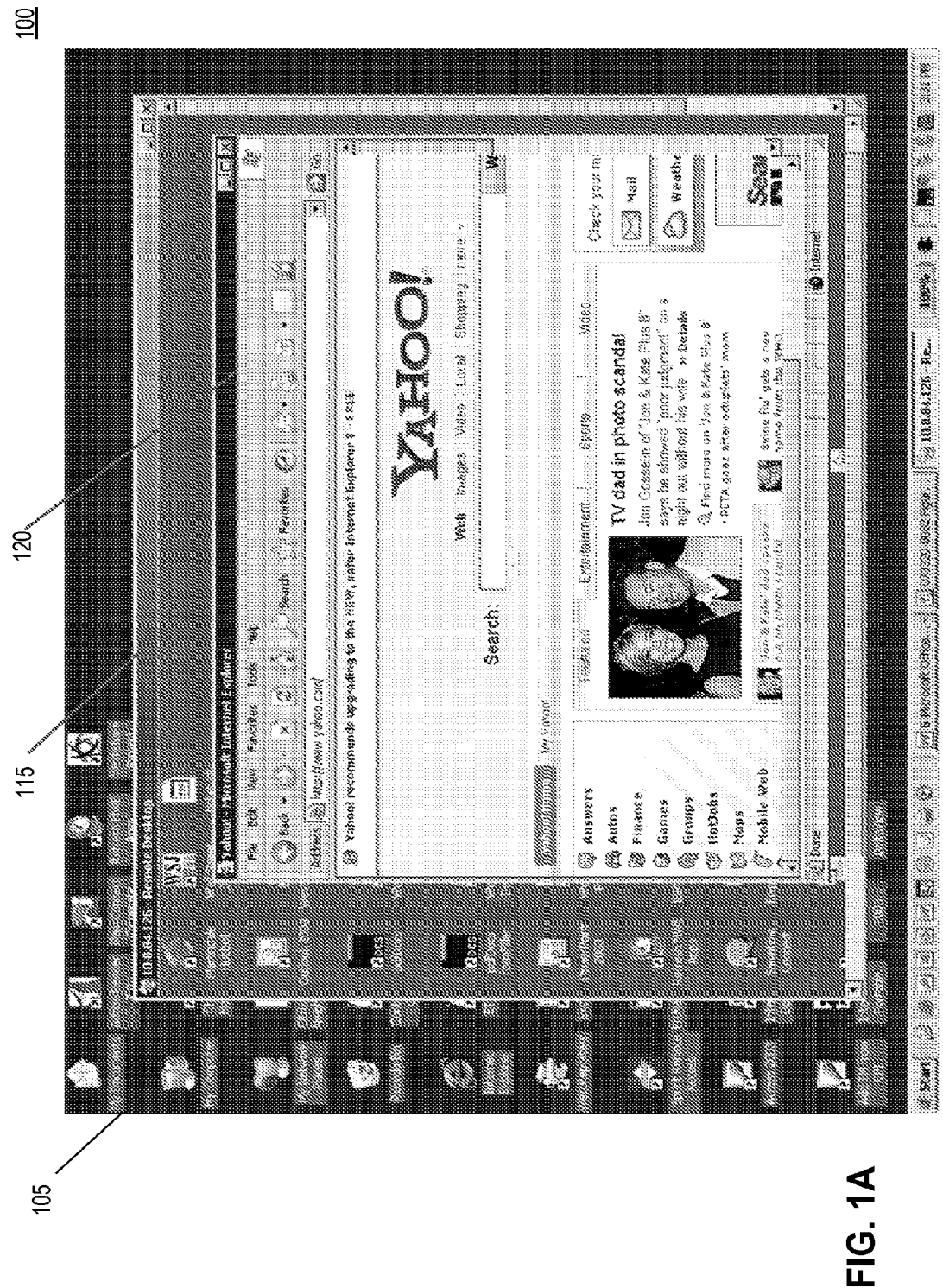
FIG. 1A illustrates an example of a display on a client device during a remote access session with a remote server.

FIG. 1A shows an example of a display 100 at a client device with a large screen during a remote access session with a server. The display 100 includes the local desktop 105 of the client device, a remote view window 115 showing an image of a remote desktop 115 and a remote web browser application 120 running on the server. The image of the remote desktop 115 and remote application 120 are based on display output data of the remote desktop 115 and remote application 120 from the server.

Figure 1B:
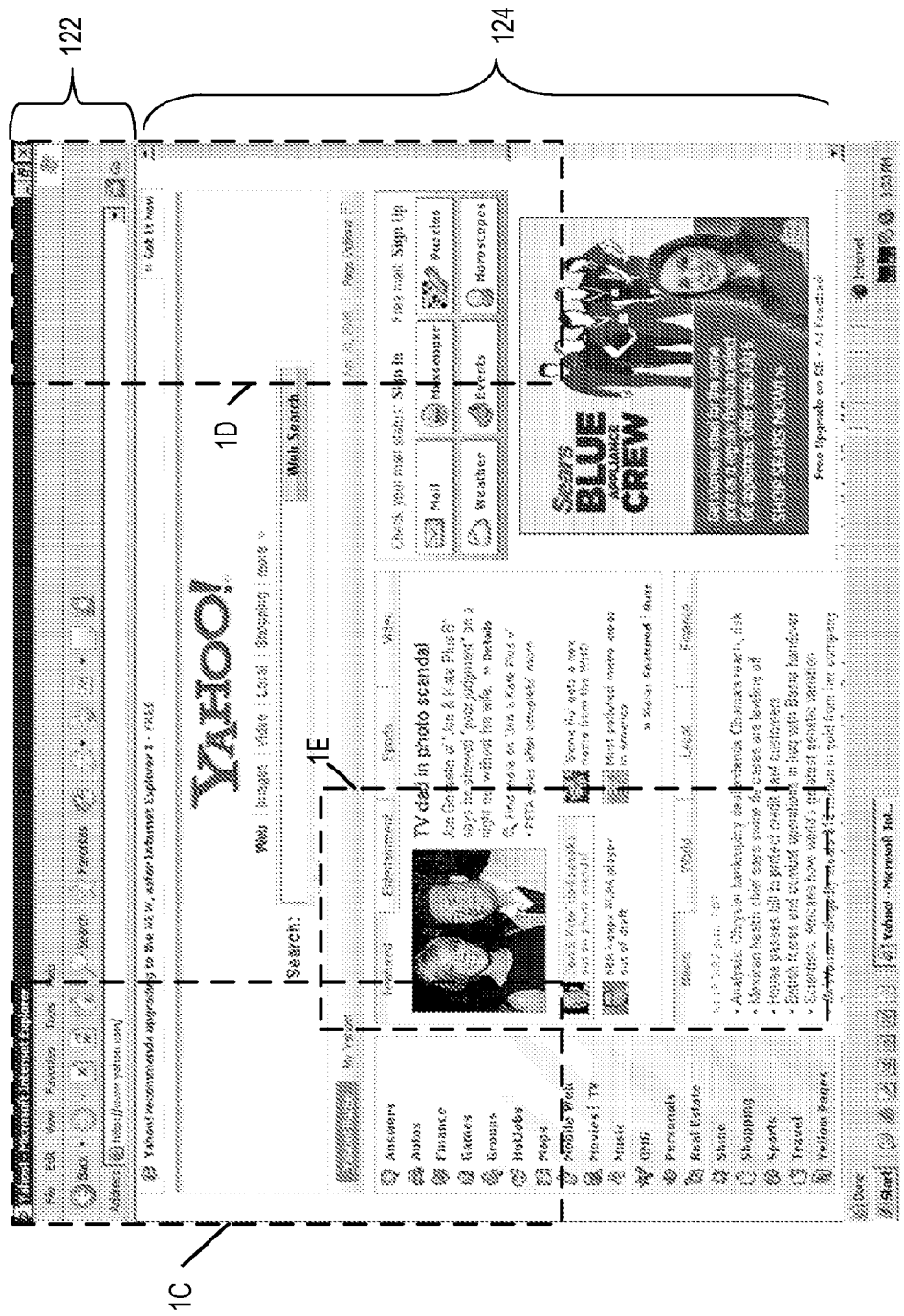
FIG. 1B illustrates an example of a web browser running on a server.

FIG. 1B shows an enlarged view of the remote web browser application 120. The remote web browser application 120 includes a GUI 122 (e.g., toolbars) and a window 124 for displaying web content. The GUI 122 is designed to be viewed on a large display. As a result, it can be very different for a user at a client device with a small display to remotely interact with the remote web browser 120. For example, if the image of the entire remote web browser application 120 is displayed on a client device with a small display, then the GUI 122 is greatly reduced in size making it difficult for the user to view the GUI 122 and select graphical control objects in the GUI 122.

Figure 1E:
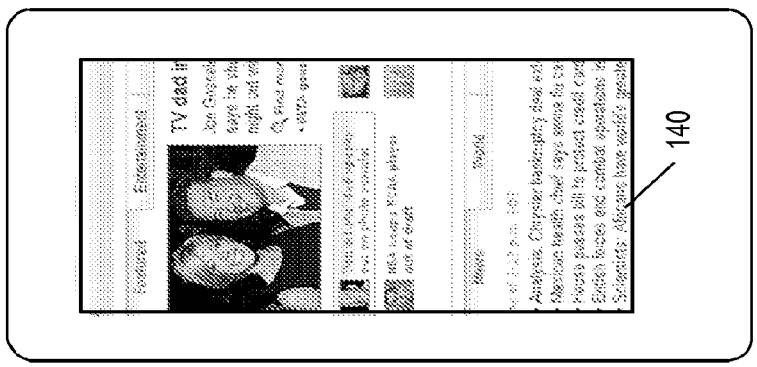
FIGS. 1C to 1E illustrate examples of different portions of the web browser displayed on a client device.
Figure 1D:
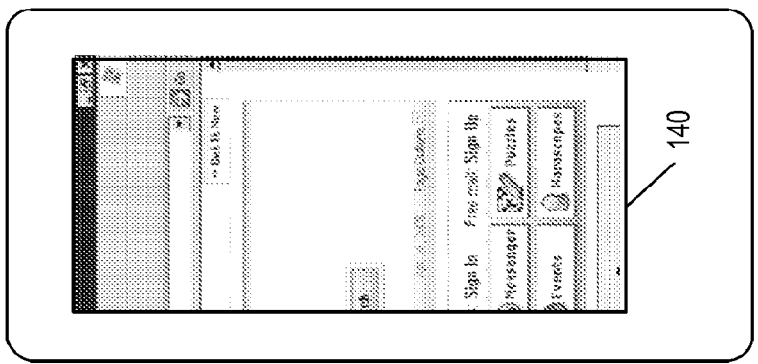
Figure 1C:
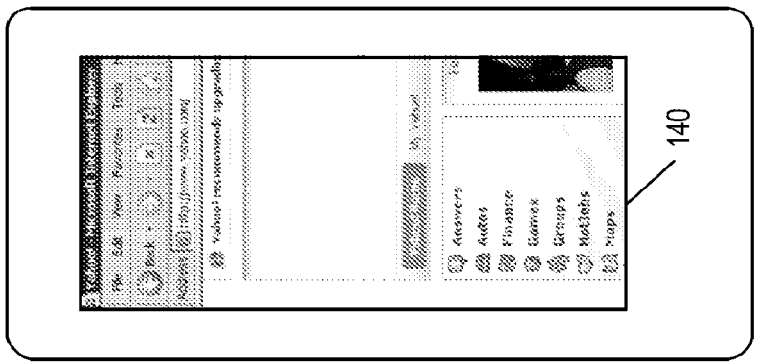

If the user at the client device zooms in on a portion of the remote web browser application 120 to enlarge that portion for viewing on a client device with a small screen (e.g., mobile phone), then the user needs to constantly manipulate the remote view by adjusting the zoom and scrolling to view different portions of the web browser application 120. FIG. IC shows an example of a client device 135 in which a portion of the remote web browser application 120 has been zoomed in for viewing on the display 140 of the client device 135 (e.g., smartphone). In this example, only a portion of the GUI 122 is visible. As a result, the user at the client device has to adjust the zoom and/or scroll the remote view on the display 140 to view the GUI 122. FIG. 1D shows another example in which a different portion of the GUI 122 is visible on the display 140. FIG. 1E shows an example in which the GUI 122 is not visible at all on the display 140. The different portions of the web browser application 120 displayed in FIGS. 1C to 1E are shown in FIG. 1B in dashed boxes. Thus, interacting with a remote application running on a server from a client device (e.g., smartphone) can be very cumbersome and difficult.

Figure 2:
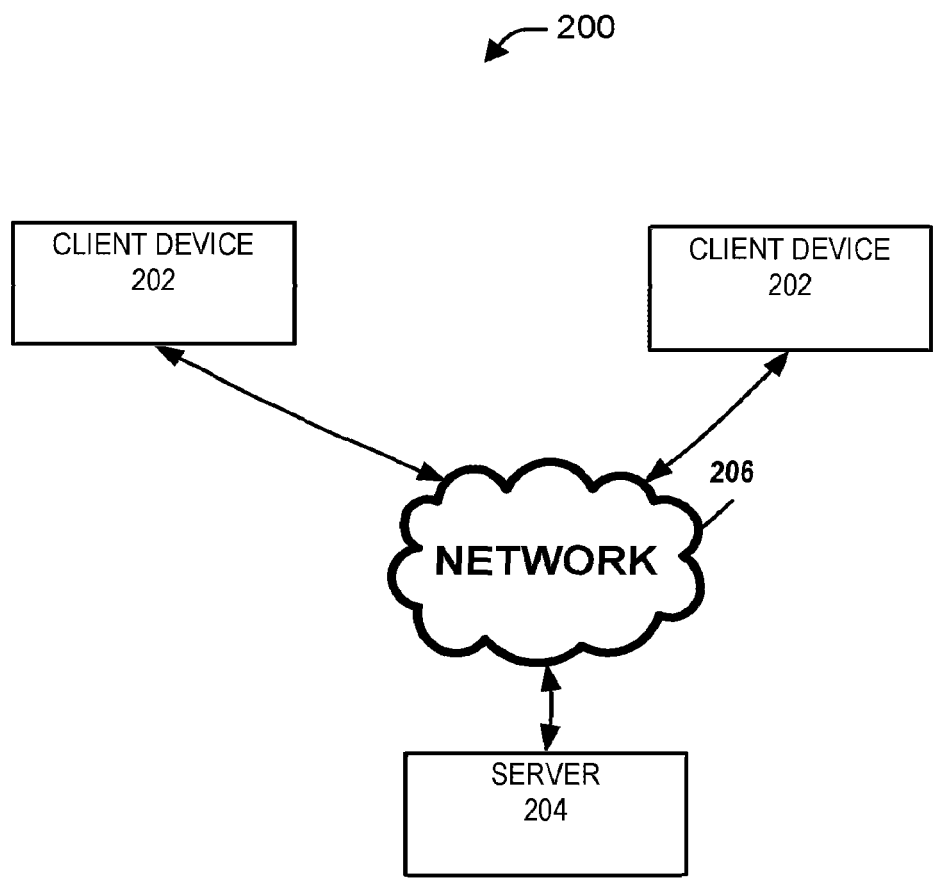
FIG. 2 is a conceptual block diagram of a computer network according to certain aspects of the present disclosure.

FIG. 2 illustrates a simplified diagram of a system 200 in accordance with an aspect of the present disclosure. The system 200 may include one ore more remote client devices 202 in communication with a server computing device 204 (server) via a network 206. In one aspect, the server 204 is configured to allow remote sessions (e.g., remote desktop sessions) wherein users can access applications and files on the server 204 by logging onto the server 204 from a client device 202. Such a connection may be established using any of several well-known techniques such as the Remote Desktop Protocol (RDP) on a Windows-based server.

By way of illustration and not limitation, in one aspect of the disclosure, stated from a perspective of a server side (treating a server as a local device and treating a client device as a remote device), a server application is executed (or runs) at a server 204. While a remote client device 202 may receive and display a view of the server application on a display local to the remote client device 202, the remote client device 202 does not execute (or run) the server application at the remote client device 202. Stated in another way from a perspective of the client side (treating a server as remote device and treating a client device as a local device), a remote application is executed (or runs) at a remote server 204.

By way of illustration and not limitation, a client device 202 can represent a computer, a mobile phone, a laptop computer, a thin client device, a personal digital assistant (PDA), a portable computing device, or a suitable device with a processor. In one example, a client device 202 is a smartphone (e.g., iPhone, Android phone, Blackberry, etc.). In certain configurations, a client device 202 can represent an audio player, a game console, a camera, a camcorder, an audio device, a video device, a multimedia device, or a device capable of supporting a connection to a remote server. In one example, a client device 202 can be mobile. In another example, a client device 202 can be stationary. According to one aspect of the disclosure, a client device 202 may be a device having at least a processor and memory, where the total amount of memory of the client device 202 could be less than the total amount of memory in a server 204. In one example, a client device 202 does not have a hard disk. In one aspect, a client device 202 has a display smaller than a display supported by a server 204. In one aspect, a client device may include one or more client devices.

In one aspect, a server 204 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a server 204 can be stationary. In another aspect, a server 204 can be mobile. In certain configurations, a server 204 may be any device that can represent a client device. In one aspect, a server 204 may include one or more servers.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client device 202 and a server 204 are remote with respect to each other, a client device 202 may connect to a server 204 over a network 206, for example, via a modem connection, a LAN connection including the Ethernet or a broadband WAN connection including DSL, Cable, T1, T3, Fiber Optics, Wi-Fi, or a mobile network connection including GSM, GPRS, 30, WiMax or other network connection. A network 206 can be a LAN network, a WAN network, a wireless network, the Internet, an intranet or other network. A network 206 may include one or more routers for routing data between client devices and/or servers. A remote device (e.g., client device, server) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. But the subject technology is not limited to these examples.

According to certain aspects of the present disclosure, the terms "server" and "remote server" are generally used synonymously in relation to a client device, and the word "remote" may indicate that a server is in communication with other device(s), for example, over a network connection(s).

According to certain aspects of the present disclosure, the terms "client device" and "remote client device" are generally used synonymously in relation to a server, and the word "remote" may indicate that a client device is in communication with a server(s), for example, over a network connection(s).

In one aspect of the disclosure, a "client device" may be sometimes referred to as a client or vice versa. Similarly, a "server" may be sometimes referred to as a server device or vice versa.

In one aspect, the terms "local" and "remote" are relative terms, and a client device may be referred to as a local client device or a remote client device, depending on whether a client device is described from a client side or from a server side, respectively. Similarly, a server may be referred to as a local server or a remote server, depending on whether a server is described from a server side or from a client side, respectively. Furthermore, an application running on a server may be referred to as a local application, if described from a server side, and may be referred to as a remote application, if described from a client side.

In one aspect, devices placed on a client side (e.g., devices connected directly to a client device(s) or to one another using wires or wirelessly) may be referred to as local devices with respect to a client device and remote devices with respect to a server. Similarly, devices placed on a server side (e.g., devices connected directly to a server(s) or to one another using wires or wirelessly) may be referred to as local devices with respect to a server and remote devices with respect to a client device.

Figure 3:
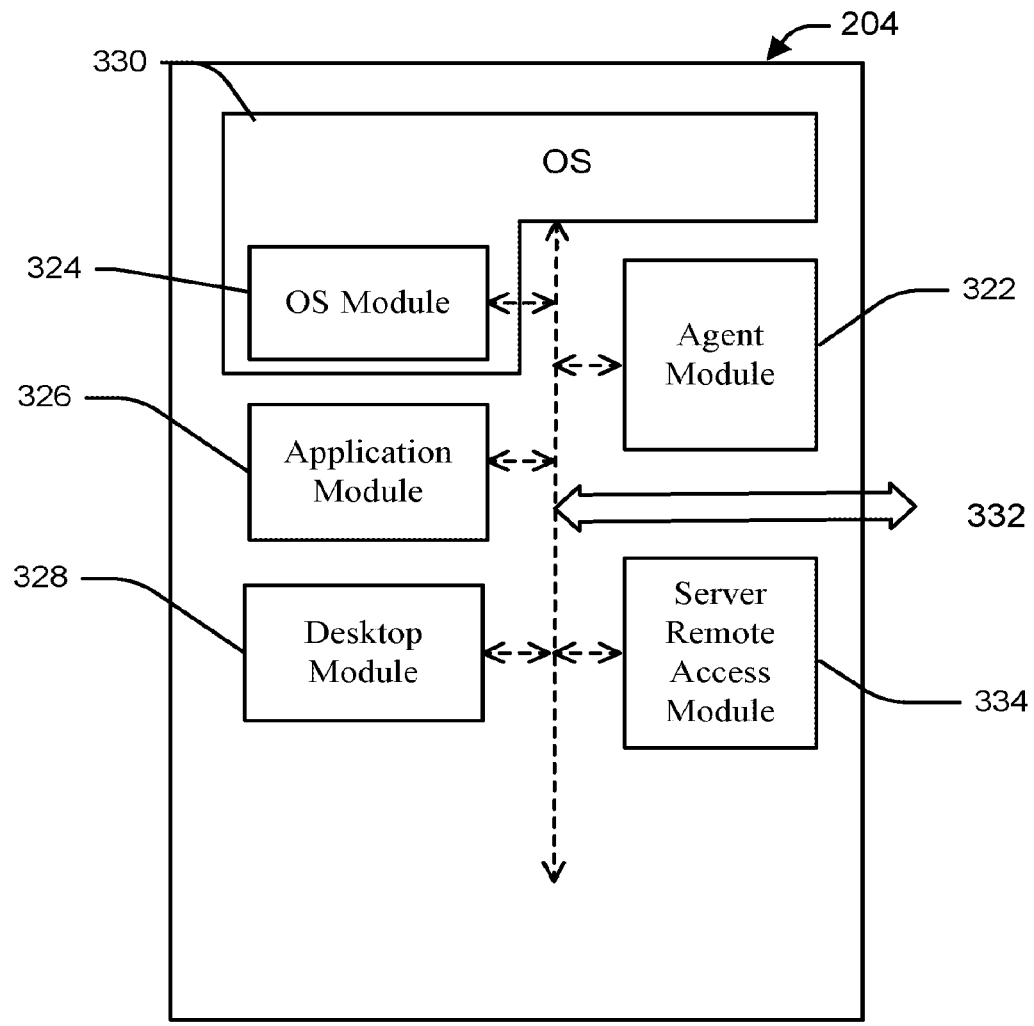
FIG. 3 is a conceptual block diagram of a server according to certain aspects of the present disclosure.

FIG. 3 illustrates a simplified block diagram of a server 204 in accordance with an aspect of the present disclosure. The server 204 comprises an agent module 322, an OS module 324, one or more application control modules 325, a desktop module 328, a server remote access module 334 and an operating system (OS) 330 in communication with the modules. In one aspect, the OS module 324 can be a part of the OS 330. The server 204 is communicatively coupled with the network 206 via a network interface 332. The modules can be implemented in software, hardware and/or a combination of both. Features and functions of these modules according to various aspects are further described in the present disclosure.

Figure 4:
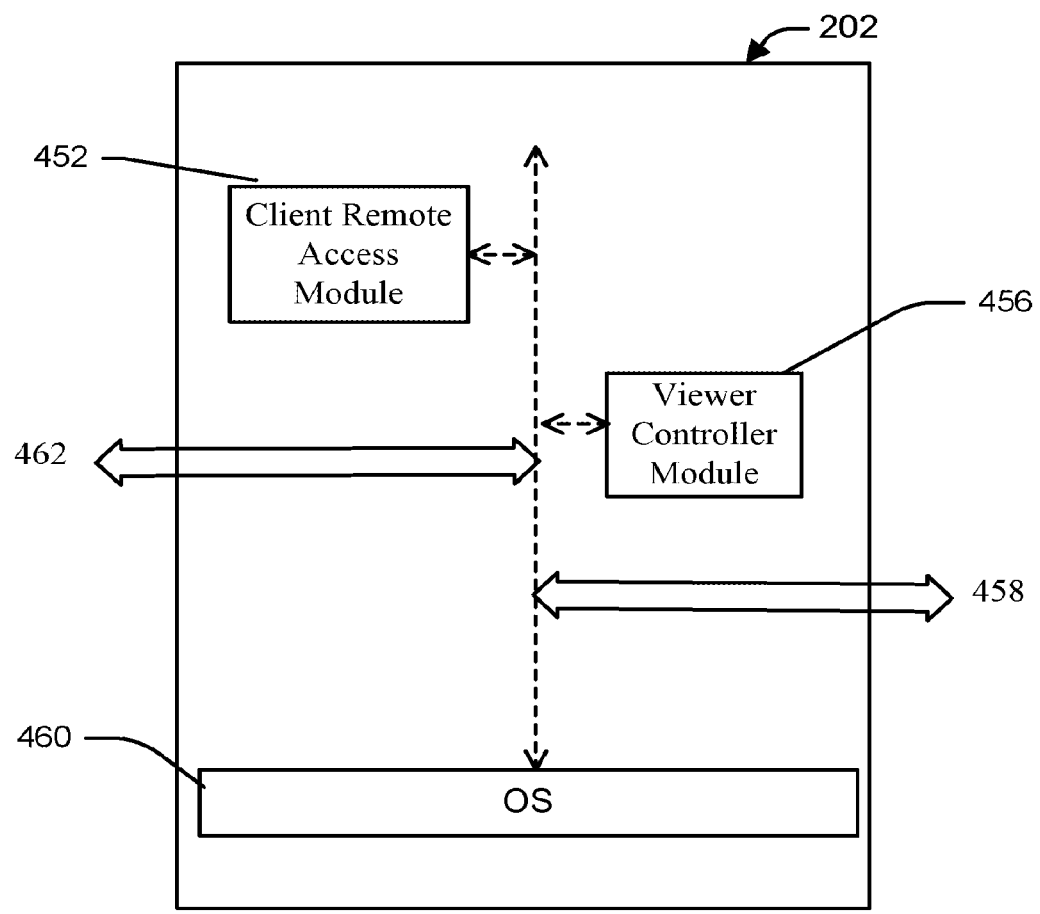
FIG. 4 is a conceptual block diagram of a client device according to certain aspects of the present disclosure.

FIG. 4 illustrates a simplified block diagram of a client device 202 in accordance with an aspect of the present invention. The client device 202 comprises a viewer controller (VC) module 456, a client remote access module 452 and an operating system (OS) 460 in communication with the modules. The modules are further in communication with various user interface devices (not shown in FIG. 4) via a human interface devices (HID) connection 458.

The user interface devices may include one or more output devices (e.g., one or more of a display, a speaker, or other audio, image or video output devices) and one or more input devices (e.g., one or more of a keyboard, a mouse, a trackball, a microphone, a stylus, a touch screen, a touch pad, a pen, a tablet, or other audio, image or video input devices). The modules are also in communication with the network 206 via a network connection 462. The modules can be implemented in software, hardware and/or a combination of both. Additional features and functions of these modules according to various aspects of the present disclosure are further described in the disclosure.

Figure 5B:
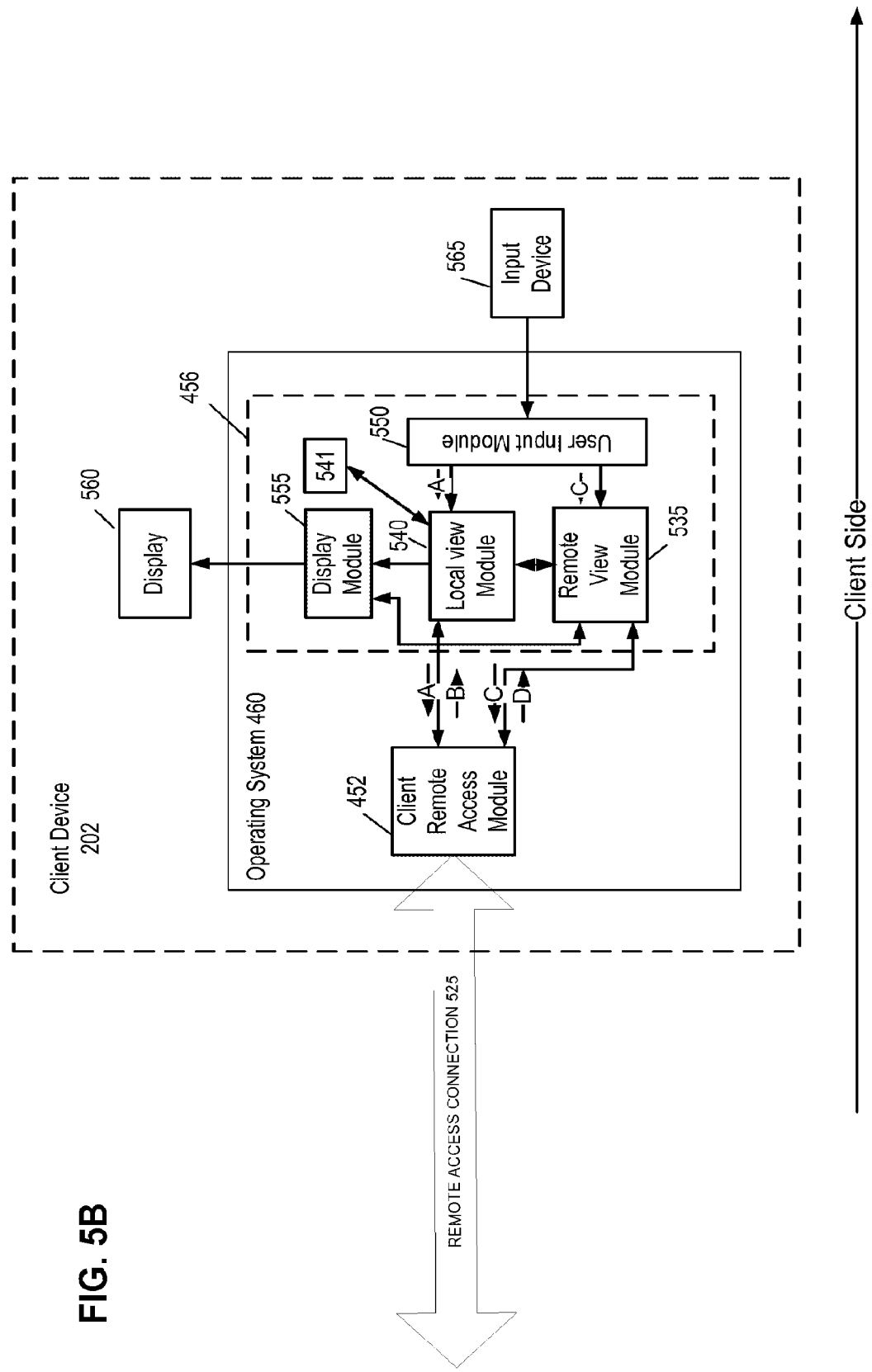
FIG. 5B is a conceptual block diagram of a client according to certain aspects of the present disclosure.
Figure 8A:
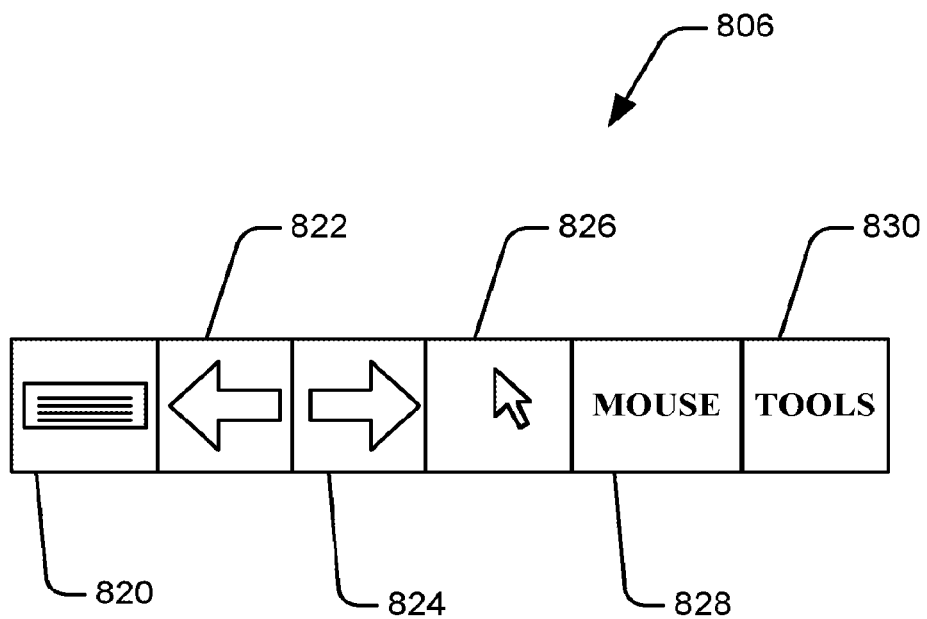
FIG. 8A illustrates an example of a local GUI according to certain aspects of the present disclosure.

FIGS. 8A and 5B are conceptual block diagrams illustrating a server 204 and a client device 202 according to an aspect of the disclosure.

Referring to FIG. 8A, the server 204 may comprise the server remote access module 334 and the agent module 322. The server remote access module 334 is configured to establish a remote access connection 525 with the client device 202 to provide the client device 202 with remote access to a desktop and/or applications running on the server 204. The server remote access module 334 may comprise a remote access application and may communicate with the client device 202 over a network 206 based on a remote access protocol (e.g., RDP/ICA), other protocols or a combination of protocols. Remote access applications allow a user at a client device to remotely access a desktop and/or application running on a server. Examples of remote access applications include, but are not limited to, the Microsoft® Remote Desktop Protocol (RDP) application and the Citrix® Independent Computing Architecture (ICA) application.

The server remote access module 334 is also configured to receive command messages from the client device 202 and communicate the received command messages to the agent module 322. The agent module 322 may be configured to control a desktop and/or application running on the server 204 based on the received command messages, as described further below.

The server 204 further comprises an application module 326, the desktop module 328 and the OS module 324. The application module 326 comprises an application 327 and an application control module 325. An application 327 may include one or more applications. The application 327 may include, for example, a web browser application, a word processing application, a spreadsheet application, a game application, an audio application, and/or other applications. The application 327 may also include applications for rendering multi-media content including, for example, Adobe® Acrobat, Microsoft® Silverlight, and/or other applications. In one example, the application 327 is executed (or runs) at the server 204, and the client device 202 does not execute (or run) the application 327 locally at the client device 202.

An application control module 325 may include one or more application control modules. The application control module 325 may be configured to control the application 327 based on commands from the agent module 322. The application control module 325 may comprise one or more ActiveX controllers for controlling Windows-based applications or other types of controller. The application control module 325 may also control the applications based on user inputs received by the remote access module 334 from the client device 202. The user inputs may comprise pointer inputs, keyboard inputs and/or other inputs. The application control module 325 may also control the applications based on events generated by the application 327 or the OS 330.

The desktop module 328 may be configured to generate a desktop that provides a GUI for allowing a user to select and launch applications on the server 204, manage files, and configure certain features of the operating system 330. The GUI may be a server-based GUI presented by the agent module 322. Alternatively, the GUI may be controlled by the agent module 322 and displayed natively on the client device. The desktop may display icons representing different applications that can be launched on the server 204, in which a user can select an application by moving a pointer to the corresponding icon and double clicking on the icon. The OS module 324 may be configured to communicate certain OS events to the agent module 322 and the server remote access module 334, as described further below.

The server 204 further comprises the operating system 330, which may manage and provide communication to and receive communication from the modules and application shown in FIG. 8A. The operating system 330 may also manage multiple remote user sessions allowing multiple client devices to remotely access the server 204. The operating system 330 may include Microsoft® Windows, Linux, Unix, Mac OS or another operating system. Although the server remote access module 334 is shown separately from the operating system 330, the server remote access module 334 may be considered part of the operating system 330. For example, the remote access module 334 may comprise an RDP application that comes pre-installed on the server 204 as part of Microsoft® Windows.

Referring now to FIG. 5B, the client device 202 may comprise the client remote access module 452 and the viewer controller module 456. The client remote access module 452 may be configured to communicate with the server 204 over a network 206 to remotely access a desktop and/or applications running on the server 204. The client remote access module 452 may communicate with the server remote access module 334 based on a remote access protocol (e.g., RDP/ICA), other protocols or a combination of protocols. In one aspect, the client remote access module 452 may be configured to receive display output data of a desktop and/or application running on the server 204 from the server remote access module 334 over a network 206.

In one aspect of the disclosure, display output data may comprise visual/audio information that a user located at a server 204 would have seen on a display at the server (e.g., a "virtual" display) and/or would have heard from an audio output such as a speaker at the server (e.g., a "virtual" speaker). In one aspect, the display output data may comprise an image (e.g., bitmap) and/or drawing commands of the display output of a desktop and/or application running on the server 204. In one aspect, drawing commands provide instructions or information to a display system as to what is to be drawn on a display. The instructions or information may include, for example and without limitation, the location, texture, geometry, shading, light intensity, or color, or any combination therein, of a pixel or group of pixels of the display. In some aspects, a drawing command corresponds to multiple pixels. Still in some aspects, a drawing command corresponds to a single pixel of a display. In some aspects, drawing commands may include raster operations. In one aspect of the disclosure, the phrase "display output data" may be sometimes referred to as "display data", "display output" or vice versa.

Figure 6:
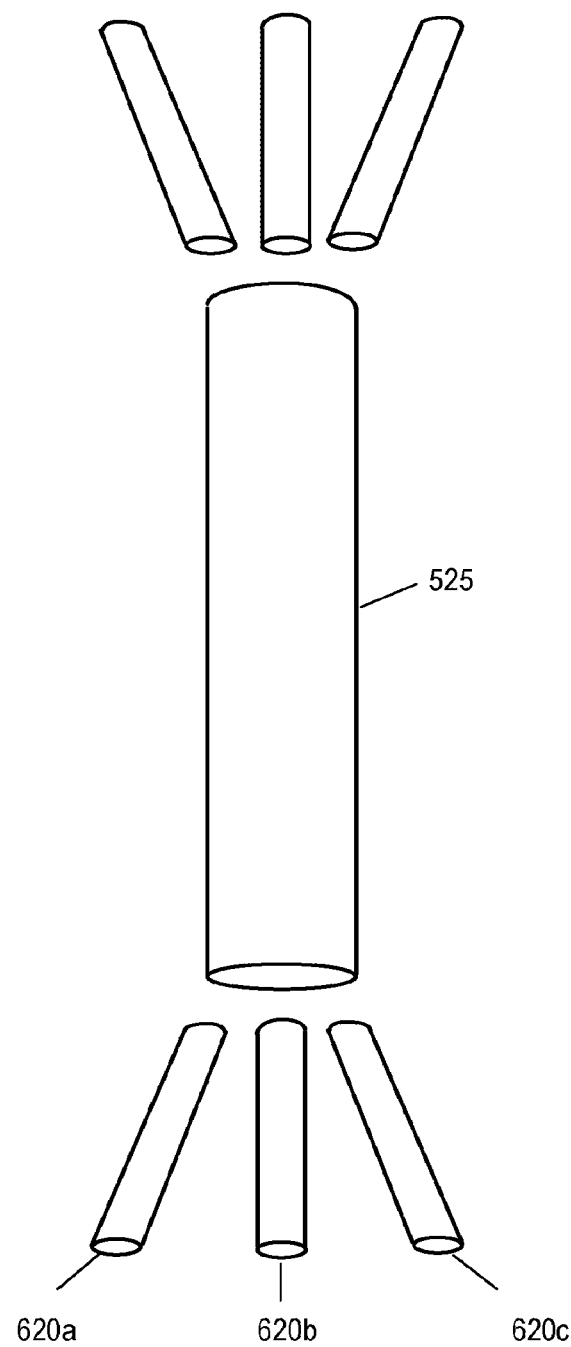
FIG. 6 illustrates an example of a remote access connection.

The client remote access module 452 may be configured to send user inputs to the server remote access module 334 over a network 206. The user inputs may comprise pointer inputs, keyboard inputs and/or other types of input. The client remote access module 452 may also be configured to send command messages to the server remote access module 334, which are described in further detail below. The remote access connection 525 between the server 204 and client device 202 may comprise a plurality of virtual channels for communicating different types of data. For example, a RDP connection may include different virtual channels for display output data and user inputs. FIG. 6 illustrates an example of the remote access connection 525 comprising multiple virtual channels 620*a* to 620*c*.

The viewer controller module 456 may comprise a remote view module 535, a local view module 540 and a display module 555. The remote view module 535 may be configured to receive display output data of a desktop and/or application 327 running on the server 204 from the client remote access module 452 and generate a remote view of the display output data of the remote desktop and/or application. In one aspect of the disclosure, the phrase "remote view" may sometimes be referred to as "remote application view" or vice versa. In one aspect of the disclosure, the term "an application" or "a remote application" may refer to an application, a remote application, a desktop, or a remote desktop.

The local view module 540 may be configured to generate a local GUI that allows a user at the client device 202 to remotely control the application 327 running on the server 204. The local view module 540 may generate the local GUI based on a configuration file 541. In one aspect, the file 541 may be generated by the agent module 322 or application module 326 and be sent to the client device 202. The file 541 may fully define the layout, design and logical operation of the local GUI. This would allow the server 204 to update the local GUI in the client device 202 without having to make modifications to the client device 202. The local GUI may provide similar controls as the GUI of the application 327 running on the server 204. The local GUI may include graphical control objects for controlling certain functions of the application 327.

For the example of a web browser application, the graphical control objects of the local GUI may include an address field for entering the address (e.g., URL) of a web page, a refresh button, a go button, and scrollbars. The local GUI is displayed on the local display 560 of the client device 202. A user at the client device 202 may select graphical control objects of the local GUI displayed on the display 560 using an input device 565, for example, a touch screen overlying the display 560. As described further below, the local GUI may be optimized for the display 560 of the client device 202 to provide the user at the client device 202 with a user friendly interface for remotely controlling the application 327 running on the server 204.

The display module 555 may be configured to receive a local GUI from the local view module 540 and a remote application view of a remote desktop and/or a remote application from the remote view module 535 and generate a composite view comprising the local GUI and the remote application view of the remote desktop and/or remote application.

Figure 7:
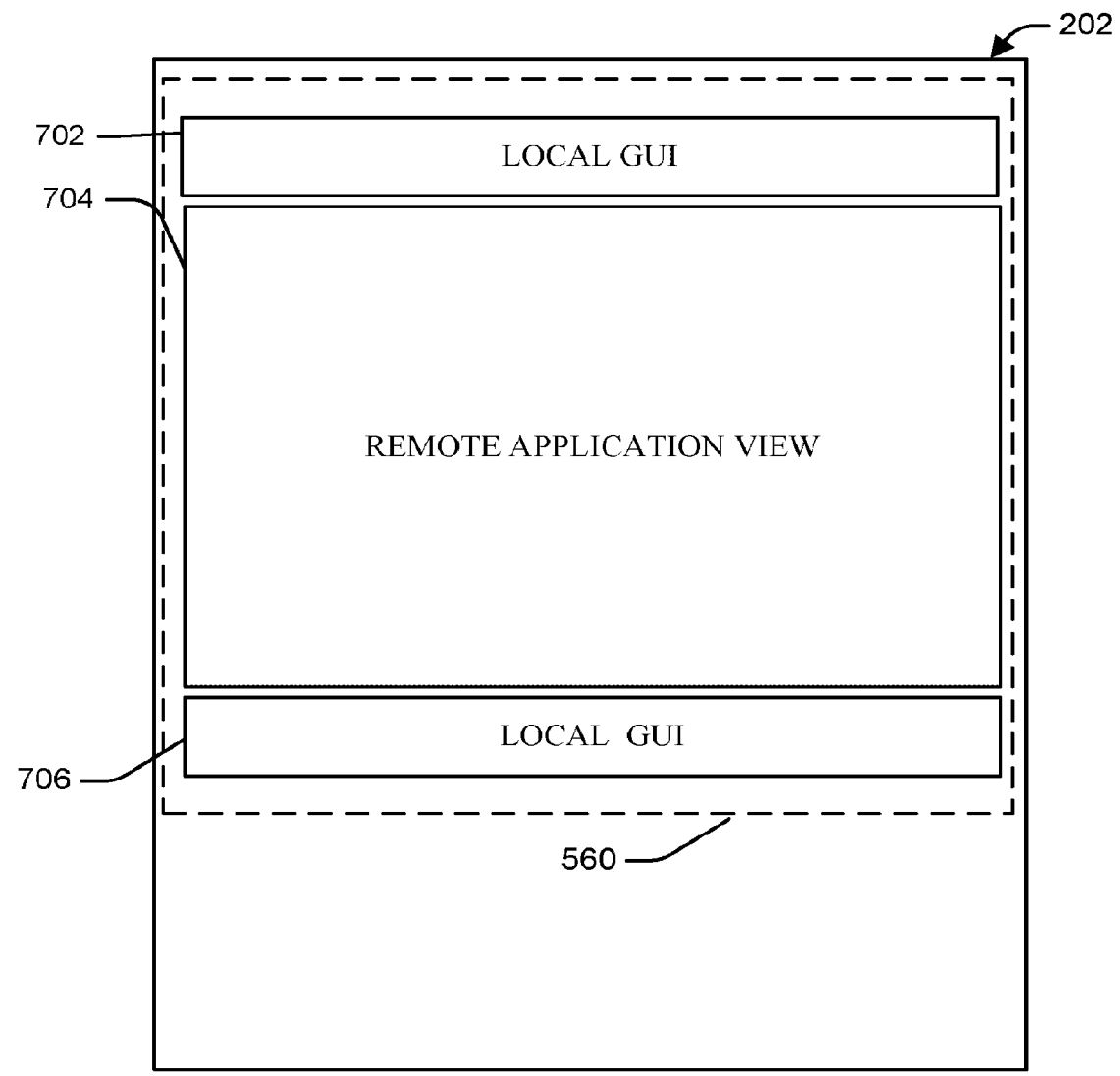
FIG. 7 illustrates a composite view at the client device according to certain aspects of the present disclosure.

FIG. 7 shows an example of a composite view rendered on a display 560 of a client device 202. In this example, the composite view includes a remote application view 704 for viewing an image of the display output of a remote application 327 running on the server 204. The remote application view is based on the display output data of the remote application 327 received from the server 204. The user may manipulate the image of the remote application 327 shown in the remote application view 704. For example, the remote application view 704 may be responsive to, for example, viewing selections by a user such as zooming factor, the depth of the color palette used, viewing angle (pan and tilt) and so on. The viewing selections may be provided in a GUI. The user may also zoom in and out within the remote application view 704 using any technique. For example, the user may zoom in by sliding two fingers on the display 560 away from each other and zoom out by sliding the fingers on the display towards each other on the display 560, which is currently supported by, for example, iPhone and Palm Pre. User inputs within the remote application view 704 are directed to the remote view module 535.

The composite view may also include a local GUI 702 and 706. The local GUI 702 may display a local header for the application shown in the display area 704. In one aspect, the local header may display an application name based on information received from the server 204. In another aspect, the local header may be locally generated (e.g., a remote session window). In yet another aspect, the local header may display an editable text input area, such as an address field for a web browser. The local GUI 706 may display, for example, local control GUI objects such as a local control GUI toolbar. The local control GUI objects may be based on information received from the remote server 204.

The dimensions and layouts of the remote application view 704 and local GUI 702 and 706 are not limited to the example shown in FIG. 7. The remote application view 704 and local GUI 702 and 706 may have other dimensions and layouts, for example, based on the remote application being accessed by the client device 202.

In one aspect, the local GUI 702 and 706 is not generated from the display output of a remote application 327 running on the server 204. For example, the local GUI 702 and 706 is not an image of the remote application's GUI generated from the display output of the remote application 327 running on the server 204. Instead, the local GUI is locally generated by the local view module 540, for example, based on configuration file 541 (shown in FIG. 5B). Furthermore, the configuration file 541 may be received by the local view module 540 by the application control module 325 or the agent module 322.

Figure 8B:
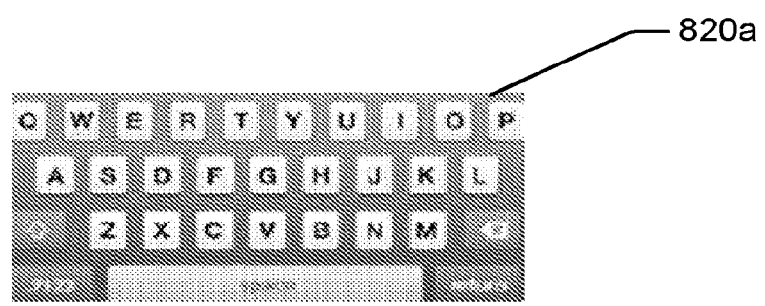
FIG. 8B illustrates an example of a graphical keyboard according to certain aspects of the present disclosure.

FIG. 8A shows an example of a local control GUI 706. The local control GUI 706 comprises a toolbar 806 including graphical control objects. The graphical control objects may include a keyboard icon 820, a BACK arrow 822, a FORWARD arrow 824, a pointer icon 826, a MOUSE icon 828 and a TOOLS icon 830. When a user selects the keyboard icon 820 (e.g., by touching or tapping), the local view module 540 may change the local control GUI 806 to display a graphical keyboard 820*a* for the user to enter text (shown in FIG. 8B). The layout details of a keyboard 820*a* may be provided in a configuration file 541 (shown in FIG. 5B), or may be based on the local GUI tools provided by the OS 460 of the client device 202.

When a user selects the BACK icon 822, the web browser application displays a previously displayed web page. In certain embodiments, the client device 202 may perform this by communicating to the server 204, a control code corresponding to this event. In other embodiments, the client device 202 may include a local cache of previously displayed web pages and may use the cached data to render the previously displayed web page. In a manner similar to the BACK icon 822, the FORWARD icon 824 may be used to render a later viewed web page in the web browser. The pointer icon 826 may allow a user to activate a pointer within the display area of the remote application view 704. The MOUSE icon 828 may allow a user to activate a mouse cursor, which then will invoke mouse movements or mouse clicks, and the TOOLS icon 830 may open further menus containing additional tools, as provided in a configuration file and as provided by the OS 460 of the client device 202.

It will be appreciated by one skilled in the art that, according to one aspect of the disclosure, because the control objects of the local GUI are rendered locally, these objects can be advantageously rendered at the resolution of the local display 560 and can be rendered to have dimensions that can be easily navigated or handled by a user using a finger, a stylus or any other native navigation method(s) provided by the client device 202 (e.g., track-ball, keyboard, etc.). Furthermore, the available display area for the remote application view (e.g., 704) of a remote application can be fully dedicated to content displayed by the remote application by deactivating control GUI objects from the remote application view 704. For example, a web browser executed at a remote server 204 may be displayed in the remote application view 704 after deactivating scrollbars and menu header of the web browser at the server 204. The toolbar and the menu header controls can be provided by the local GUI instead.

Figure 9:
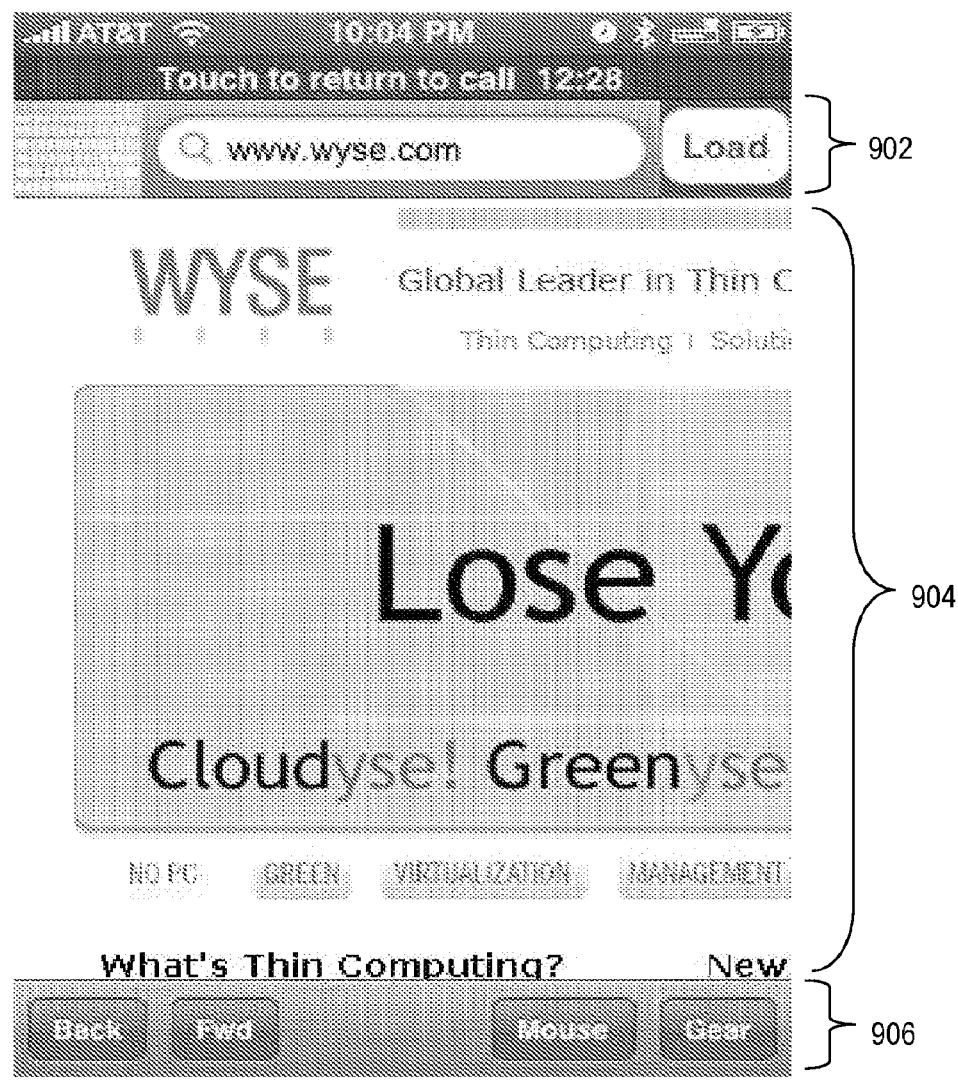
FIG. 9 illustrates a display at the client device according to certain aspects of the present disclosure.

FIG. 9 illustrates an example of a composite view 900 that may be rendered locally on display 560. The composite view 900 comprises the local GUI 902 and 906 and the remote application view 904 of a remote application 327 running on the server 204. In this example, the graphical control objects of the local GUI 902 and 906 include an IP address field, a LOAD button, a BACK button, a FORWARD button, a MOUSE button, and a GEAR button for remotely controlling a web browser application 327 running on the server 204.

Referring to the figures discussed above, various operations of the modules in a 204 sever and in a client device 202 are further described below in accordance with one aspect of the disclosure.

Now referring to FIGS. 5B and 7, the client device 202 may further comprise an input device 560 and a user input module 550. In one example, the input device 560 comprises a touch screen overlaying the display 560. In this aspect, the user may enter user inputs within a display area corresponding to the local GUI 702 and 706 by tapping on a desired graphical control object using a finger or stylus. The user input module 550 may send user inputs to the local GUI 702 and 706 for remotely controlling the application 327 to the local view module 540. For the example of a touch screen, when the user touches a display area corresponding to the local GUI 702 and 706, the user input module 550 directs the corresponding user inputs to the local view module 540. The user inputs may comprise coordinates of the location where the user touched the display 560.

The user may also enter user inputs within a remote application view 704 of a remote application 327 on the display 560. For the example of a touch screen, the user may enter user inputs by moving a pointer (not shown) within a display area corresponding to the remote application view 704 of the remote application 327. In this aspect, the user input module 550 directs user inputs within the remote view 704 to the remote view module 535.

In one aspect of the disclosure, the local view module 540 may be configured to generate a command message based on user inputs to the local GUI 702 and 706 for remotely controlling the application 327 and send the command message to the server 204. For the example of a touch screen, the local view module 540 interprets user inputs to the local GUI 702 or 706 and then translates them into corresponding command messages. In this example, a user input may comprise coordinates of a location where the user touches the local GUI 702 or 706 on the display 560 or coordinates of a pointer within the local GUI 702 or 706 controlled by the user, for example, using a pointer device. The local view module 540 can determine which graphical control object is selected by the user based on the graphical control object in the local GUI 702 and 706 corresponding to the coordinates of the user inputs. The local view module 540 determines the function associated with the selected graphical control object and generates a command message for the server 204 with a command to perform the function. For example, if the user touches the local GUI 702 or 706 (e.g., using a finger) at a location corresponding to a refresh button in the local GUI 702 and 706, then the local view module 540 generates a command message for the server 204 to refresh the web page.

In one aspect, the agent module 322 on the server 204 receives the command message and issues a command to the application control module 325 to control the application 327 based on the command message. For example, if the command message is to refresh the web page, then the agent module 322 instructs the application control module 325 to reload the web page on the web browser application 327. Thus, the local view module 540 generates command messages based on user inputs to the local GUI and sends the command messages to the agent module 322 on the server 204, and the agent module 322 controls the remote application based on the received command messages using the application control module 325.

In one aspect, when a local view module 540 receives one or more user inputs directed to, or placed into, a local GUI (e.g., 702 or 706), the local view module 540 may interpret the one or more user inputs, determine (or identify) function(s) corresponding to the one or more user inputs, and generate one or more command messages corresponding to the function(s) by, for example, translating the one or more user inputs into the command message(s). Determining the function of a user input may, for example, include identifying the type of user input (e.g., a text entry, a button selection, a menu selection) and/or determining a function corresponding to the user input (e.g., a text entry for an IP address field, a selection of a BACK button, etc.). For example, when the user input comprises a selection of a button (e.g., refresh button) in the local GUI (e.g., based on coordinates of a user's touch on the display 560), the local view module 540 may determine the function (e.g., refresh current web page) associated with the selected button. In one aspect, these functions are predetermined. The local view module 540 then generates a command message based on the determined function. Some examples of command messages may include, but are not limited to, a command to load a web page from an IP address, display a previously viewed web page, display a later viewed web page, refresh or reload a current web page, stop loading of a webpage, zoom in or out, switch applications, open bookmarks or history (e.g., for a web browser application), and other commands. A command message may comprise a command packet that is transmitted from the client device 202 to the server 204 using various protocols, compressions and encryption schemes. The server 204 may also send commands and status information to the client device 202. For example, the server 204 may send the client device 202 a web page loading status, a redirected URL or keyboard state.

In one aspect, the remote view module 535 may be configured to send user inputs received within the remote application view 704 to the server 204 via the remote access module 452. The user inputs may include pointer inputs comprising coordinates of pointer movements and clicks (e.g., mouse clicks). For example, the user may move a pointer (not shown) within the remote application view 704 using a touch screen, a touch pad, a trackball, a mouse or other pointer input device. In this example, the coordinates of the pointer movements may be transmitted to the server 204. The user inputs may also include keyboard inputs. The user inputs may enter keyboard inputs using a graphical keyboard (e.g., 820*a*) displayed on the display 560, a keypad or other device. For example, when the user desires to enter text at the location of a pointer or cursor within the remote application view 704, the user may tap on a keyboard icon (e.g., 920) to bring up the graphical keyboard to enter the text. In one aspect, the client device access module 452 may send user inputs comprising pointer inputs (e.g., coordinates of pointer movements) and keyboard inputs to the server 204 using RDP, ICA or other remote access protocol.

In one aspect, the server remote access module 334 may receive the user inputs from the client remote access module 452 over the remote access connection 525 and sends the user inputs to the application control module 325. The application control module 325 interprets the received user inputs and controls the application 327 accordingly.

In one aspect, when an application 327 updates its display output in response to a received command message or user inputs, the remote access module 334 may send updated display output data to the client device 202. The client remote access module 452 receives the updated display output data of the remote application 327 and sends the updated display output data to the remote view module 535. The remote view module 535 then generates an updated image of the display output of the remote application, which is displayed within the remote application view 704 of the display 560.

Aspects of the disclosure allow the user at the client device 202 to remotely view an application running on the server 204 while controlling the application using a local GUI that can be optimized for the display 560 of the client device 202.

An advantage of aspects of the disclosure may be illustrated with reference to FIGS. 9 and 1B. FIG. 9 shows an example of a composite view 900 at the client device 202 for a web browser application running on the server 204, according to an aspect of the disclosure. In this example, the GUI of the application 327 running on the server 204 may be similar to the GUI 122 shown in FIG. 1B, which is designed for a large display. Instead of displaying an image of the remote application's GUI 122 running on the server 204, the local view module 540 advantageously generates and displays a local GUI 902 and 906 for controlling the remote application 327. In one aspect, the local GUI 902 and 906 in FIG. 9 is not based on the display output of the remote application 327. The local GUI 902 and 906 may be optimized for the display 560 of the client device 202. An image of the display output of the remote web browser application 327 is displayed within the remote application view 904 allowing the user at the client device 202 to remotely view the web browser application 327 while remotely controlling the web browser application 327 using the local GUI 902 and 906.

The local GUI 702 and 706 may be designed to have a similar look and feel of a web browser application that is native to the client device (e.g., smartphone). This allows the user at the client device to control a web browser application 327 running on a server 204 in a similar manner as a web browser that is native to the client device (e.g., smartphone), while enjoying the benefits of server-side computing such as increased computing power and resources available on the server 204. For example, a web browser application 327 running on a server has access to plug-in applications on the server 204 for rendering multi-media content. As a result, the plug-in applications do not have to be, for example, loaded onto the client device 202. Another advantage of the local GUI is that it allows a user at the client device 202 to use the application on the server 204 in a user friendly environment without having to extensively rewrite the application port the application to the client device.

In an aspect of the disclosure, the local GUI and the remote application view 704 on the display 560 can be controlled independently. For example, the remote view module 535 may allow the user to adjust the zoom and scroll the image of the remote application 327 within the remote application view 704 while the local view module 540 maintains the size and location of the local GUI 702 and 706 on the display 560. Thus, the local GUI 702 and 706 can remain on the display 560 and be readily accessible to the user while the user manipulates the image of the remote application within the remote application view 704.

In an aspect of the disclosure, the agent module 322 may instruct the application control module 325 to deactivate the GUI of the application 327 so that display output data of the application 327 sent to the client device 202 does not include the GUI of the application. For the example of the web browser 120 running on a server in FIG. 1B, the agent module 322 may deactivate the GUI 122 so that only the display of the web content 124 is sent to the client device 202. This allows a user at the client device 202 to view the web content 124 of the web browser 120 running on the server 204 while controlling the web browser 120 with the local GUI 702 and 706 instead of the remote application's GUI 122 running on the server 204.

The local GUI at the client device 202 is not limited to the example of a web browser application and may be used to remotely control many other applications on the server 204. Examples of applications that may be controlled by local GUIs include word processing applications, spread sheet applications, multi-media player applications, electronic mail applications, and other applications. For the example of a word processing application, the local GUI may include graphical control objects for print, edit, and formatting functions. For a multi-media player, the local GUI may include graphical control objects for play, stop and rewind functions.

In one aspect, the client device 202 may have a plurality of local GUIs for controlling different applications. In this aspect, when the user at the client device 202 remotely launches an application on the server 204, the agent module 322 may determine what type of application was launched. The agent module 322 may then send a message to the client device 202 via the server remote access module 334 indicating the type of application that was launched on the server 204. The client remote access module 452 sends the received message to the local view module 540. The local view module 540 may then select a local GUI from a plurality of local GUIs that matches the type of application indicated by the received message. The agent 322 may also send a configuration file to the client device 202 specifying the local GUI. Thus, the local view module 540 can change the local GUI to adapt to changes in the application running on the server 204.

Figure 10:
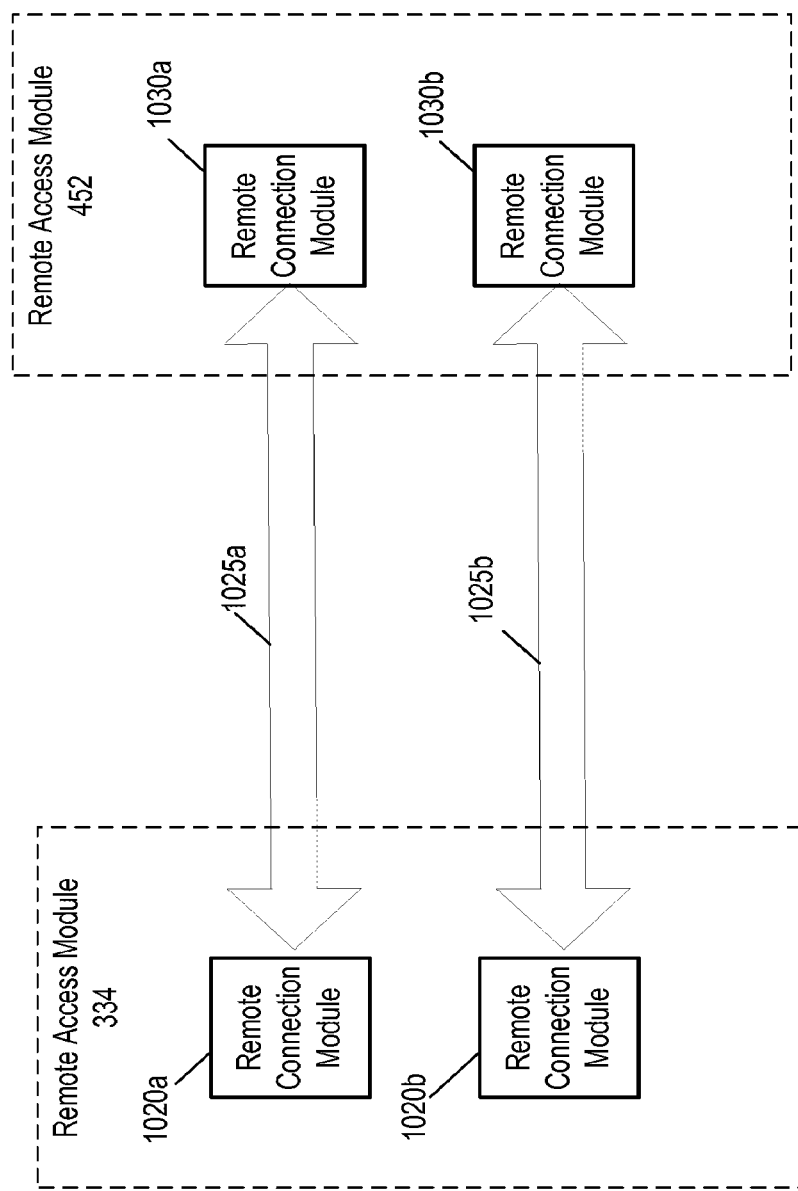
FIG. 10 is a conceptual block diagram of server and client remote access modules according to certain aspects of the present disclosure.

FIG. 10 is a conceptual block diagram illustrating a server remote access module 334 and a client remote access module 452 according to an aspect of the disclosure. In one aspect, a server remote access module 334 comprises first and second server remote connection modules 1020*a* and 1020*b* and the client remote access module 452 comprises first and second client remote connection modules 1030*a* and 1030*b*. The first server remote connection module 1020*a* and the first client remote connection module 1030*a* communicate over connection 1025*a*. The second server remote connection module 1020*b* and the second client remote connection module 1030*b* communicate over connection 1025*b*. The connections 1025*a* and 1025*b* may be established between the server 204 and the client device 202 over a network 206 using different sockets. In this aspect, different types of information may be communicated over the different connections 1025*a* and 1025*b*.

In one aspect of the disclosure, the first server remote connection module 1020*a* and the first client remote connection module 1030*a* are implemented using a remote access application (e.g., RDP application) for communicating display output data and user inputs between the server 204 and the client device 202. The connection 1025*a* may comprise a plurality of virtual channels with different virtual channels carrying display output data (e.g., images or audio output of a remote application) and user inputs (e.g., pointer and keyboard inputs from a user at a client device) between the server 204 and the client device 202.

The second server remote connection module 1020*b* and the second client remote connection module 1030*b* may be configured to communicate command messages over the connection 1025*b*. In this aspect, the second client remote connection module 1030*b* sends command messages from the local view module 540 to the server 204 over the connection 1025*b*. The second client remote connection module 1020*b* communicates the received command messages to the agent module 322. In this aspect, the agent module 322 may manage the connection 1025*b*. In one aspect, the second remote connection module 1020*b* may be integrated with the agent module 322. Thus, in this aspect, the command messages are communicated over a different connection than the display data and user inputs. An advantage of this aspect is that the command messages may be communicated using a different protocol than the display data and user inputs. For example, the display output data and user inputs may be communicated using a remote access protocol (e.g., RDP) while the command messages are communicated using a different protocol. For example, the command messages may be communicated using a protocol having different encryption, compression and/or security features than the remote access protocol.

Figure 11:
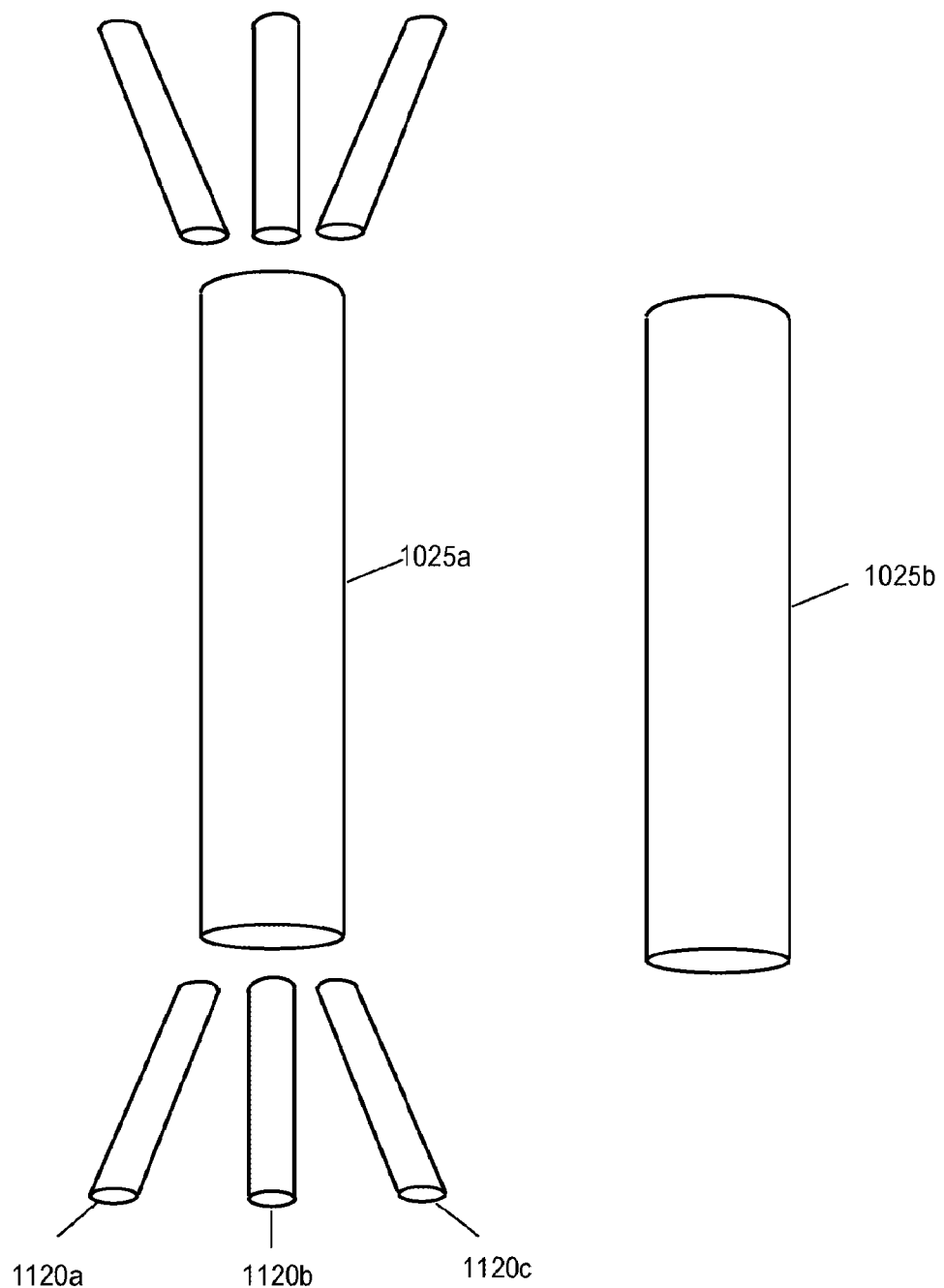
FIG. 11 illustrates an example of a plurality of connections between the server and the client device.

FIG. 11 depicts an example of the connection 1025*a* comprising multiple virtual channels 1120*a* to 1120*c* and the connection 1025*b*. In this example, the connection 1025*a* may be based on a remote access protocol (e.g., RDP) for communicating display output data and user inputs on different virtual channels 1120*a* to 1120*c*. The connection 1025*b* is used to communicate command messages. Alternatively, the command messages may be sent over the connection 1025*a*, in which case the second remote connection modules 1020*b* and 1030*b* may be omitted. For example, the command messages may be sent on a virtual channel of the connection 1025*a* established for command messages. In an aspect, a command message may include a flag or other indicator identifying the message as a command message.

FIGS. 10 and 11 illustrate merely examples of communications between a server and a client device. A server may include one or more remote connection modules (e.g., one, two, three or more), and a client device include one or more remote connection modules (e.g., one, two, three or more).

Figure 12:
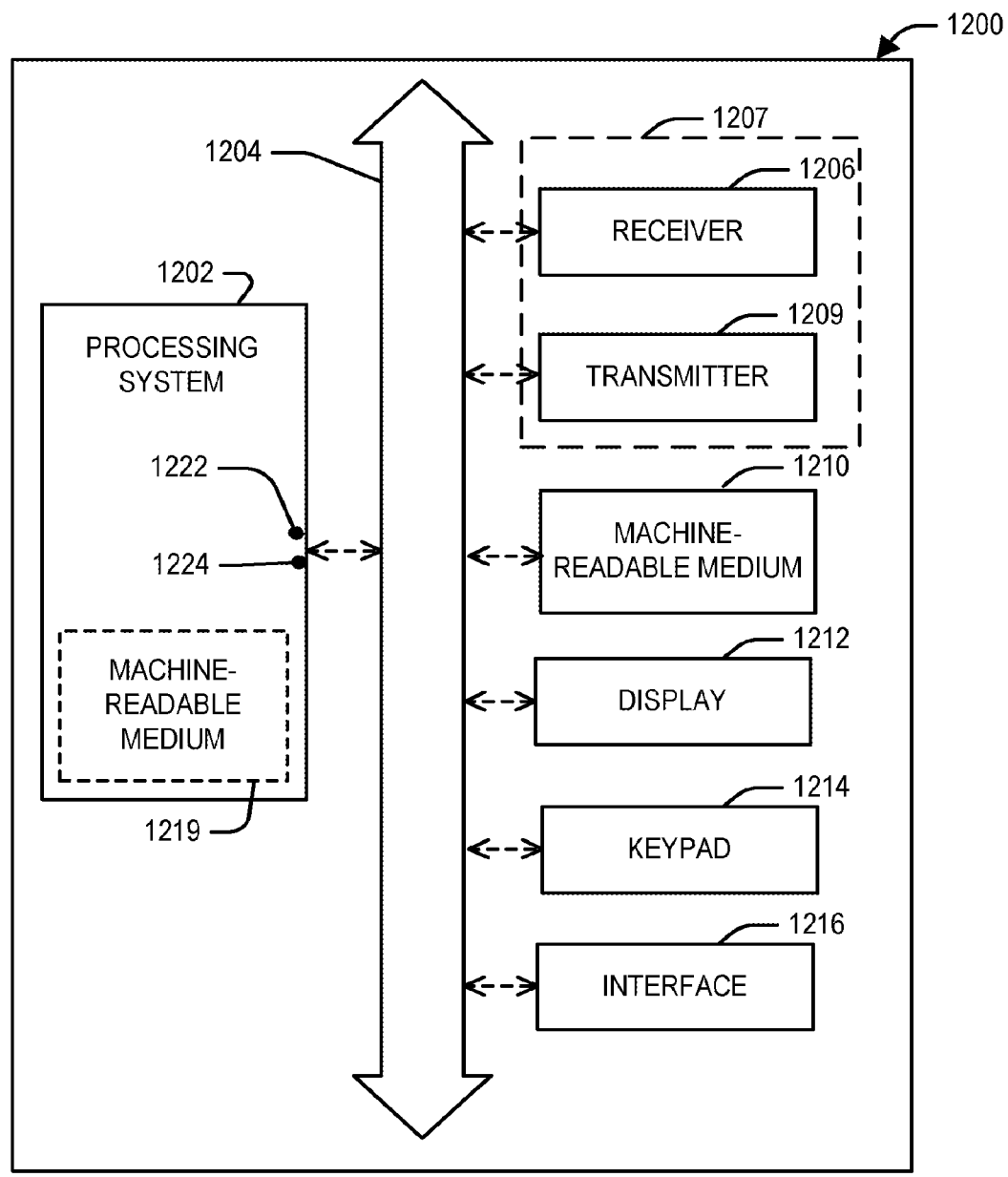
FIG. 12 is a block diagram that illustrates an exemplary computing system in accordance with certain embodiments of the present disclosure.
Figure 13A:
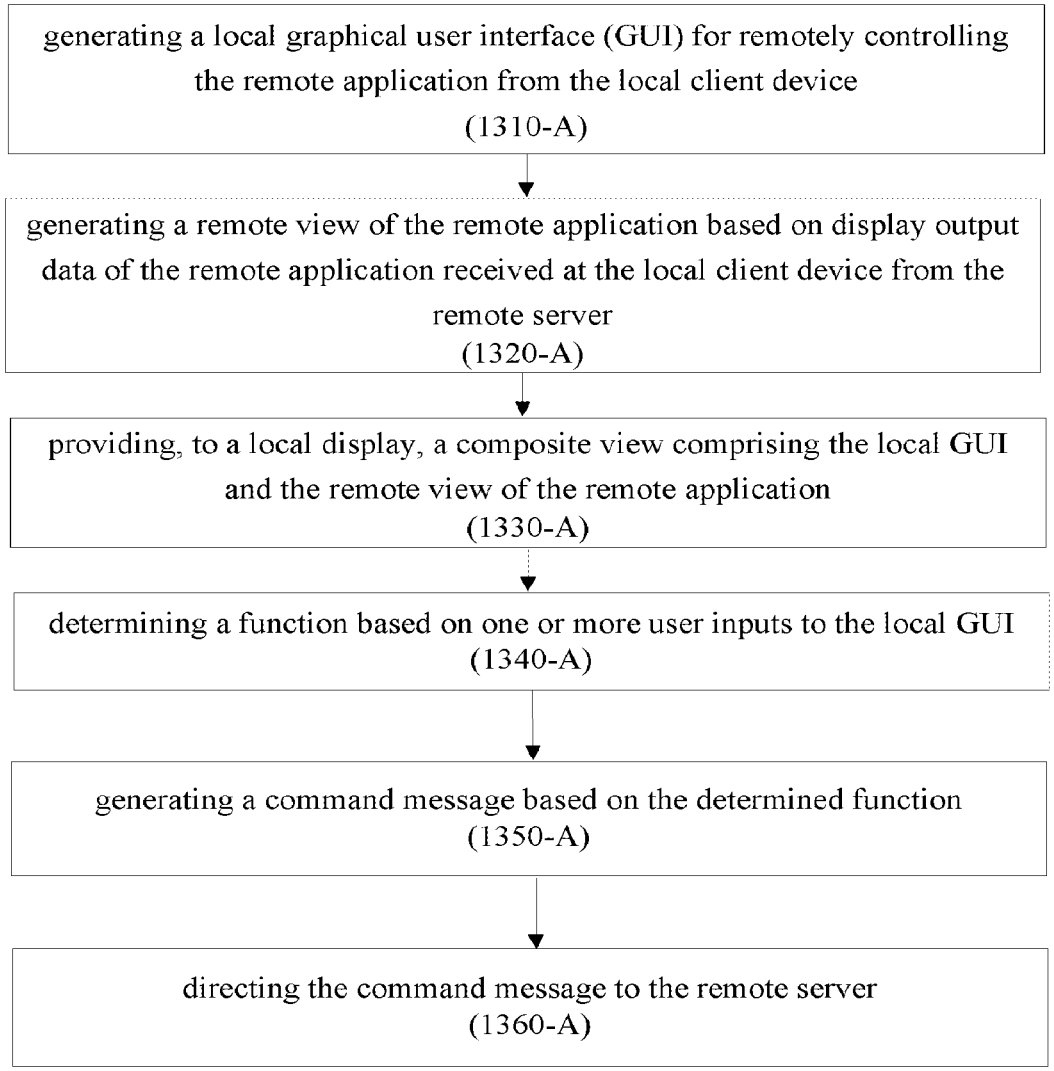
FIG. 13A illustrates an example of an operation of a system according to one aspect of the present disclosure.
Figure 13B:
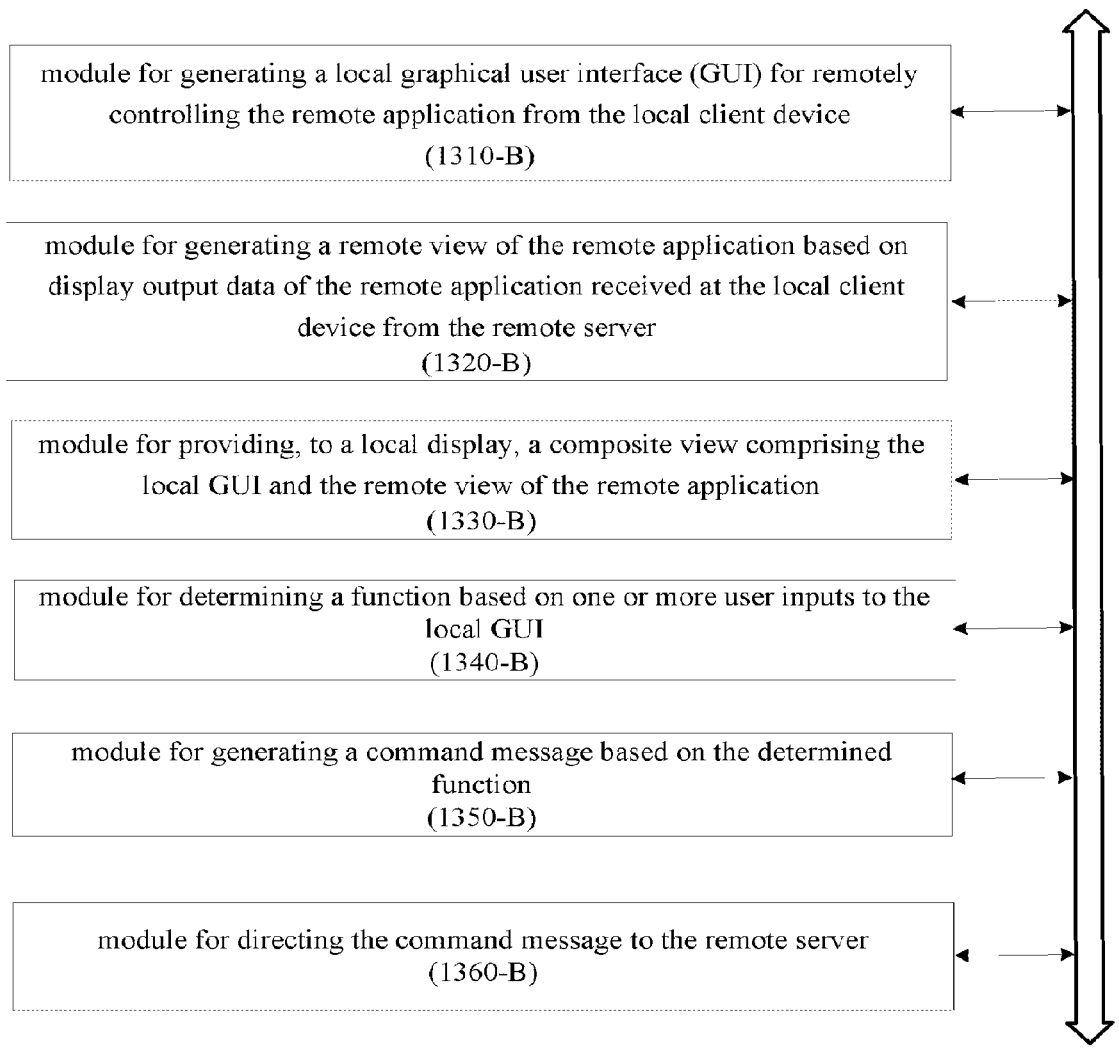
FIG. 13B illustrates an example of a configuration of an apparatus according to one aspect of the present disclosure.

FIG. 12 is a conceptual block diagram illustrating an example of a system.

A system 1200 may be, for example, a client device or a server. The system 1200 includes a processing system 1202. The processing system 1202 is capable of communication with a receiver 1206 and a transmitter 1209 through a bus 1204 or other structures or devices. It should be understood that communication means other than busses can be utilized with the disclosed configurations. The processing system 1202 can generate audio, video, multimedia, and/or other types of data to be provided to the transmitter 1209 for communication. In addition, audio, video, multimedia, and/or other types of data can be received at the receiver 1206, and processed by the processing system 1202.

The processing system 1202 may include a general-purpose processor or a specific-purpose processor for executing instructions and may further include a machine-readable medium 1219, such as a volatile or non-volatile memory, for storing data and/or instructions for software programs. The instructions, which may be stored in a machine-readable medium 1210 and/or 1219, may be executed by the processing system 1202 to control and manage access to the various networks, as well as provide other communication and processing functions. The instructions may also include instructions executed by the processing system 1202 for various user interface devices, such as a display 1212 and a keypad 1214. The processing system 1202 may include an input port 1222 and an output port 1224. Each of the input port 1222 and the output port 1224 may include one or more ports. The input port 1222 and the output port 1224 may be the same port (e.g., a bi-directional port) or may be different ports.

The processing system 1202 may be implemented using software, hardware, or a combination of both. By way of example, the processing system 102 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 1219) may include storage integrated into a processing system, such as might be the case with an ASIC. Machine-readable media (e.g., 1210) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 1202. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a client device or server or by a processing system of a client device or server. Instructions can be, for example, a computer program including code.

An interface 1216 may be any type of interface and may reside between any of the components shown in FIG. 12. An interface 1216 may also be, for example, an interface to the outside world (e.g., an Internet network interface). A transceiver block 1207 may represent one or more transceivers, and each transceiver may include a receiver 1206 and a transmitter 1209. A functionality implemented in a processing system 1202 may be implemented in a portion of a receiver 1206, a portion of a transmitter 1209, a portion of a machine-readable medium 1210, a portion of a display 1212, a portion of a keypad 1214, or a portion of an interface 1216, and vice versa.

Referring back to FIGS. 2 through 5B and 8B, in one aspect of the disclosure, the agent module 322 may be configured to receive notification of events that occur at the server 204 from the OS module 324. For example, the OS module 324 may report certain events to the agent module 322 including when the client device 202 has logged onto the server 204, when an application is launched on the desktop, when a dialog box or new window is opened, when a textbox field is clicked, pointer movements, clicks (e.g., mouse clicks), and/or other events. To receive notification of events, the agent module 322 may register as an events handler with the OS module 324 to receive reports of certain events.

In one aspect of the disclosure, the agent module 322 may determine an action to be taken at the client device 202 based on the reported event. The agent module 322 may then generate a message based on the determined action and send the message to the client device 202 (e.g., via the server remote access module 334). For example, when the event is a click on a textbox, the agent module 322 may determine that a graphical keyboard is to be activated on the client device 202 and send a message to the client device 202 to activate the graphical keyboard 820a. At the client device 202, the local view module 540 receives the message from the agent module 322 and performs an action based on the received message, as discussed further below. In the above example, the local view module 540 may bring up the graphical keyboard 820a on the display 560 in response to the message.

Examples of events that may be reported to the agent module 322 and messages generated by the agent module 322 for the client device 202 based on the reported events are discussed further below.

In one aspect of the disclosure, the OS module 324 may report a click on a textbox to the agent module 322. This may occur, for example, when user inputs (e.g., pointer movements and a click) received from the client device 202 result in a textbox of the application 327 being clicked on. When this event occurs, the agent module 322 may determine that a graphical keyboard is to be activated on the client device 202 for the user at the client device 202 to enter text. The agent module 322 may then generate a message for the client device 202 including a command to bring up the graphical keyboard 820a on the display 560 of the client device 202, and send the message to the client device 202 (e.g., via the server remote access module 334).

On the client side, the client remote access module 452 receives the message and sends the received message to the local view module 540. Upon reading the received message, the local view module 540 brings up the graphical keyboard 820a on the display 560 of the client device 202 to allow the user at the client device 202 to enter text. An example of this is illustrated in FIGS. 14A and 14B.

Figure 14A:
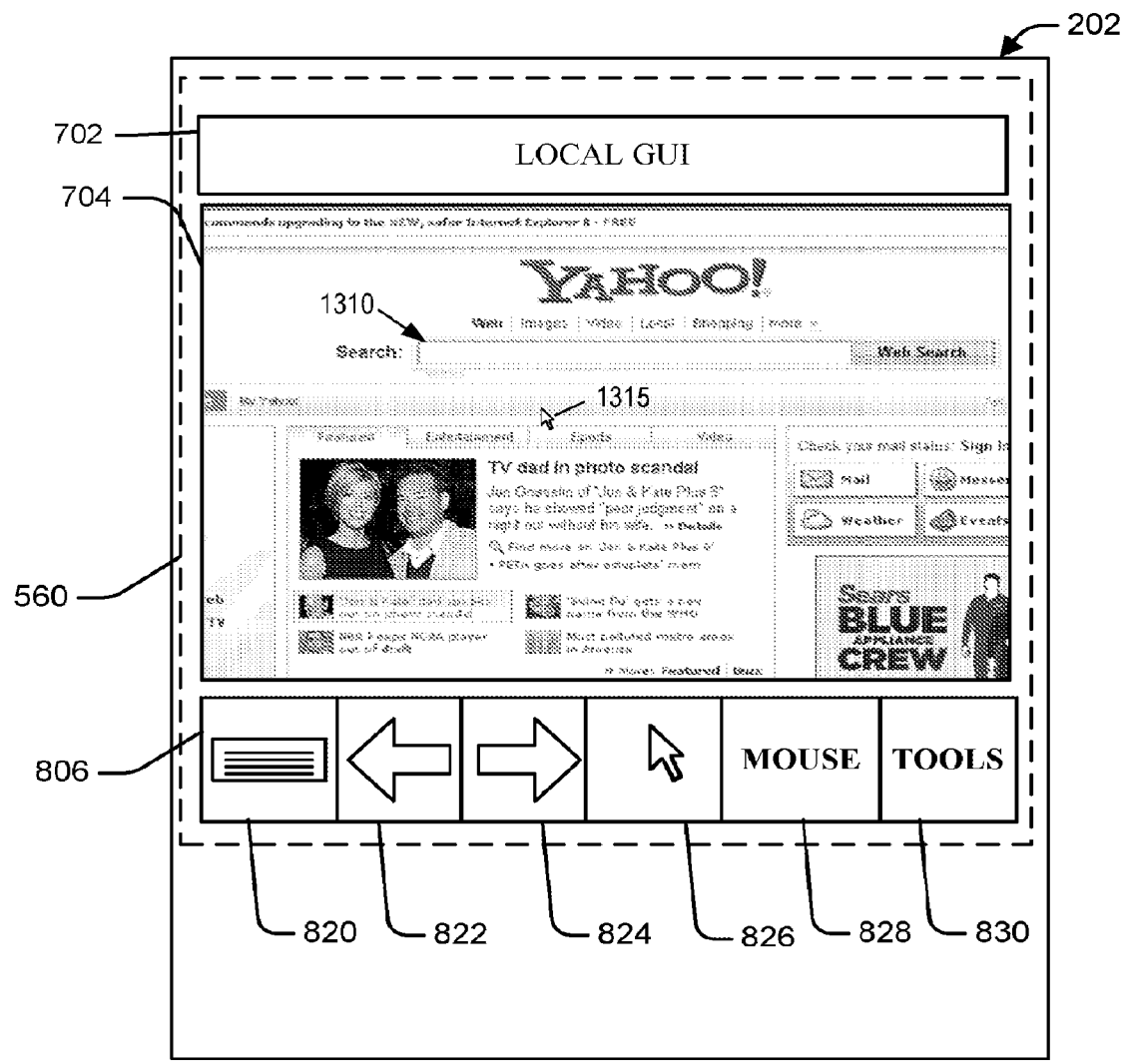
FIG. 14A illustrates an example of a remote application displayed at a client device.
Figure 14B:
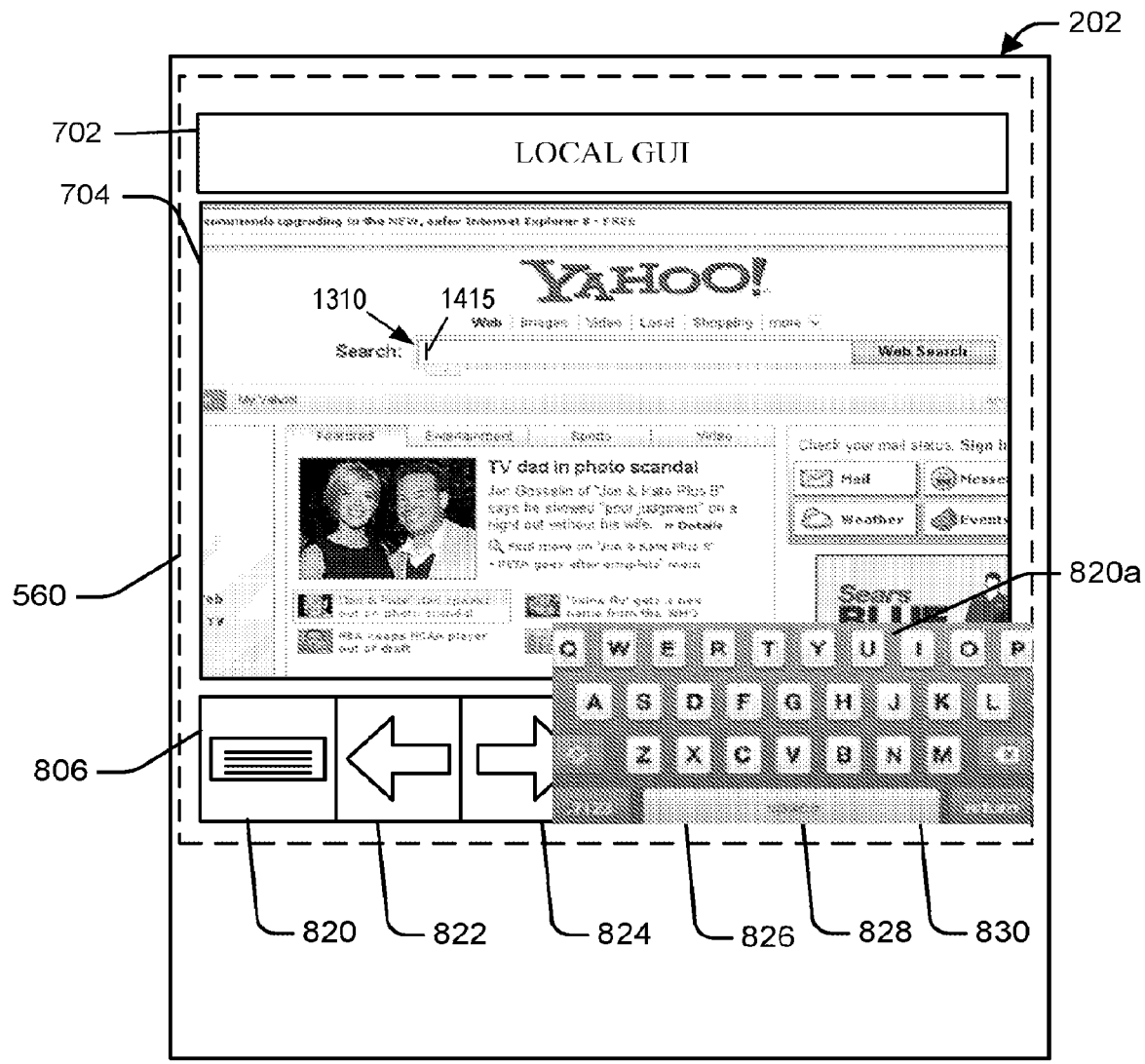
FIG. 14B illustrates an example of a graphical keyboard displayed at the client device for entering text for the remote application.

FIG. 14A shows a display 560 at the client device 202, in which the remote application view 704 displays a web page of a remote web browser application 327. The web page includes a textbox 1310 (e.g., search textbox). In this example, the user at the client device 202 inputs user inputs (e.g., pointer movements and clicks) using a touch screen or other pointer input device at the client device 202. The remote view module 535 sends the user inputs to the server 202 (e.g., via the client remote access module 452). On the server side, the application control module 325 controls the web browser application 327 based on the received user inputs. Updated display output data of the web browser application 327 in response to the user inputs are sent to the client device 202. On the client side, the remote view module 535 updates the image in the remote application view 704 based on the received updated display output data.

On the server side, if a received pointer movement and click result in a textbox being click on, then the OS module 324 reports this event to the agent module 322. The agent module 322 determines that a graphical keyboard 802a is to be activated at the client device 202 and generates a message for the client device 202 including a command to activate the graphical keyboard 820a. The agent module 322 then sends the message to the client device 202. On the client side, the local view module 540 receives the message and brings up the graphical keyboard 820a on the display 560 in response to the message. FIG. 14B shows the display 560 at the client device 202, in which the graphical keyboard 820a is brought up on the display 560 after the textbox 1310 has been click on. An I-beam 1415 or other type of cursor may appear in the textbox 1310 to indicate that text will be entered into the textbox 1310.

As the user at the client device 202 inputs text using the graphical keyboard 820a, the text inputs to the graphical keyboard 820a may be directed to the remote view module 535, for example, as if the user had entered the text using a physical keyboard. The remote view module 535 may then send the user text inputs to the server 204 (e.g., using a RDP/ICA or other remote access protocol). On the server side, the application control module 325 enters the received text into the textbox. Updated display output data showing the inputted text in the textbox is then sent back to the client device 202. In this aspect, when the user at the client device 202 hits the enter button on the graphical keyboard 820a after entering text, the local view module 540 may automatically deactivate the graphical keyboard 820a.

An advantage of this aspect is that the graphical keyboard 820a is automatically brought up on the display 560 when the textbox 1310 is clicked on without requiring the user at the client device 202 to hit the keyboard button 820. This is not possible in other approaches in which only display output data of the remote application 327 is sent to the client device 202. In these approaches, the client device 202 simply displays the display output of the remote application 327 and receives no information about when a textbox of the remote application is clicked on. By contrast, in the above aspect, the agent module 322 determines when the textbox has been clicked on and sends a message to the client device 202 to bring up the graphical keyboard 820a.

Figure 15A:
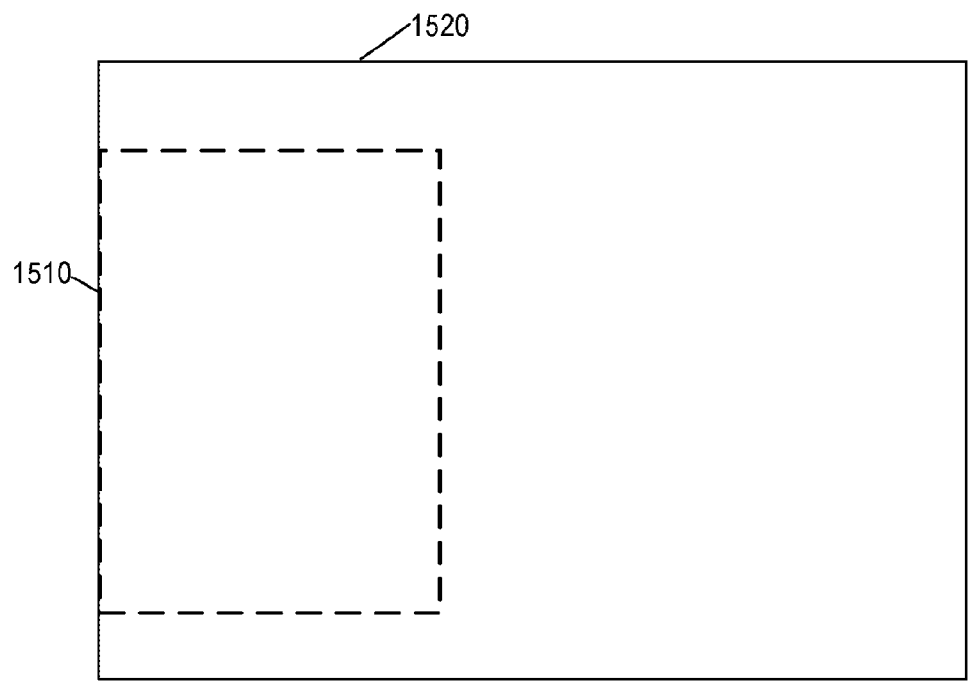
FIG. 15A illustrates an example of an area of the display output of a remote application that is displayed in a remote application view of a client device.

In one aspect, the local view module 540 keeps track of the area of the display output of the remote application 327 that is currently displayed in the remote application view 704. FIG. 15A shows an exemplary area 1510 of the display output 1520 that may be displayed in the remote application view 704. In this example, the total area of the display output 1520 may represent what a user at the server 204 might see on a large display at the server 204. In this example, the server 202 may send the entire display output of the remote application 327 to the client device 204, and the client device 204 may store the entire display output in a machine-readable medium (e.g., cache memory).

Figure 15B:
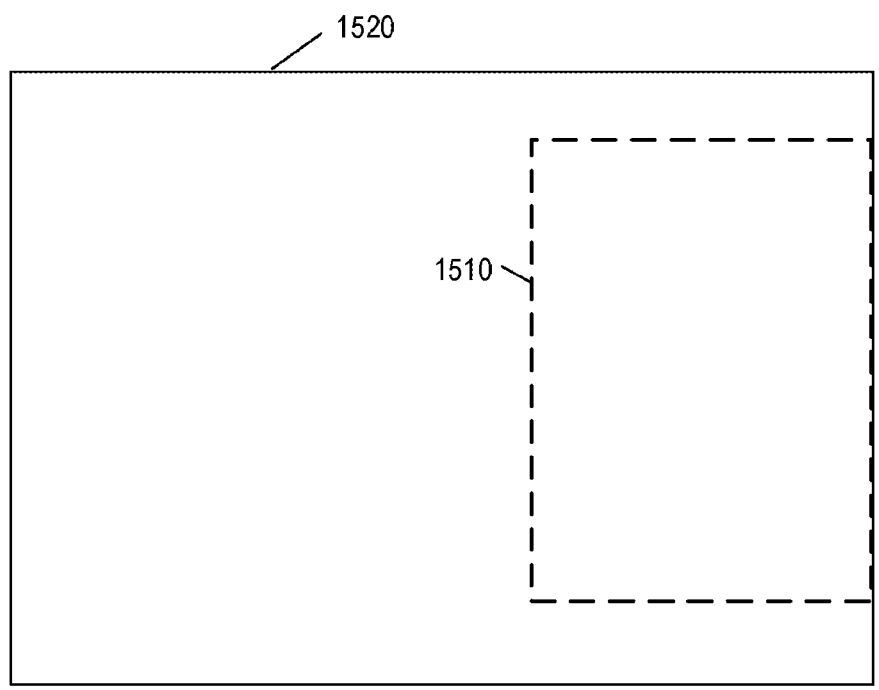
FIG. 15B illustrates an example in which the area of the display output in FIG. 15A is scrolled to the right.

The local view module 540 may then allow the user to manipulate the area 1510 of the display output that is displayed in the remote application view 704. For example, the local view module 540 may allow the user to zoom in by moving two fingers away from each other on a touch screen 565 starting at a desired zoom in location. The local view module 540 may also include zoom in and zoom out buttons on the local GUI 702 and 706. The local view module 540 may also display scrollbars on the display 560 that allow the user to scroll (up, down, left, right) the area 1510 of the display output 1520 displayed in the remote application view 704. FIG. 15B shows an example in which the area 1510 of the display output 1520 displayed in the remote application view 704 has been scrolled to the right. In this aspect, the local view module 540 may send a command to the remote view module 535 specifying which area 1510 of the display output 1520 to display in the remote application view 704 based on inputs from the user. The command may include coordinates and dimensions of the area 1510 to be displayed in the remote application view 704.

As discussed further below, the local view module 540 may keep track of the area 1510 of the display output 1520 displayed in the remote application view 704 to determine whether the user at the client device 202 can view certain events (e.g., a dialog box popup) communicated to the local view module 540 by the agent module 322.

In one aspect of the disclosure, the OS module 324 may report to the agent module 322 when a dialog box and/or window opens as a result of user inputs (e.g., pointer movements and clicks) received from the client device 202. For example, a dialog box may open when a pointer is moved over an object (e.g., icon) and/or when a object is clicked on. The dialog box may display information to the user and/or request information from the user. For an example of a web browser application 327, a new browser window may open when the user clicks on a link.

When the OS module 324 reports that a dialog box and/or window has opened, the agent module 322 may determine that the dialog box and/or window is to be displayed to the user at the client device 202. In this aspect, the OS module 324 may also communicate the coordinates and dimensions of the dialog box or window to the agent module 322. The agent module 322 may then generate a message for the client device 202 including the coordinates and dimensions of the dialog box or window. The agent module 322 may then send the message to the client device 202 (e.g., via the server remote access module 334).

On the client side, the client remote access module 452 receives the message and sends the received message to the local view module 540. Upon reading the received message, the local view module 540 may determine whether the newly opened dialog box or window is currently shown in the remote application view 704. The local view module 540 may do this, for example, by comparing the coordinates and dimensions of the dialog box or window with the coordinates and dimensions of the area 1510 of the display output 1520 displayed in the remote application view 704. If the dialog box or window is not currently shown in the remote application view 704, then the local view module 540 may command the remote view module 535 to scroll and/or zoom out the remote application view 704 by a certain amount so that the dialog box or window is shown in the remote application view 704. The local view module 540 may determine the amount that the remote application view 704 needs to be scrolled and/or zoomed out based on differences between the coordinates and/or dimensions of the dialog box or window and the coordinates and/or dimensions of the area 1510 of the remote application view 704. An example of this is shown in FIGS. 16A and 16B.

Figure 16A:
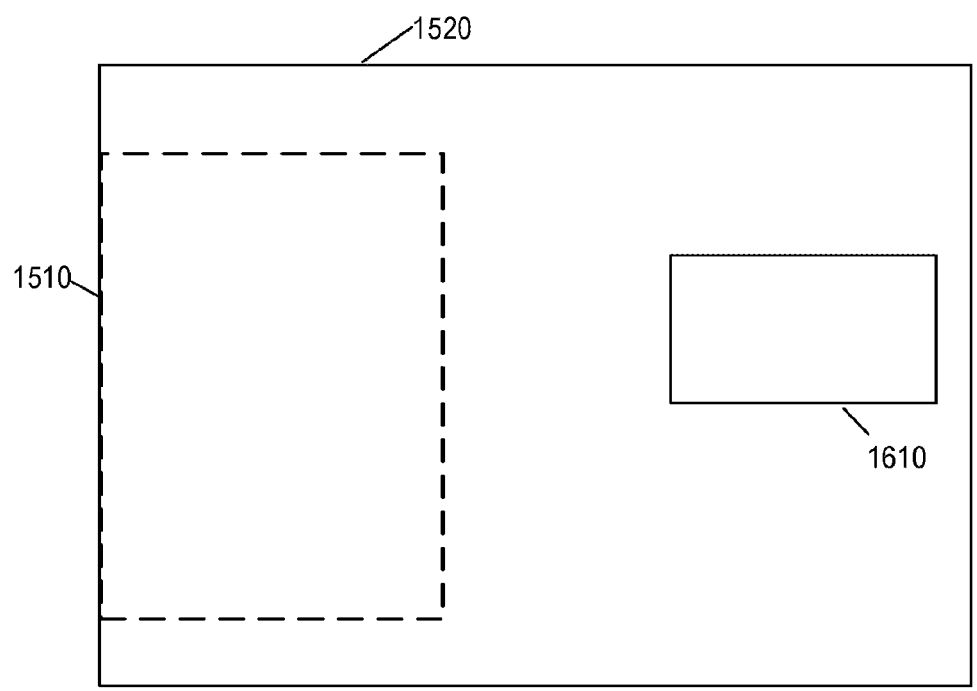
FIG. 16A illustrates an example in which a dialog box or window is located outside the area of the display output displayed in the remote application view.
Figure 16B:
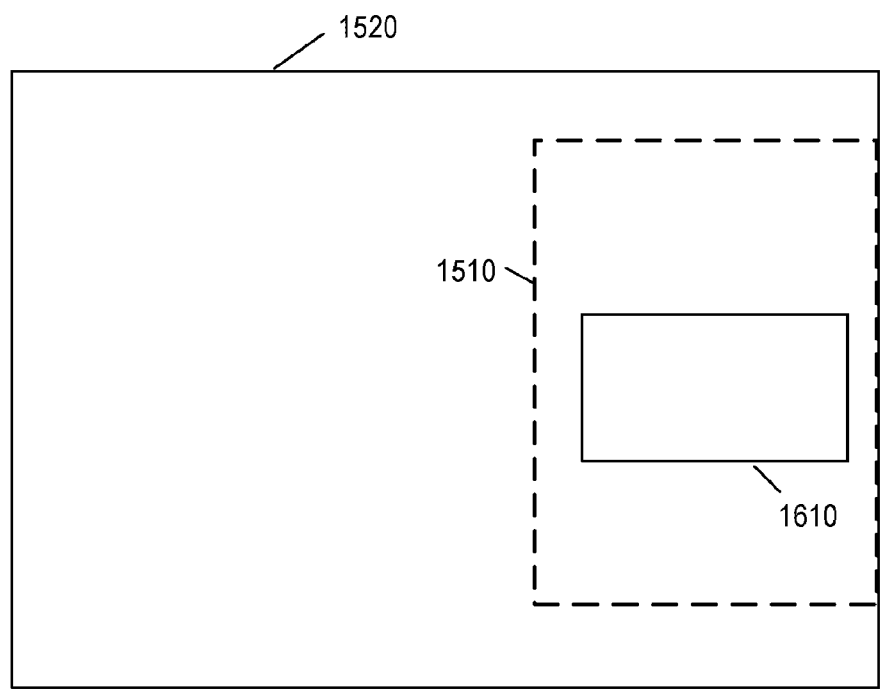
FIG. 16B illustrates an example in which the area of the display output displayed in the remote application view is scrolled to the right to encompass the dialog box or window.

FIG. 16A shows an example in which a dialog box or window 1610 opens outside the area 1510 of the remote application view 704. As a result, the user at the client device 202 cannot see the dialog box or window 1610. For example, the dialog box 1610 may require certain information (e.g., billing information) from the user to continue with a transaction (e.g., purchase). In this example, if the user cannot see the dialog box 1610 at the client device 204, then the user may be unaware that information is being requested.

In this example, the agent module 322 may send the coordinates and dimensions of the dialog box 1610 to the local view module 540 on the client side. The local view module 540 may then determine that the dialog box 1610 is not displayed in the remote application view 704. After making this determination, the local view module 540 may command the remote view module 535 to scroll the remote application view 704 so that the dialog box 1610 is shown in the remote application view 704. FIG. 16B shows an example in which the area 1510 of the remote application view 704 has been scrolled to the right so that the dialog box 1610 is shown in the remote application view 704. The local view module 540 may also command the remote view module 535 to zoom out the remote application view 704 so that the dialog box 1610 is shown in the remote application view 704. This advantageously allows the user at the client 204 to view the dialog box 1610 in order to receive information in the dialog box 1610 and/or enter information requested by the dialog box 1610.

In one aspect, the local view module 540 may notify the user at the client device 202 when a dialog box or window 1610 opens outside the area 1510 of the remote application view 704. In this aspect, the local view module 540 may display an arrow or other indicator on the display 560 indicating the direction of the dialog box or window 1610. The user may then choose whether to scroll the remote view application 704 in the indicated direction to view the dialog box or window 1610.

In one aspect, the OS module 324 may also report to the agent module 322 when the dialog box or window closes. For example, a dialog box may close when the user has entered information requested by the dialog box. In this aspect, the agent module 322 may send a message to the local view module 540 indicating that the dialog box or window has closed. The local view module 540 may then command the remote view module 535 to return the area 1510 of the remote application view 704 back to its original location before the dialog box or window was opened. In other words, the local view module 540 may undo the scrolling and/or zooming when the dialog box or window closes.

In one aspect, the OS module 324 may also report to the agent module 322 when a new web page is loaded in a web browser application 327. The agent module 322 may then send a message to the local view module 540 informing the local view module 540 that a new web page has been loaded. The local view module 540 may then command the remote view module 535 to zoom out the remote application view 704 to show substantially the entire display output 1520. This aspect automatically gives the user at the client device 202 an overview of content in the newly loaded web page. The user may then decide to zoom and/or scroll the remote application view 704 to focus on a desired portion of the new web page.

In one aspect, the OS module 324 may report the current coordinates (e.g., x-y coordinates) of the pointer to the agent module 322. The coordinates of the pointer may refer to coordinates of a pointer moved by the user at the client device 202 using a pointer input device or coordinates of a location where the user touches a display 560 at the client device 202 (e.g., using a touch screen overlaying the display 560). The agent module 322 may use the current coordinates of the pointer to determine whether the pointer is on an object (e.g., picture) in the application 327. The agent module 322 may do this, for example, by determining the coordinates and dimensions of objects in the application 327 and comparing the coordinates and dimensions of the objects with the reported coordinates of the pointer.

For an example of a web browser application 327, the agent module 322 may determine the coordinates (e.g., x-y coordinates) and dimensions (e.g., width and height) of objects (e.g., pictures, icons, animations, banners, etc.) in a web page by analyzing markup language code (e.g., HTML, XML, etc.) for the web page. The agent module 322 may receive the markup language code from the application control module 325. The markup language code for the web page may identify objects in the web page and their locations in the web page. The markup language code may also provide attributes for each object including object type (e.g., picture) and dimensions (e.g., height and width) of the object. The agent module 322 may use this information to determine the types of objects in the web page and the coordinates and dimensions of the objects in the web page. The agent module 322 may make this determination each time a new web page is loaded into the web browser application 327.

In this aspect, when the agent module 322 determines that the pointer is on an object in the application, then the agent module 322 may determine that substantially the entire object is to be displayed at the client device 202. The agent module 322 may then send a message to the client device 202 including information of the object. The information may include object type (e.g., picture) and the coordinates and dimensions of the object. On the client side, the local view module 540 may receive the coordinates and dimensions of the object and use the received coordinates and dimensions of the object to determine whether substantially the entire object is shown in the remote application view 704. The local view module 540 may do this, for example, by comparing the coordinates and dimensions of the object with the coordinates and dimensions of the area 1510 of the remote application view 704.

If the local view module 540 determines that substantially the entire object is not shown in the remote application view 704, then the local view module 540 may command the remote view module 535 to scroll and/or zoom the remote application view module 535 by a certain amount to show substantially the entire object. The local view module 540 may determine the amount based on differences between the coordinates and dimensions of the object and the coordinates and dimensions of the area 1510 of the remote application view 704. An example of this is illustrated in FIGS. 17 and 18.

Figure 17:
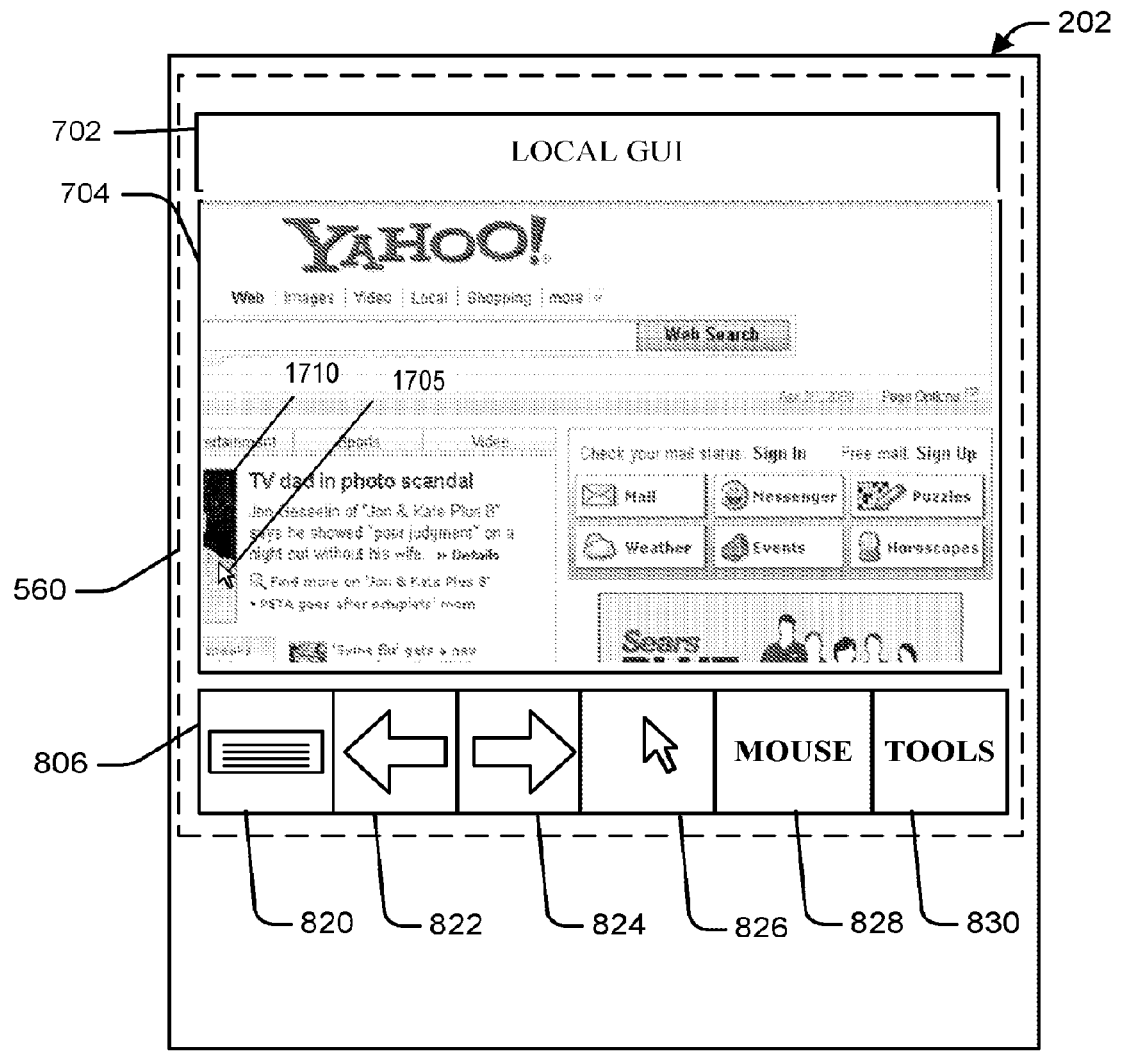
FIG. 17 illustrates an example in which a portion of an object of a remote application is displayed at a client device.
Figure 18:
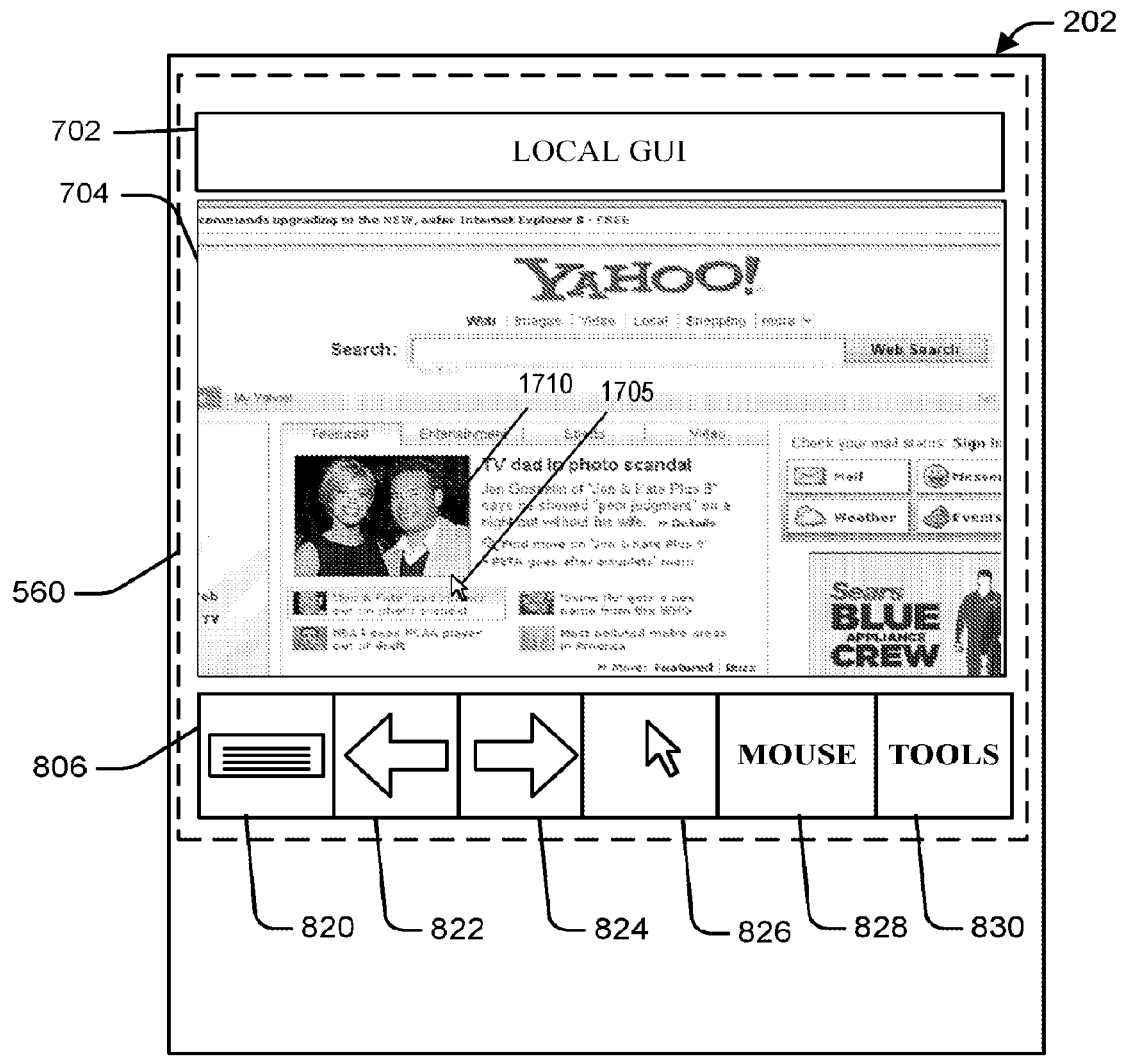
FIG. 18 illustrates an example in which a remote application view of the client device is scrolled to the right to reveal the entire object of the remote application.
Figure 19A:
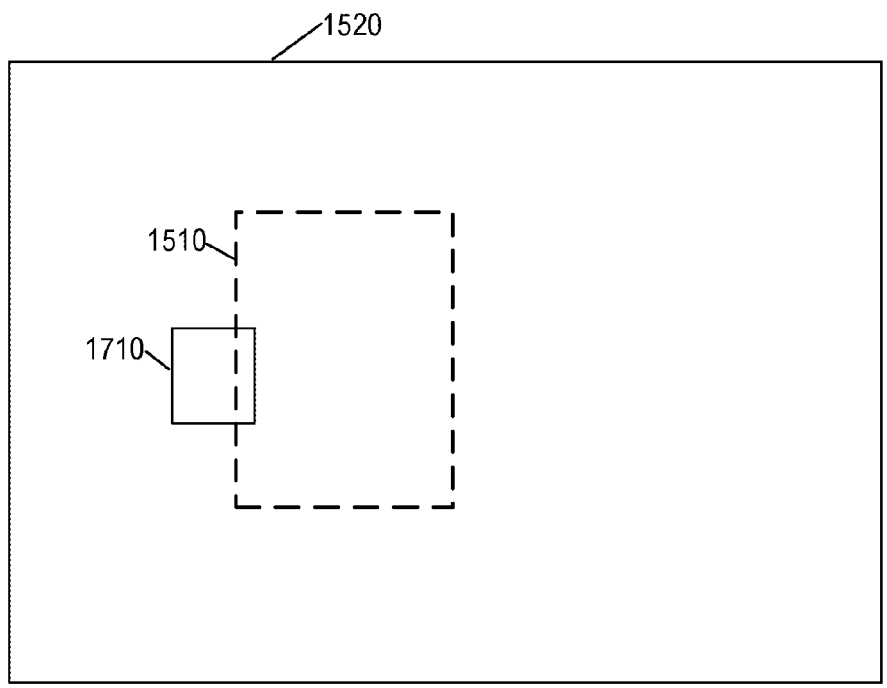
FIG. 19A illustrates an example in which a portion of an object is located within an area of the display output displayed in the remote application view.

FIG. 17 shows an example of a display 560 at the client device 202, in which the remote application view 704 displays a web page on the remote web browser application 327. The web page includes an object 1710 (e.g., a picture). In this example, only a small portion of the object 1720 is shown in the remote application view 704 and a pointer 1705 is placed on the object 1710. FIG. 19A shows the portions of the object 1710 that are within and outside the area 1510 of the remote application view 704.

On the server side, the agent module 322 determines that the pointer 1705 is on the object 1720 based on the coordinates of the pointer reported from the OS module 324 and the coordinates and dimensions of objects in the web page. The agent module 322 then generates a message for the client device 202 including the coordinates and dimensions of the object 1710, and sends the message to the client device 202.

Figure 19B:
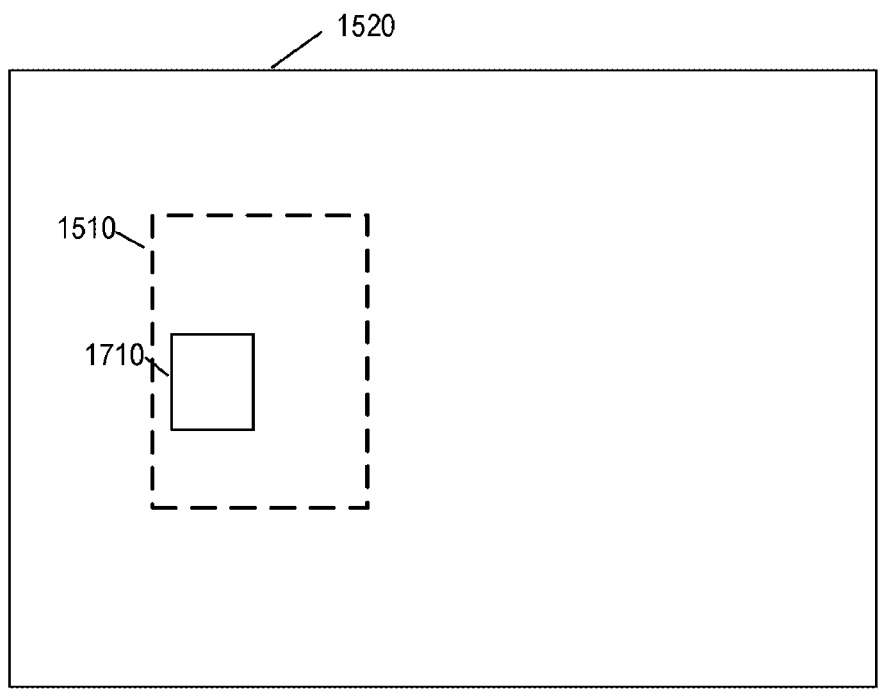
FIG. 19B illustrates an example in which the entire object is located within the area of the display output displayed in the remote application view.

On the client side, the local view module 540 receives the message and determines whether substantially the entire object 1710 is shown in the remote application view 704. In this example, the local view module 540 determines that only a small portion of the object 1710 is shown in the remote application view 704. The local view module 540 then commands the remote view module 535 to scroll the remote application view 704 to the left so that substantially the entire object 1710 is shown the remote application view 704. FIG. 18 shows an example of the display 560 after the remote application view 704 has been scrolled to the left to show the entire object 1710 in the remote application view 704. FIG. 19B shows that, after scrolling to the left, the entire object 1710 is within the area 1510 of the remote application view 704.

In one aspect, the local view module 540 may also zoom in on the object 1710. For example, the local view module 540 may also command the remote view module 535 to zoom in on the object 1710 in the remote application view 704. For example, the local view module 540 may center the object 1710 in the remote application view 704 and maximize the size of the object 1710 in the remote application view 704.

An advantage of this aspect is that, when the user shows an interest in an object by moving a pointer to the object or touching the object using a touch screen, substantially the entire object is automatically shown in the remote application view 704. Thus, the user does not have to scroll and/or zoom out to see the rest of the object of interest.

In another example, the object 1710 may be a video. In this example, the video file for the object 1710 may be downloaded from a uniform resource locator (URL) and played using a media player application. The URL for the video file may be included in markup language code for a web page or other source.

In this example, the agent module 322 on the server side may determine when the pointer is on the object 1710 and/or clicks on the object 1710 based on coordinates of the pointer and/or pointer clicks reported from the OS module 324. The agent module 322 may then generate a message including the URL for the video file, and send the message to the client device 202.

On the client side, the local view module 540 receives the message, retrieves the URL for the video file from the message, and downloads the video file onto the client device 202 from the URL. In this example, the client remote access module 452 may establish a connection with the Internet or other network, and the local view module 540 may download the video file from the URL through the connection. After the video file is downloaded or while the video file is downloading, the local view module 540 may launch a local media player application on the client device 202 and play the video file using the local media player application. The local view module 540 may then display the output of the local media player application on the display 650. For example, the local view module 540 may display the output of the local view module 540 over the remote application view 704.

A process for establishing a remote session on the server 204 for a user at the client device 202 will now be discussed according to an aspect of the disclosure. When the user at the client device 202 desires to remotely access a remote server, the local view module 540 may display a plurality of remote servers from which the user can select on the display 560. For each available remote server, the client device 202 may store an address (e.g., IP address) and user credentials (e.g., login name and password) for the server. The user may then select one of the remote servers on the display 560, for example, using a touch screen overlaying the display 560.

When the user selects a remote server, the client remote access module 452 may initiate a remote access connection 525 with the server remote access module 334 of the server 204. To do this, the client remote access module 452 may send a request for remote access to the server 204 (e.g., over a TCP/IP network connection using an IP address of the server 204). The request may include user credentials (e.g., login name and password). If the user credentials are accepted, then the server remote access module 334 of the server 204 establishes a remote session for the client device 202, providing the client device 202 with remote access to the server 204.

In one aspect, the OS module 324 may notify the agent module 322 that a remote session has been established for the client device 202. The agent module 322 may then send a message to the client device 202, via the server remote access module 334, informing the client device 202 that the agent module 322 is active and ready to accept command messages from the client device 202. On the client side, the client remote access module 452 may send the message to the local view module 540. Upon receiving the message, the local view module 540 may send an acknowledgement to the server 204. On the server side, the server remote access module 334 may send the acknowledgement to the agent module 322. This process may be used to initialize communication between the agent module 322 and the local view module 540.

Figure 20:
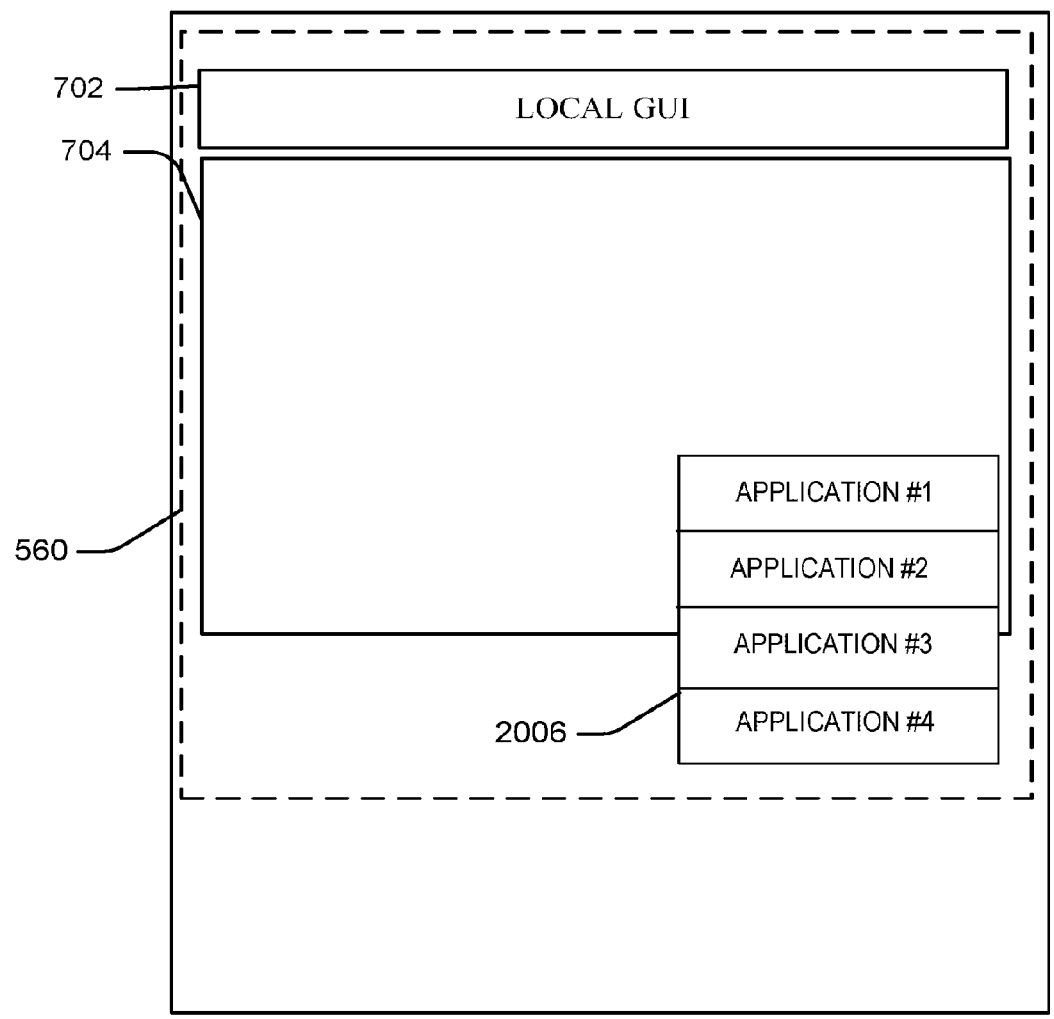
FIG. 20 illustrates an example of a local GUI at a client device listing applications that are available at a remote server.

After initializing communication with the agent module 322, the local view module 540 may display a plurality of applications that are available on the server 204. The local view module 540 may display a list of the available applications in a menu on the display 560 and the user may select a desired one of the applications, for example, using a touch screen. FIG. 20 shows an example of a local GUI 2006 listing applications that are available on the server 204. The local GUI 2006 is locally generated and not generated from display output data from the server 204.

When the user selects an application, the local view module 540 may generate a command message identifying the selected application and send the command message to the server 204 via the client remote access module 452. On the server side, the server remote access module 334 may send the command to the agent module 322. The agent module 322 may then issue a command to the OS module 324 to launch the identified application 327 on the server 204. The agent module 322 may also command the application control module 325 to maximize the size of the display output of the application 327.

The server remote access module 334 may then send display output data of the application 327 to the client device 202. On the client side, the local view module 540 may display a local GUI 702 and 706 for the selected application on the display 560. The local view module 540 may also translate user inputs to the local GUI 702 and 706 into corresponding command messages and send the command message to the agent module 322, as discussed above.

In one aspect of the disclosure, the desktop module 328 may generate a desktop on the server 204. The desktop may include icons of available applications that can be selected and launched on the server 204. In one aspect, the desktop module 328 may be integrated with the operating system 330 (e.g., Windows-based operating system).

Figure 21:
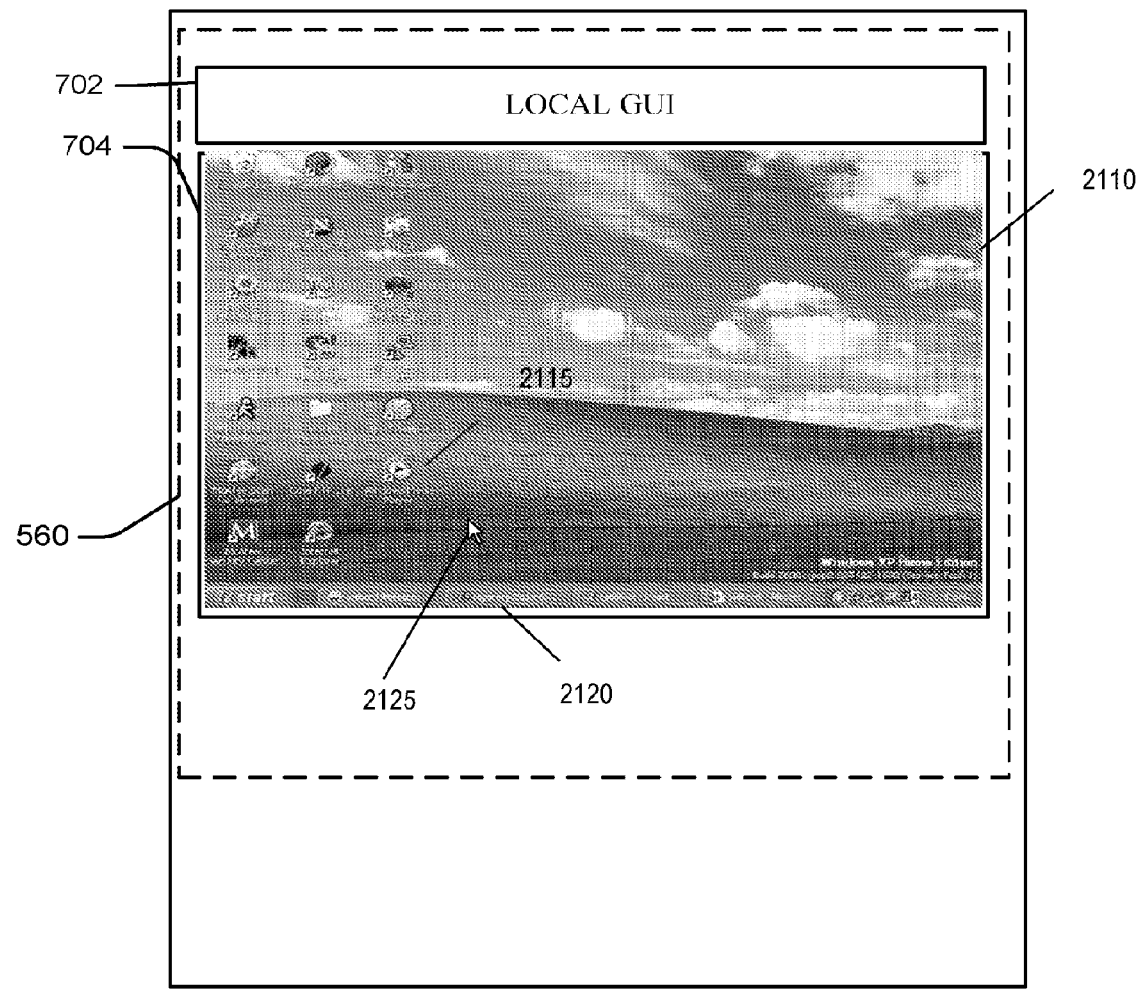
FIG. 21 illustrates an example of a remote desktop displayed at a client device.

In this aspect, the server remote access module 334 may send display output data of the desktop to the client device 202. On the client side, the remote view module 535 may display the remote desktop in the remote application view 704 on the display 560. FIG. 21 shows an example of a remote desktop 2110 displayed in the remote application view 704 at the client device 202. The remote desktop 2110 includes icons 2115 of applications that can be launched on the server 204 and a taskbar 2120.

In this aspect, the user at the client device 202 may select an application on the remote desktop displayed in the remote application view 704, for example, by moving a pointer 2125 to the icon 2115 of a desired application and clicking on the icon 2115 using a pointer input device. The remote view module 535 may then send the entered user inputs (e.g., pointer movements and clicks) to the server 202. On the server side, the server remote access module 334 may input the received user inputs to the desktop module 328. When received user inputs to the desktop result in an application being launched on the server 204, the OS module 324 may inform the agent module 322. The agent module 322 may then generate a message identifying the launched application and send the message to the client device 204 (e.g., via the server remote access module 334).

On the client side, the client remote access module 452 may send the message to the local view module 540. The local view module 540 may then display a local GUI 702 and 706 for the identified application on the display 560. For example, the client device 202 may store configuration files for a plurality of local GUIs for different applications. The local view module 540 may then retrieve the configuration file 451 for the local GUI 702 and 706 corresponding to the application identified in the received message and generate the local GUI based on the retrieved configuration file 451. The local view module 540 may then display the local GUI 702 and 706 on the display 560 to allow the user to remotely control the application 327 on the server 204, as discussed above.

In this aspect, the local view module 540 may also generate a local GUI for the user at the client device 202 to control the remote desktop at the server 204. For example, the local GUI for the remote desktop may allow the user to select a background for the desktop, hide a taskbar of the desktop, and other functions. In another example, the local GUI for the remote desktop may allow the user to minimize, resize, hide and/or move a window for an application on the remote desktop. When the user enters user inputs to the local GUI for the remote desktop, then the local view module 540 may translate the user inputs into a command message for the remote desktop. For example, the local view module 540 may translate user inputs to a graphical control object (e.g., hide taskbar button) on the local GUI into a command message to hide the taskbar. The local view module 540 may send the command message to the server 204 via the client remote access module 452. On the server side, the server remote access module 334 may send the command message to the agent module 322. The agent module 322 may then issue a command to the desktop module 328 based on the received command message. For example, when the received command message is to hide the taskbar, then the agent module 322 may issue a command to the desktop module 328 to hide the taskbar.

Figure 22:
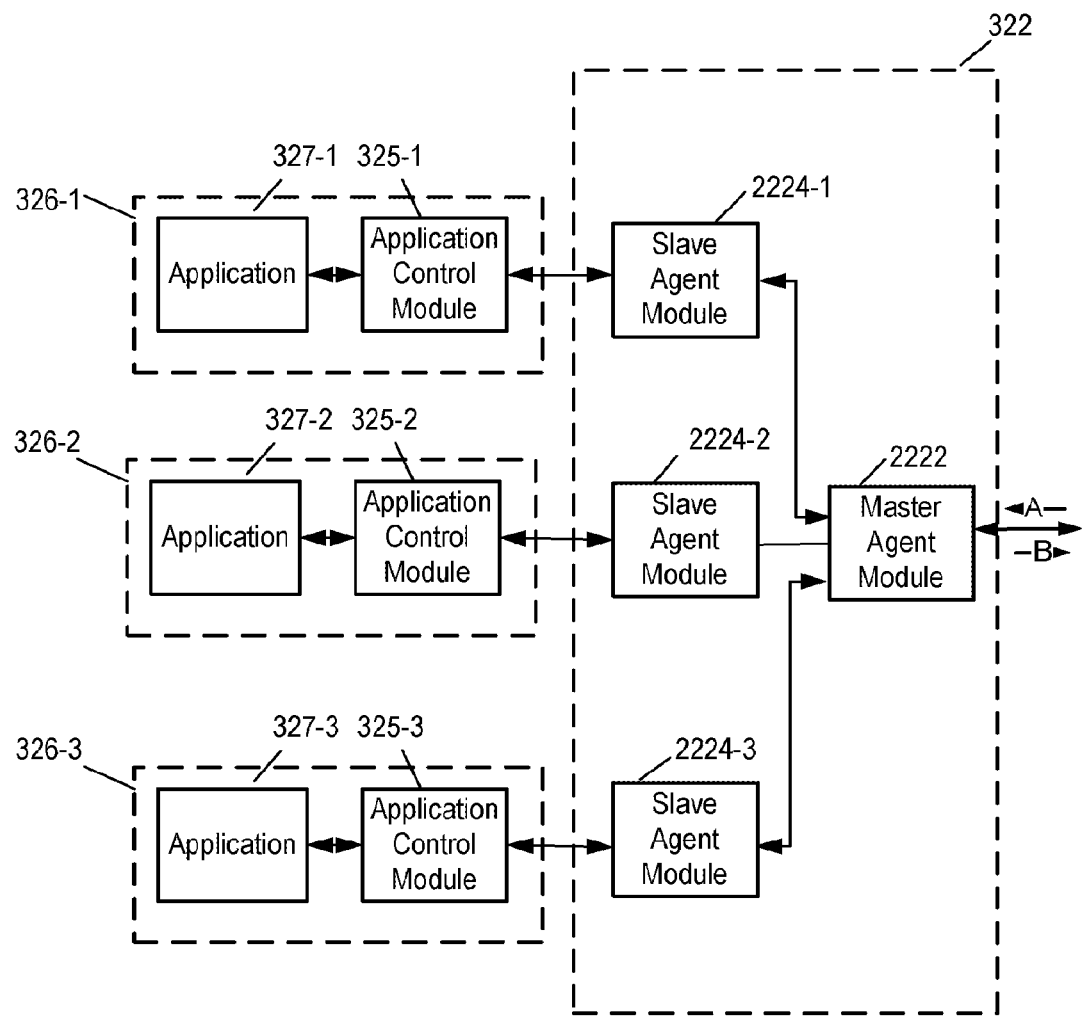
FIG. 22 is a conceptual block diagram of an agent module according to certain aspects of the present disclosure.
Figure 23A:
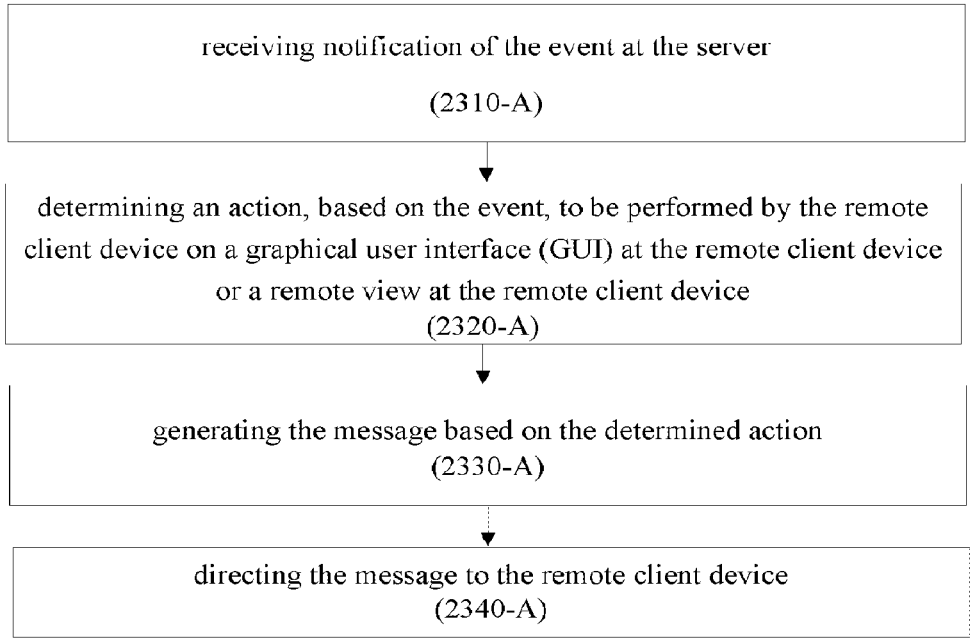
FIG. 23A illustrates an example of an operation of an apparatus according to one aspect of the present disclosure.
Figure 23B:
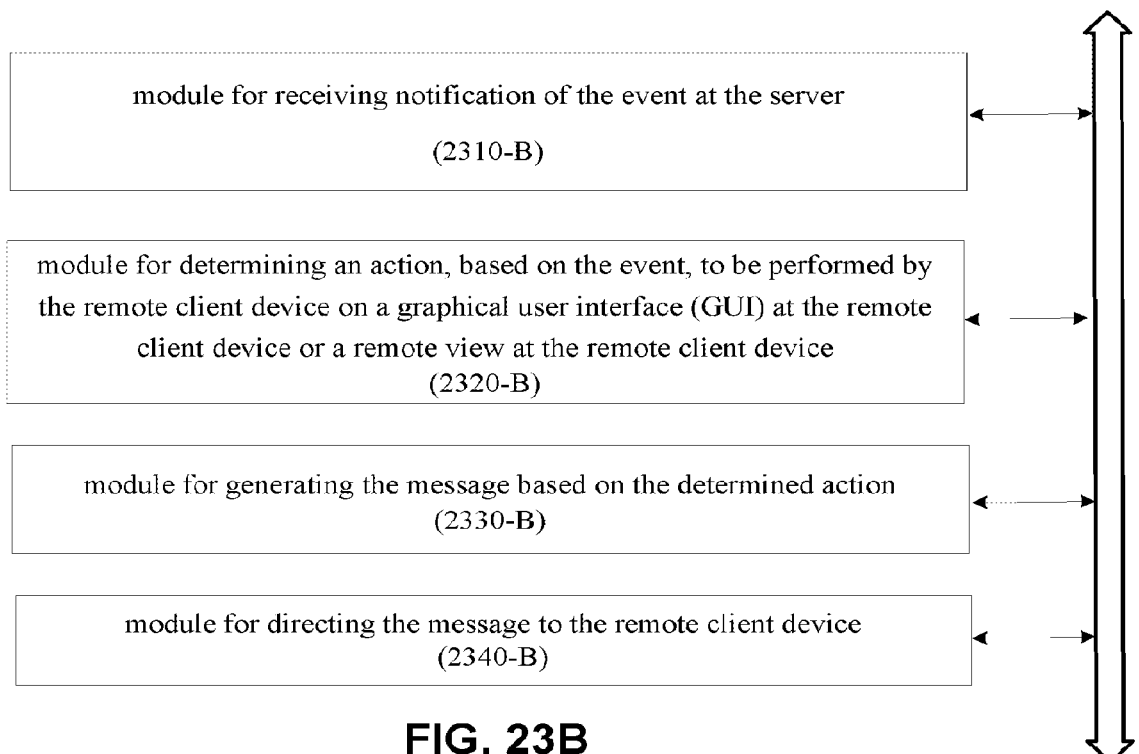
FIG. 23B illustrates an example of a configuration of an apparatus according to one aspect of the present disclosure.
Figure 24A:
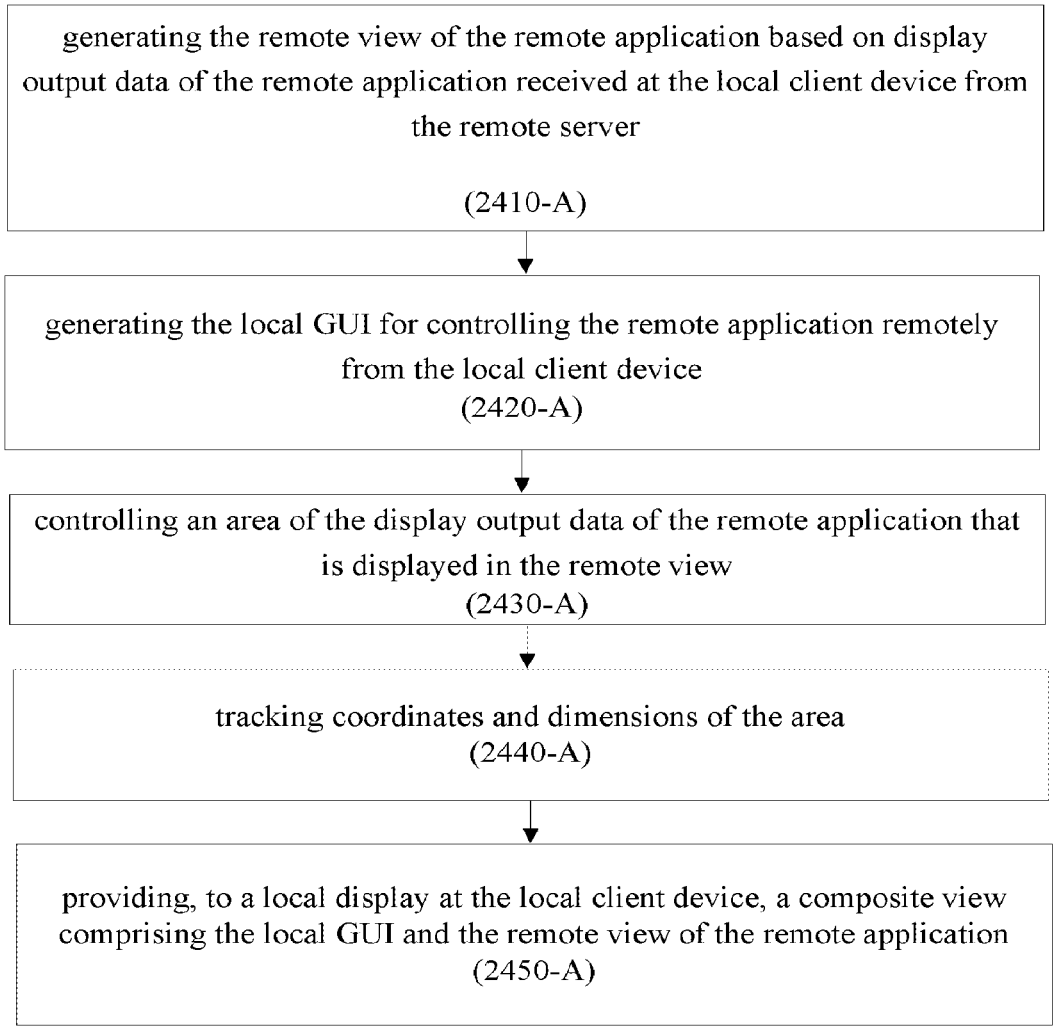
FIG. 24A illustrates an example of an operation of an apparatus according to one aspect of the present disclosure.
Figure 24B:
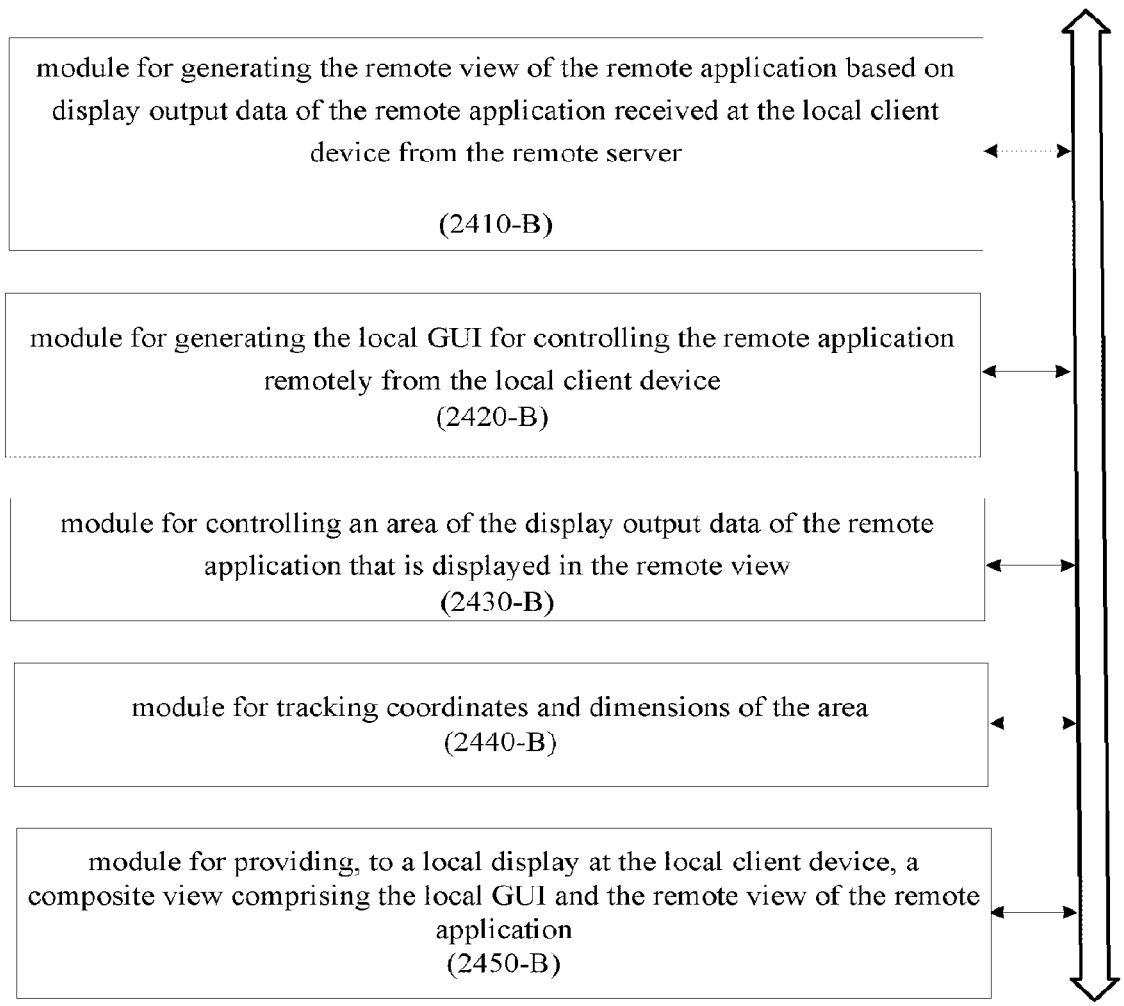
FIG. 24B illustrates an example of a configuration of an apparatus according to one aspect of the present disclosure.

FIG. 22 is a conceptual block diagram of the agent module 322 according to an aspect of the disclosure. In this aspect, the agent module 322 comprising a master agent module 2222 and a plurality of slave agent modules 2224-1 to 2224-3. The agent module 322 may include any number of slave agent modules 2224-1 to 2224-3. In this aspect, each slave module agent 2224-1 to 2224-3 may be configured to control a particular application module 326-1 to 326-3 based on command messages from the client device 202. The master agent module 2222 may be configured to receive a command message from the client device 202 (via the server remote access module 334) and direct the command message to one of the slave agent modules 2224-1 to 2224-3.

In one aspect, there may be a number of applications 327-1 to 327-3 running on the server 204, in which each of the corresponding application modules 326-1 to 326-3 is controlled by one of the slave agent modules 2224-1 to 2224-2. In this aspect, the OS module 324 may notify the master agent module 2222 which one of the applications 327-1 to 327-3 is currently in focus on the server 204. For example, an application 327-2 to 327-3 may be in focus when an active pointer, cursor or I-beam appears in the window of the application 327-2 to 327-3. The master agent module 2222 may then direct command messages from the client device 202 to the slave agent module 2224-1 to 2224-3 corresponding to the application 327-1 to 327-3 currently in focus.

In one aspect, the user the client device 202 may indicate which one of a plurality of applications 327-1 to 327-3 currently running on the server 202 he or she desires to access at a given time. For example, the local view module 540 may display a taskbar in the local GUI 702 and 704 indicating which application are currently running on the server 204. In this aspect, the OS module 324 may notify the master agent module 2222 which applications are running on the server 204 and the master agent may send a message to the client device 202 identifying these applications. The local view module 540 may then generate a local taskbar identifying these applications based on the message. When the user selects an application from the taskbar (e.g., using a touch screen), the local view module 540 may send a command message to the server 204 identifying the application.

On the server side, the server remote access module 334 may send the command message to the master agent module 2222. The master agent module 2222 may then send a command to the desktop module 328 to maximize the selected application and minimize or hide the other applications running on the server 204 so that the display output from the sever 204 to the client device 202 only shows the selected application. The master agent module 2222 may then direct subsequent command messages from the client device 202 to the slave agent module 2224-1 to 224-3 corresponding to the selected application 327-1 to 327-3.

FIG. 25A illustrates an example of a display system 2500 that may be utilized by a client device, according to one approach. Display system 2500 comprises central processing unit (CPU) 2504, graphics module 2514, and cathode ray tube (CRT) 2510. Graphics module 2514 may comprise dynamic random access memory (DRAM) 2506 and serializer 2508. In some aspects, graphics module 2514 may further comprise CRT 2510. Graphics module 2514 facilitates displaying graphics module input 2516. In some aspects, graphics module 2514 may handle visual information including, for example and without limitation, text, drawings, video or other types of multimedia. CPU 2504 may receive the graphics module input 2516 and provide drawing commands to graphics module 2514. In display system 2500, graphics module input 2516 may be "drawn" to (e.g., provided to or input into) graphics module 2514, upon which, the graphics module input 2516 may be displayed by CRT 2510. For example, graphics module input 2516 can be stored in DRAM 2506. DRAM 2506 may store an entire array of pixels pertaining to one image or picture displayed on a display screen, for example, CRT 2510. Serializer 2508 may then retrieve and output graphics module input 2516 from DRAM 2506 to CRT 2510 for display.

FIG. 25B illustrates an example of drawing commands 2502 that may be provided to a display system, according to one approach. Each "x" symbol illustrated in FIG. 25B may illustrate one drawing command. In some aspects, drawing commands provide instructions or information to a display system (e.g., display system 2500) as to what is to be drawn on a display (e.g., CRT 2510). The instructions or information may include, for example and without limitation, the location, texture, geometry, shading, light intensity, or color, or any combination therein, of a pixel or group of pixels of the display. In some aspects, a drawing command corresponds to multiple pixels. For example, in some aspects, a drawing command may correspond to between about 1% and 50% of the total number of pixels of a display. In some aspects, a drawing command may correspond to less than about 1% of the total number of pixels of a display. In some aspects, a drawing command may correspond to greater than about 50% of the total number of pixels of a display. Still in some aspects, a drawing command corresponds to a single pixel of a display. In some aspects, a drawing command may comprise at least one of a raster operation, a multimedia frame (e.g., JPG/MPEG frame), a texture (e.g., an Open GL texture), and other suitable drawing commands.

Drawing commands 2502 may be provided one drawing command at a time as shown in FIG. 25B. Drawing commands 2502 may be provided as remote drawing commands using a decoder of a remote access module such as a remote desktop protocol (RDP) software (e.g., Microsoft® RDP) decoder. For example, remote drawing commands are provided, according to a drawing command rate, to a graphics module of a client device from a remote application running on a remote server. In some aspects, the drawing command rate may be a rate at which the remote drawing commands are decoded by a decoder of a client remote access module at the client device when the remote drawing commands are received at the client device from the remote server over a remote access connection between the client device and a remote server. The drawing command rate may be up to thousands of drawing commands per second or greater. In some aspects, the methods described herein may work independent of a drawing command rate. In one aspect, a drawing command rate may be referred to as a sample rate. In some aspects, when RDP is utilized, each drawing command 2502 that is provided may correspond to a substantially small number of pixels relative to the total number of pixels of a display. For example, in some aspects, when RDP is utilized, each drawing command 2502 may correspond to a single pixel. In another example, when RDP is utilized, each drawing command 2502 may correspond to less than 1% of the total number of pixels of a display. In some aspects, when RDP is utilized, each drawing command 2502 that is provided may not correspond to a small number of pixels relative to the total number of pixels of a display. In some aspects, drawing commands may be provided utilizing other protocols or software.

In one example, graphics module input 2516 comprises drawing commands 2502. Here, drawing commands 2502 are provided to (e.g., "drawn" to) graphics module 2514 at the drawing command rate, which may be a continuous stream of drawing commands at up to thousands of drawing commands per second. This may not be a problem for display system 2500 because of its relatively simple architecture. Each drawing command 2502 can be quickly processed by graphics module 2514 and then be displayed on CRT 2510. Because CRT 2510 can update each of its pixels about one at a time, receiving drawing commands (e.g., with each drawing command corresponding to a substantially small number of pixels relative to the total number of pixels of a display) one drawing command at a time may not slow down the general operation of display system 2500.

Figure 26A:
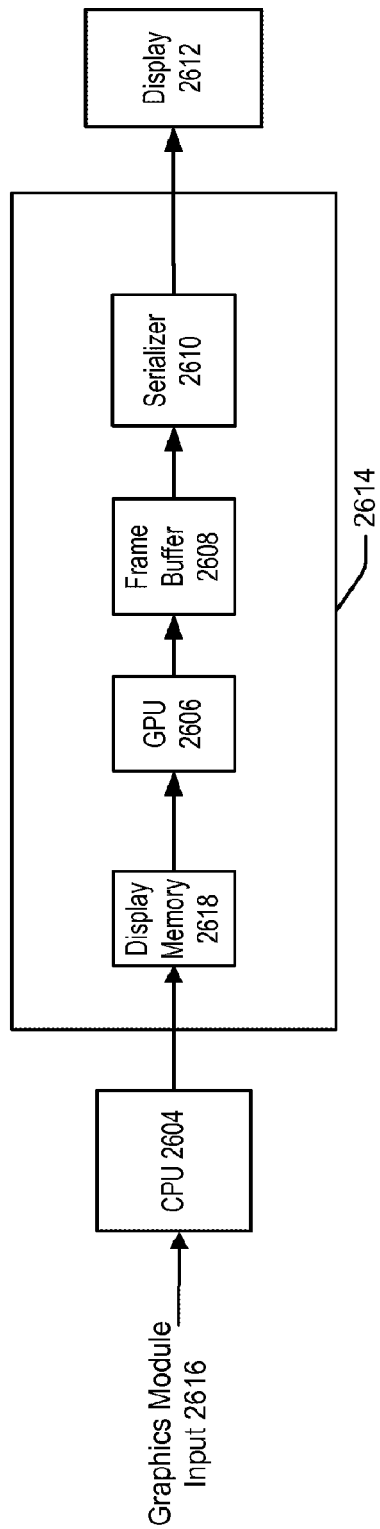
FIG. 26A illustrates another example of a display system that may be utilized by a client device, according to one approach.

FIG. 26A illustrates another example of a display system 2600 that may be utilized by a client device, according to one approach. Display system 2600 includes CPU 2604, graphics module 2614, and display 2612. Graphics module 2614 may comprise display memory 2618, graphics processing unit (GPU) 2606, frame buffer 2608, and/or serializer 2610. In some aspects, graphics module 2614 may further comprise display 2612. In some aspects, graphics module 2614 may be referred to as a graphics pipeline. Graphics module 2614 facilitates displaying graphics module input 2616. In some aspects, graphics module 2514 may handle visual information including, for example and without limitation, text, drawings, video or other types of multimedia. In display system 2600, graphics module input 2616 may be drawn to graphics module 2614, upon which, the graphics module input 2616 may be displayed by display 2612. For example, CPU 2604 receives graphics module input 2616 and provides the graphics module input 2616 to display memory 2618 for storage. GPU 2606 may retrieve and process graphics module input 2616, and then update frame buffer 2608 with graphics module input 2616. Serializer 2610 may then retrieve and output graphics module input 2616 to display 2612. Display 2612 may be a liquid crystal display (LCD) or any other suitable display device.

Graphics module 2614 may be implemented in various ways known to those of skill in the art. In some aspects, graphics module 2614 may comprise display memory 2618 and any other components, if any, to extract drawing commands stored in display memory 2618 such that the drawing commands may be displayed on display 2612.

Display system 2600 may represent display systems that, compared to display system 2500 (shown in FIG. 25A), are much more complicated in terms of processing and capabilities. For example, display system 2600 comprises more components such as GPU 2606, which enables complex graphical processing. Due to the complexity of these display systems (e.g., display system 2600), receiving drawing commands 2502 (shown in FIG. 25B) as graphics module input 2616 may bog down display system 2600 because resources are wasted when processing is devoted to one drawing command at a time, where each drawing command may only correspond to a substantially small number of pixels compared to the total number of pixels of a display.

In some approaches, drawing commands such as raster operations are drawn directly to display memory 2618 as they become available from a decoder of a remote access module such as an RDP software decoder. For example, graphics module input 2616 may be the drawing commands 2502 shown in FIG. 25B. In such cases, a problem lies with the efficiency of the rendering of decoded remote client software (such as RDP) drawing commands on client devices. The existing implementations appear slow and use too high a percentage of available CPU cycles, thus making the graphical user interface (GUI) act non-responsively.

For example, RDP software client implementations on client devices (e.g., mobile devices) draw directly to display memory 2618 as drawing commands are received. In implementations where access to this display memory is slow compared to the rate at which drawing commands are received, or when display memory is not available, or when long, complex, or layered drawing commands are provided, an RDP software thin client device may render slowly and may become bogged down. On a slow remote client device, the user may see objects drawn in sequence instead of the final completely drawn result.

Figure 26B:
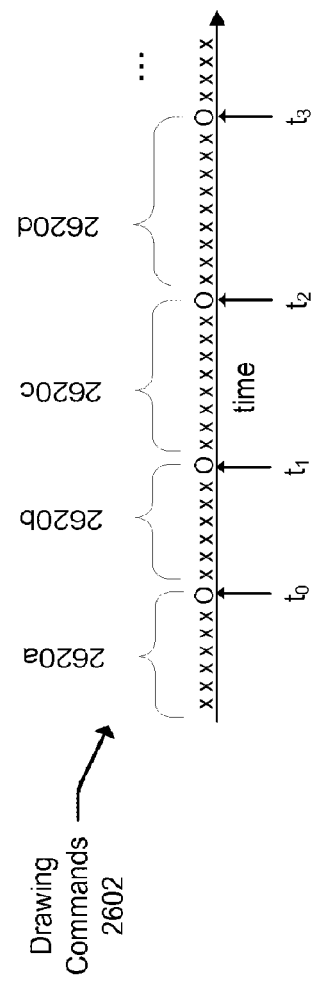
FIG. 26B illustrates an example of drawing commands that may be provided to a display system, in accordance with one aspect of the subject technology.

FIG. 26B illustrates an example of drawing commands 2602 that may be provided to a display system, in accordance with one aspect of the subject technology. The foregoing problems may be solved by providing groups of drawing commands at certain intervals instead of one at a time, in accordance with one aspect of the subject technology. For example, each "x" illustrates a drawing command. Each "O" represents the time at which the respective group 2620 (e.g., groups 2620*a*, 2620*b*, 2620*c*, or 2620*d*, etc.) of drawing commands 2602 is provided to graphics module 2614 instead of providing individual drawing commands 2602 to graphics module 2614 one at a time. In some aspects, each group 2620 of drawing commands 2602 represents a frame (e.g., snapshot, picture, image, etc.) of what is displayed at display 2612. In some aspects, each group 2620 of drawing commands 2602 represents a portion of a frame displayed in display 2612. In some aspects, each group 2620 of drawing commands 2602 represents an entire frame displayed in display 2612.

According to an aspect of the subject technology, having individual drawing commands 2602 wait until a group 2620 of drawing commands 2602 are assembled before drawing to graphics module 2614 allows for efficient utilization of resources of display system 2600. In an example, individual drawing commands 2602 within group 2620*a* are not drawn to graphics module 2614 until time $t_0$. The group 2620*a* of drawing commands 2602 may then be processed by graphics module 2614 and displayed in display 2612 as a single snapshot. Similarly, individual drawing commands 2602 within group 2620*b* are not drawn to graphics module 2614 until time $t_1$, and so on. In some aspects, the time interval between each group 2620 of drawing commands 2602 being drawn to graphics module 2614 is referred to as a refresh rate or frame rate. In some aspects, refresh rate and frame rate may be used interchangeably. In some aspects, the refresh rate may be periodic. In some aspects, the refresh rate is not periodic. For example, the time interval between $t_0$ and $t_1$ may be different from the time interval between $t_1$ and $t_2$.

In one aspect, a configuration of the subject technology caches the result of drawing commands 2602 in a temporary bitmap memory, which may be smaller or larger than the actual display memory bitmap height/width, and then only updates (e.g., drawn to) the display memory periodically, limited to a frame rate not higher than what is humanly perceivable (e.g., about 60 hertz), from the temporary bitmap memory. In some aspects, the drawing commands 2602 may be remote drawing commands received at a client device from a remote application running on a remote server. In some aspects, the client device does not run the remote application locally at the client device. According to some aspects of the disclosure, the responsiveness of RDP software clients is improved from other approaches. Rendering appears faster, and more CPU cycles are available for other functions, including GUI responsiveness.

Figure 27A:
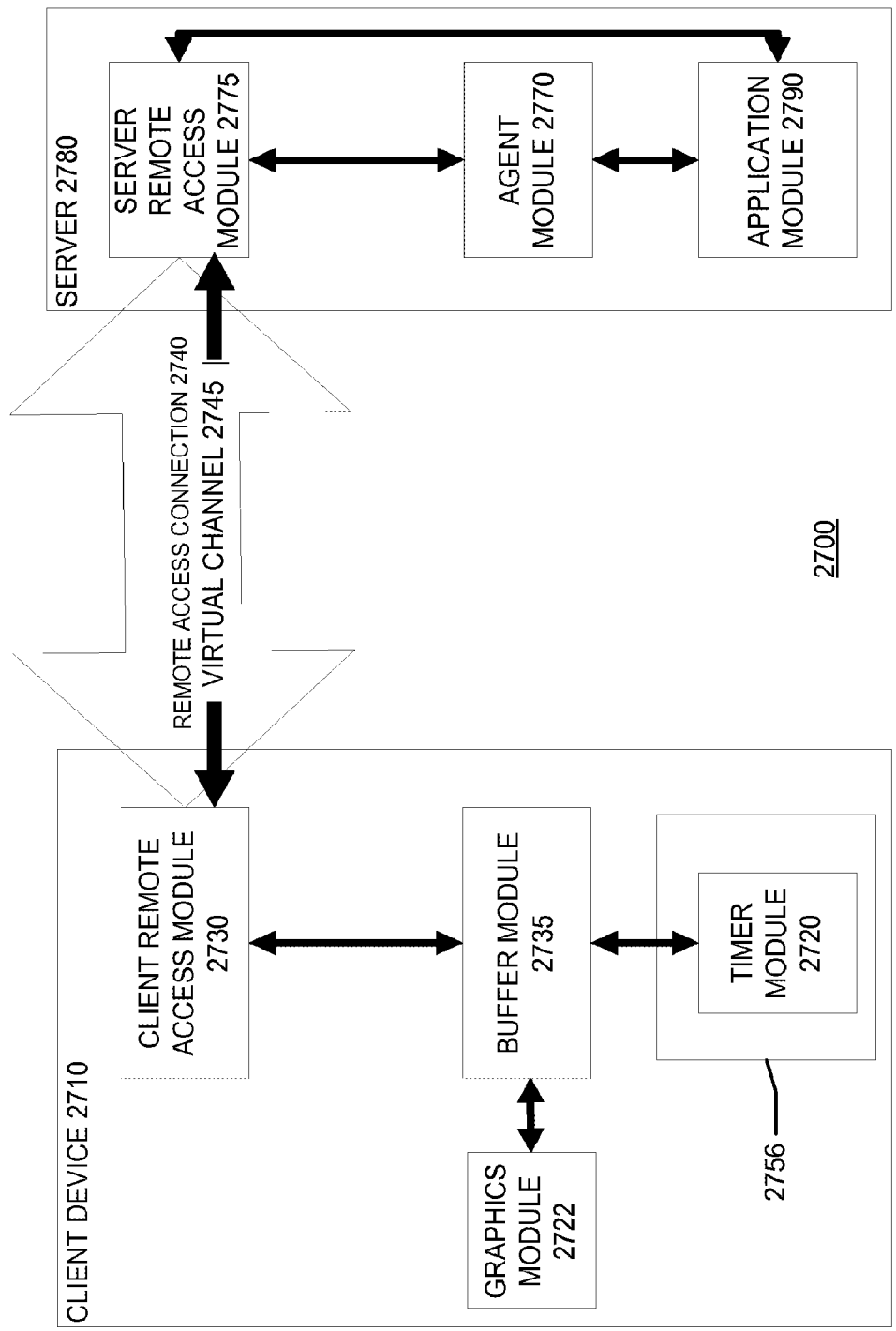
FIG. 27A illustrates a simplified diagram of a remote drawing command system, in accordance with one aspect of the subject technology.
Figure 27B:
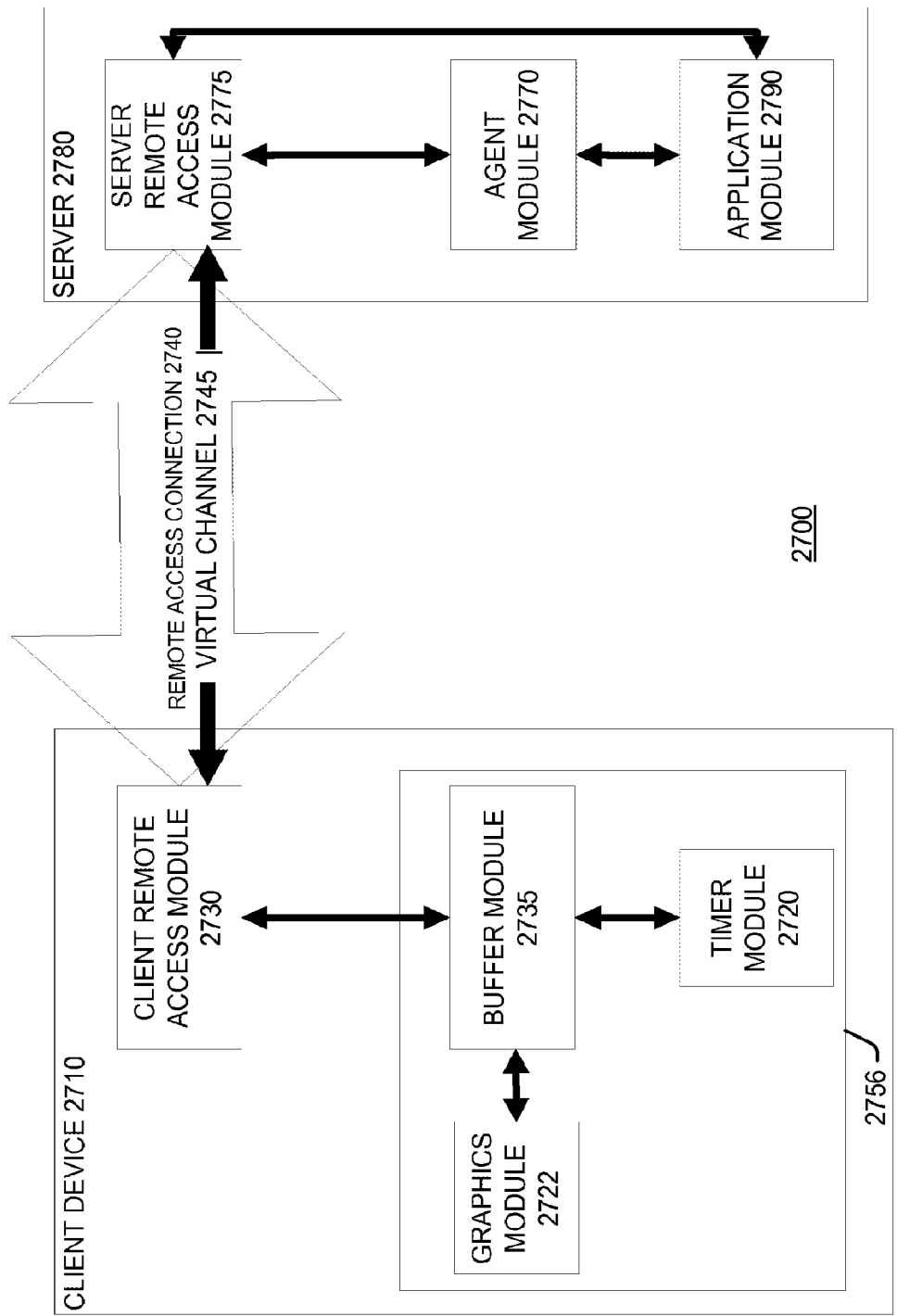
FIG. 27B illustrates a simplified diagram of a remote drawing command system, in accordance with one aspect of the subject technology.

Now referring to FIGS. 27A and 27B, simplified diagrams of remote drawing command system 2700 are illustrated in accordance with various configurations of the present disclosure. The remote drawing command system 2700 may include local client computing device 2710 (client device) in communication with remote server computing device 2780 (server or remote server system) using remote access connection 2740, which may include one or more virtual channels 2745 for communication between client device 2710 and server 2780. In some aspects, as shown in FIG. 27A, client device 2710 may include buffer module 2735, client remote access module 2730, graphics module 2722, and viewer controller module 2756 (e.g., viewer controller module 456 of FIG. 4), where viewer controller module 2756 includes timer module 2720. In some aspects, as shown in FIG. 27B, client device 2710 may include client remote access module 2730 and viewer controller module 2756, where viewer controller module 2756 includes graphics module 2722, buffer module 2735, and timer module 2720.

Referring to both FIGS. 27A and 27B, server 2780 may include server remote access module 2775, agent module 2770, and application module 2790. Application module 2790 may include one or more application control modules and one or more applications. Server 2780 may also include an operating system (OS), an OS module, a desktop module for a desktop of server 2780, and any other software or modules for running on server 2780.

Client remote access module 2730 is configured to create, establish, or facilitate establishing remote access connection 2740 with server remote access module 2775 on server 2780. Together, client remote access module 2730 and server remote access module 2775 are configured to allow client device 2710 to access server 2780 over remote access connection 2740. In one aspect of the disclosure, client remote access module 2730 and server remote access module 2775 may be configured to allow client device 2710 to remotely control server 2780 over remote access connection 2740. In another aspect of the disclosure, client remote access module 2730 and server remote access module 2775 may be configured to allow GUI software to run remotely on server 2780 so that it can be displayed locally on client device 2710. Exemplary remote access applications, which include client remote access module 2730 and server remote access module 2775 configured to create remote access connection 2740, are the Microsoft® Remote Desktop Protocol (RDP) application and the Citrix® Independent Computing Architecture (ICA) application. The subject technology, however, is not limited to these exemplary remote access applications.

Client remote access module 2730 can include an appropriate terminal service client dynamic link library as well as other static libraries for use with a remote connection. Client remote access module 2730 may include a terminal service client dynamic link library for a remote access application such as the Microsoft® RDP application and the Citrix® ICA application. Server remote access module 2775 similarly can include appropriate system service modules for use with a remote connection. Client remote access module 2730 and server remote access module 2775 can come pre-installed with the respective operating systems operating on client device 2710 and server 2780. Alternatively, client remote access module 2730 and server remote access module 2775 can be later added or otherwise configured to operate with the respective operating systems operating on client device 2710 and server 2780.

Client remote access module 2730 can initiate creating a remote access connection 2740. Remote access connection 2740 (or one or more virtual channels created within remote access connection 2740) can be used for the transfer between buffer module 2735 of client device 2710 and agent module 2770 or application module 2790 of server 2780 of information related to remote drawing commands. In some aspects, server remote access module 2775 may be a remote communication protocol server (e.g., RDP server) that sends remote drawing commands to buffer module 2735. For example, buffer module 2735 may receive, at client device 2710 from server 2780 over remote access connection 2740, remote drawing commands, according to a drawing command rate, of a remote application running on server 2780. The drawing command rate may be a rate at which the remote drawing commands are to be decoded by a decoder of a client remote access module 2730 at client device 2710 when the remote drawing commands are received at client device 2710 from server 2780 over the remote access connection 2740 between client device 2710 and server 2780.

In one aspect, the remote application may be any application running on server 2780 (e.g., an application in application module 2790). In some aspects, client device 2710 does not execute or run the remote application locally at the client device 2710. In some aspects, the remote drawing commands from the remote application are provided directly to server remote access module 2775 from application module 2790. In some aspects, the drawing commands from the remote application may be provided to agent module 2770 from application module 2790. Agent module 2770 may then provide the remote drawing commands to server remote access module 2775. In some aspects, client remote access module 2730 receives over the remote access connection 2740, or virtual channel 2745, the remote drawing commands from server remote access module 2775. Client remote access module 2730 may provide the remote drawing commands to buffer module 2735 at the drawing command rate.

In one aspect of the disclosure, whenever a remote access connection session is closed, client remote access module 2730 may instruct agent module 2770 or application module 2790 to stop sending remote drawing commands to client device 2710 from server 2780. According to another aspect of the disclosure, a socket connection between agent module 2770 and buffer module 2735 may be used instead of, or in addition to, remote access connection 2740.

According to one aspect of the disclosure, while remote access connection 2740 and virtual channel 2745 may share the same physical connection or the same physical communication path, each of remote access connection 2740 and virtual channel 2745 may comprise a distinct or separate communication "channel."

According to some aspects of the disclosure, buffer module 2735 comprises temporary bitmap memory, a temporary graphics memory buffer, a temporary memory buffer, cache, and/or other suitable types of memory for storing drawing commands. Buffer module 2735 may store the remote drawing commands that are received from the remote application running on server 2780. In some examples, actual drawing may occur in buffer module 2735 in client device 2710. In some aspects, timer module 2720 facilitates sending the remote drawing commands in buffer module 2735 to graphics module 2722 (e.g., drawing to graphics module 2722) according to a refresh rate that is less than the drawing command rate. In some aspects, timer module 2720 is application/platform agnostic. Graphics module 2722, for example, may be graphics module 2614 (shown in FIG. 26A) or another suitable graphics module of a display system on a client device. The drawing command rate, as discussed above, may be up to thousands of drawing commands per second.

Timer module 2720 may monitor buffer module 2735, according to a monitor rate, for one or more changes to the buffer module 2735. Changes to the buffer module 2735 may include any new or additional remote drawing commands that are stored in the buffer module 2735 that have not been previously sent to graphics module 2722. Thus, timer module 2720 may detect one or more changes to the buffer module 2735. If one or more changes to the buffer module 2735 are detected, timer module 2720 may facilitate sending the remote drawing commands in the buffer module 2735 to the graphics module 2722. The remote drawing commands in the buffer module 2735 that are sent to the graphics module 2722 corresponds to the one or more changes to the buffer module 2735.

For example, timer module 2720 may set up a timer that periodically checks (at a monitor rate) to see if there have been any updates to buffer module 2735. If updates have been found, timer module 2720 may set the flag to refresh the display (e.g., a local display of client device 2710) in the area that was changed in the display. If the flag has been set, buffer module 2735 may send the updated or changed area of the display to graphics module 2722 to refresh the display of the client device. In some aspects, timer module 2720 may be set to refresh the display at a slower rate than the drawing command rate (which may, for example, range from thousands to millions of drawing commands per second), and/or at a rate limited to that perceivable by the human eye, such as about 60 hertz. In some examples, the refresh rate may be greater than about 60 hertz. In some aspects, timer module 2720 may facilitate updating only portions of the display screen memory (e.g., display memory 2618 in FIG. 26A) that may need refreshing.

In some aspects, the monitor rate may be less than the drawing command rate. The monitor rate may also be less than or equal to about 60 hertz. In some examples, the monitor rate may be greater than about 60 hertz. The refresh rate may be less than or equal to the monitor rate. The refresh rate may be less than or equal to about 60 hertz. In some aspects, the refresh rate is periodic. In some aspects, the refresh rate is not periodic. For example, remote drawing commands are sent from the buffer module 2735 to graphics module 2722 only when changes to the buffer module 2735 are detected.

In some aspects, timer module 2720 may facilitate updating the display screen memory using only a portion of remote drawing commands received by buffer module 2735. In one example, temporary results of multiple remote drawing commands may be combined into buffer module 2735 so that timer module 2720 may facilitate sending a smaller number of the remote drawing commands (e.g., potentially as little as one) to graphics module 2722 than the number of remote drawing commands received by buffer module 2735 over remote access connection 2740.

In some aspects, timer module 2720 may facilitate sending portions of the remote drawing commands in buffer module 2735 to graphics module 2722 according to a relation among the remote drawing commands. For example, remote drawing commands corresponding to one half of an image (e.g., one half of a bitmap) may be received by buffer module 2735 from server 2780. Timer module 2720 may allow these remote drawing commands to be stored in buffer module 2735 until remote drawing commands corresponding to the other half of the image (e.g., the other half of the bitmap) are received by buffer module 2735. Timer module 2720 may then facilitate combining the two halves and sending the combined remote drawing commands corresponding to the whole image (e.g., related drawing commands) to graphics module 2722. An increased efficiency may result if the remote drawing command set-up time per drawing command, or per frame, is large compared to the actual drawing time of the image (e.g., actual bitmap drawing time).

In one aspect of the disclosure, timer module 2720 may be a module or a Windows system service, and may be implemented as executable software code (e.g., timer.exe). In one aspect of the disclosure, agent module 2770 may be a module or a Windows system service, and may be implemented as executable software code (e.g., Agent.exe). In another aspect, agent module 2770 may be a module that performs a function or operation on behalf of another module-such as a server operating system, a software application, or a driver on the server- and communicates with client device 2710, while not disclosing the details of the function or operation to client device 2710, or may be a module that performs a task in the background. In some aspects, timer module 2720 may be a module separate from other modules of client device 2710 shown in FIG. 27A or 27B. For example, instead of being part of viewer control module 2756, a timer module may be part of another module (e.g., another program) in client device 2710, where the timer module may produce a functionality as described herein as if it were a separate timer module. In yet another aspect, agent module 2770 may be a module that performs other functions or operations.

Referring back to FIG. 7, display 560 may be display 2612 as shown in FIG. 26A. In some aspects, sending drawing commands to a graphics module of client device 202 (e.g., graphics module 2722 in FIG. 27A or FIG. 27B) results in the display of those drawing commands on display 560. For example, a remote application that is running on a server may send remote drawing commands to client device 202. By utilizing the techniques for handling remote drawing commands as described above, client device 202 may display a view of the remote application on display 560 as if the remote application were running directly on client device 202. Furthermore, the display of the remote application on client device 202 may be refreshed at a refresh rate that is less than what is perceivable by a typical human, thus allowing for efficient processing and utilization of resources for client device 202, in accordance with one aspect of the subject technology.

Figure 28A:
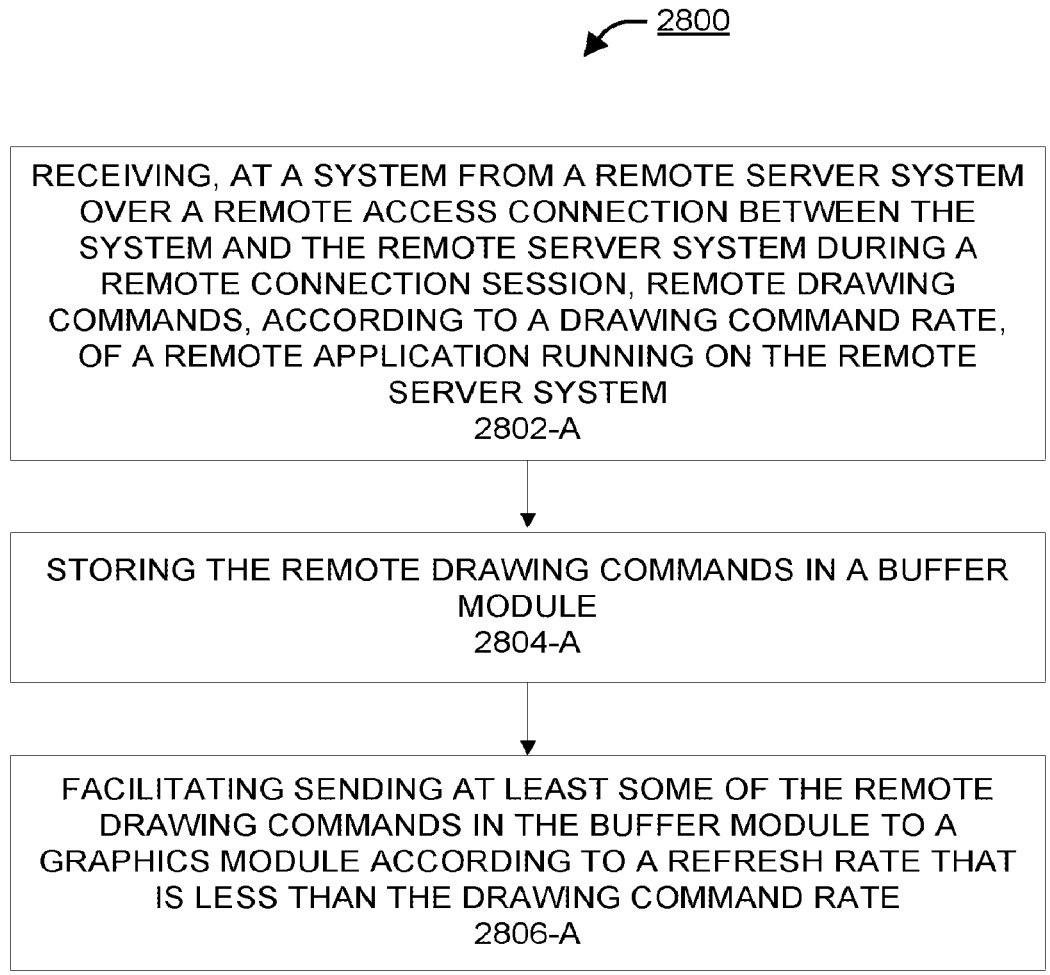
FIG. 28A illustrates an exemplary method for handling remote drawing commands, in accordance with one aspect of the subject technology.
Figure 28B:
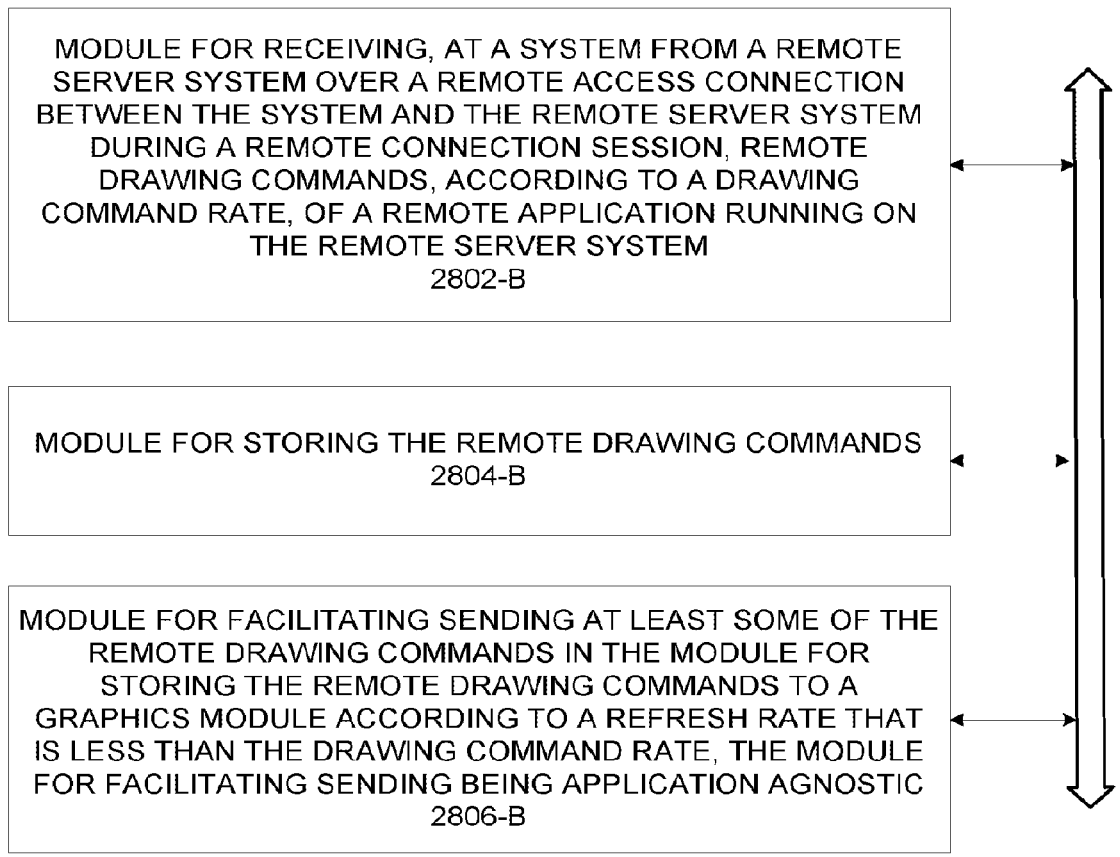
FIG. 28B illustrates an example of a configuration of an apparatus, in accordance with one aspect of the subject technology.

FIG. 28A illustrates an exemplary method 2800 for handling remote drawing commands, in accordance with one aspect of the subject technology. The method 2800 comprises receiving, at a system from a remote server system over a remote access connection between the system and the remote server system during a remote connection session, remote drawing commands, according to a drawing command rate, of a remote application running on the remote server system (2802-A). The method 2800 also comprises storing the remote drawing commands in a buffer module (2804-A). The method 2800 also comprises facilitating sending at least some of the remote drawing commands in the buffer module to a graphics module according to a refresh rate that is less than the drawing command rate (2806-A).

Figure 29:
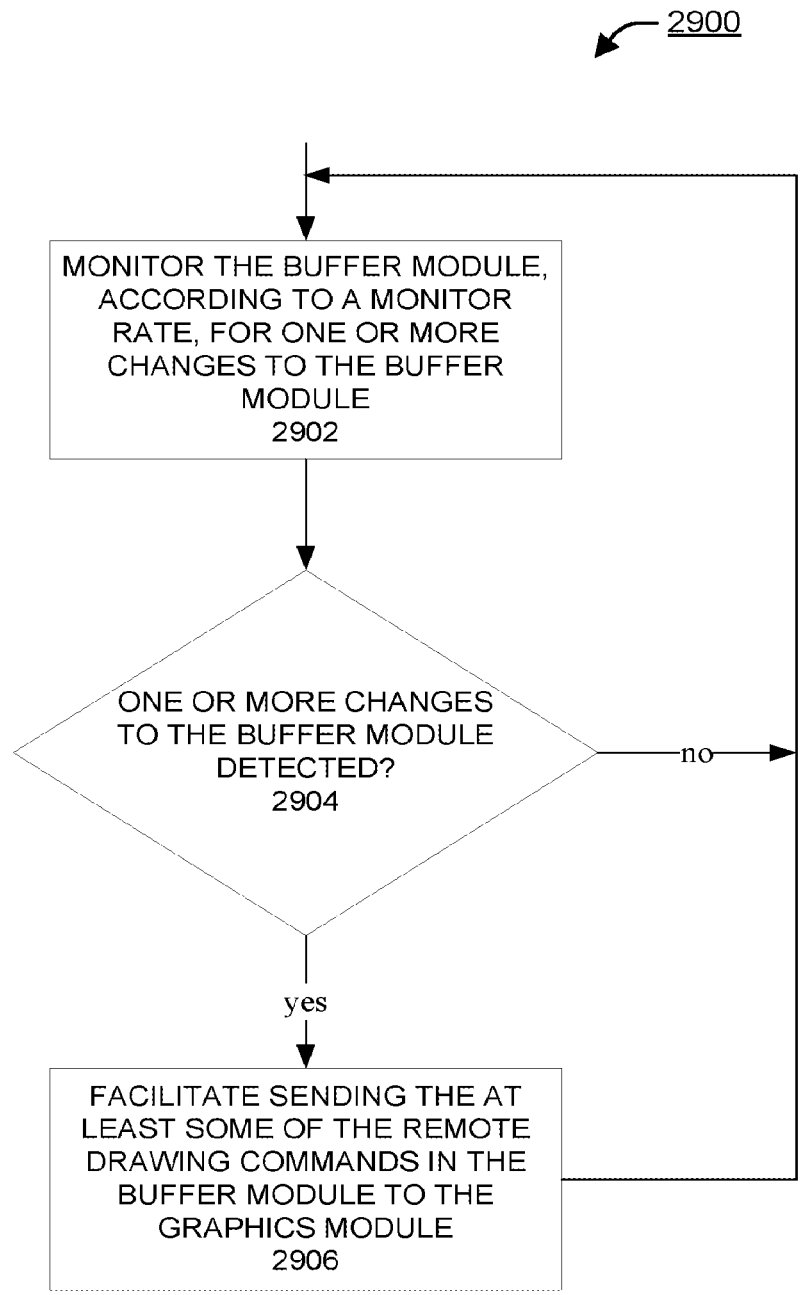
FIG. 29 illustrates an exemplary method of facilitating sending drawing commands to a graphics module, in accordance with one aspect of the subject technology.

FIG. 29 illustrates an exemplary method 2900 of facilitating sending the drawing commands to a graphics module, in accordance with one aspect of the subject technology. As shown in FIG. 29, method 2900 (e.g., 2806-A of FIG. 28A) may comprise monitoring the buffer module, according to a monitor rate, for one or more changes to the buffer module (2902). In some aspects, the monitor rate may be less than the drawing command rate. Method 2900 may also comprise detecting the one or more changes to the buffer module (2904). If no changes are detected, then the remote drawing commands are not sent to the graphics module, in accordance with one aspect of the subject technology. In such a case, the buffer module may be continued to be monitored according to the monitor rate, for further changes to the buffer module. Method 2900 may also comprise facilitating sending the at least some of the remote drawing commands in the buffer module to the graphics module if the one or more changes to the buffer module are detected (2906). Thus, if changes are detected to the buffer module, (e.g., new remote drawing commands are received by the buffer module), then the new remote drawing commands are sent to the graphics module, according to some aspects of the subject technology. The new remote drawing commands may correspond to the changes that are detected.

According to various aspects of the subject technology, audio signals received at a client device from a remote application running on a remote server may correspondingly be delayed along with the drawing commands. In some aspects, the audio signals may be multiplexed in the same pipeline as the drawing commands. In some aspects, a different pipeline may be used. In some aspects, the audio signals may be stored in the same memory as the drawing commands or in different memory from the drawing commands. In some aspects, the audio signals may be partially stored in the same memory as the drawing commands and partially stored in different memory from the drawing commands (e.g., split from a combined transport stream and then sent to a separate audio digital signal processing (DSP) system for processing). A pipeline for audio intended to be synchronized to the images drawn may be designed to have a delay capable of matching, to some degree, the average delay incurred by the drawing command pipeline. In some aspects, if a portion of remote drawing commands is delayed, then a corresponding audio portion may be delayed substantially the same amount.

Those of skill in the art would appreciate that the various illustrative blocks, modules, elements, components, methods, and algorithms described herein may be implemented as electronic hardware, computer software, or combinations of both.

For example, a module (e.g., an agent module 322, a viewer controller module 456, a local view module 540, a remote view module 535, or any other modules) may be implemented as electronic hardware, computer software, or combinations of both. In one aspect, a module(s) may be an apparatus since a module(s) may include instructions encoded or stored on a machine-readable medium, on another device, or on a portion thereof. In one aspect, a module(s) may be software (e.g., an application, a subroutine) stored in a machine-readable medium and executable by a processing system or a processor. In another aspect, a module(s) may be hardware (e.g., machine-readable medium encoded with instructions, a pre-programmed general-purpose computer, or a special purpose electronic or optical device).

Various modules may reside in one machine or in multiple machines. In one example, modules for the server side (e.g., an agent module, an application module, a server remote access module, etc.) may be located in one server or spread over multiple servers. In another example, modules for the client side (e.g., a client remote access module, a viewer controller module, a local view module, a remote view module, a display module, etc.) may be located in one client device or spread over multiple client devices.

In one aspect of the disclosure, when actions or functions are described as being performed by a module or a component (e.g., establishing, sending, receiving, providing, building, displaying, registering, encrypting, decrypting, authenticating, notifying, accepting, selecting, controlling, issuing, transmitting, reporting, pushing, or any other action or function), it is understood that such actions or functions are performed by the module or the component directly or indirectly. As an example, when a module is described as performing an action, it is understood that the module may perform the action directly or may perform the action indirectly, for example, by facilitating such an action. For instance, when a session is described as being established by a module, it is understood that the module may establish the session indirectly by facilitating an establishment of the session. As yet another example, when a view of an application is described as being displayed or rendered by a module, it is understood that the view may be displayed or rendered by the module either directly or indirectly.

To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

Various components and blocks may be arranged differently (e.g., arranged in a different order, or partitioned in a different way) all without departing from the scope of the subject technology. In one aspect of the disclosure, the modules (or elements) recited in the accompanying claims may be performed by one module or by a smaller number of modules, and this arrangement is within the scope of the claims. In another aspect, the modules (or elements) recited in the accompanying claims may be performed by a larger number of modules, and this arrangement is within the scope of the claims. In yet another aspect, a module (or an element) recited in the accompanying claims may be performed by multiple modules, and this arrangement is within the scope of the claims. For example, a local view module and a remote view module may be combined into one module. A client remote access module, a local view module and a remote view module may be combined into one module. An agent module and a server remote access module may be combined into one module. In another example, these modules may be divided into a larger number of modules.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for handling drawing commands on a client device, the method comprising:
   receiving drawing commands at the client device over a network connection from a remote server system according to a drawing command rate;
   storing the drawing commands in a buffer module in the client device;
   monitoring the buffer module for a change to the buffer module, according to a monitor rate;
   detecting the change to the buffer module; and
   sending at least one of the drawing commands in the buffer module to a graphics system in the client device according to a refresh rate that is less than the drawing command rate, the at least one of the drawing commands corresponding to the change to the buffer module.

2. The method of claim 1, wherein receiving drawing commands at the client device comprises:
   establishing a remote access connection with a remote server system; and
   receiving remote drawing commands from the remote server system.

3. The method of claim 1, wherein the graphics system is configured to display the at least one of the drawing commands on a local display according to the refresh rate.

4. The method of claim 3, wherein the refresh rate is less than or equal to the monitor rate.

5. The method of claim 3, wherein the refresh rate is less than or equal to approximately 60 hertz.

6. The method of claim 1, further comprising detecting a relationship between two related drawing commands, wherein the at least one of the drawing commands in the buffer module sent to the graphics system comprises both of the two related drawing commands.

7. The method of claim 1, wherein the drawing commands comprise at least one of a raster operation, a multimedia frame, and a texture.

8. A client device for handling remote drawing commands, the device comprising:
   a processor;
   a buffer module communicatively coupled to the processor;
   a graphics system communicatively coupled to the buffer module; and
   a memory communicatively coupled to the processor;
   instructions encoded in the memory, wherein the instructions, when executed by the processor, are operable to:
   receive drawing commands over a network connection from a remote server system according to a drawing command rate;
   store the drawing commands in the buffer module;
   monitor the buffer module for a change to the buffer module, according to a monitor rate;
   detect the change to the buffer module; and
   send at least one of the drawing commands in the buffer module to the graphics system according to a refresh rate that is less than the drawing command rate, the at least one of the drawing commands corresponding to the change to the buffer module.

9. The device of claim 8, wherein receiving drawing commands comprises:
   establishing a remote access connection with a remote server system; and
   receiving remote drawing commands from the remote server system.

10. The device of claim 8, further comprising a local display, wherein the graphics system is configured to display the at least one of the drawing commands in the buffer module sent to the graphics system on the local display, according to the refresh rate.

11. The device of claim 10, wherein the refresh rate is less than or equal to the monitor rate.

12. The device of claim 10, wherein the monitor rate is less than or equal to about 60 hertz.

13. The device of claim 8,
   wherein the instructions are further operable to detect a relationship between two related drawing commands,
   wherein the at least one of the drawing commands in the buffer module sent to the graphics system comprises both of the two related drawing commands.

14. The device of claim 8, wherein the drawing commands comprise at least one of a raster operation, a multimedia frame, and a texture.

15. A non-transitory machine-readable medium encoded with instructions executable by a processing system on a client device, the instructions operable to:
   receive drawing commands at the client device over a network connection from a remote server system according to a drawing command rate;
   store the drawing commands in a buffer module in the client device;
   monitor the buffer module for a change to the buffer module, according to a monitor rate;
   detect the change to the buffer module; and
   send at least one of the drawing commands in the buffer module to a graphics system in the client device according to a refresh rate that is less than the drawing command rate, the at least one of the drawing commands corresponding to the change to the buffer module.

16. The non-transitory machine-readable medium of claim 15, wherein receiving drawing commands comprises:
   establishing a remote access connection with a remote server system; and
   receiving remote drawing commands from the remote server system.

17. The non-transitory machine-readable medium of claim 15, wherein the graphics system is configured to display the at least one of the drawing commands in the buffer module sent to the graphics system on a local display, according to the refresh rate.

18. The non-transitory machine-readable medium of claim 17, wherein the refresh rate is less than or equal to the monitor rate.

19. The non-transitory machine-readable medium of claim 17, wherein the refresh rate is less than or equal to about 60 hertz.

20. The non-transitory machine-readable medium of claim 15, wherein the instructions are further operable to detect a relationship between two related drawing commands, wherein the at least one of the drawing commands in the buffer module sent to the graphics system comprises both of the two related drawing commands.

* * * * *